US010953359B2

(12) United States Patent
Nicolaou et al.

(10) Patent No.: US 10,953,359 B2
(45) Date of Patent: Mar. 23, 2021

(54) SEPARATING APPARATUS

(71) Applicant: Dyson Technology Limited, Wiltshire (GB)

(72) Inventors: Richard David Nicolaou, Swindon (GB); Edward Sebert Maurice Shelton, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 64 days.

(21) Appl. No.: 15/739,530

(22) PCT Filed: Jun. 28, 2016

(86) PCT No.: PCT/GB2016/051928
§ 371 (c)(1),
(2) Date: Dec. 22, 2017

(87) PCT Pub. No.: WO2017/001836
PCT Pub. Date: Jan. 5, 2017

(65) Prior Publication Data
US 2018/0178155 A1    Jun. 28, 2018

(30) Foreign Application Priority Data
Jul. 1, 2015    (GB) ........................... 1511534

(51) Int. Cl.
*B01D 46/00* (2006.01)
*A47L 9/20* (2006.01)
(Continued)

(52) U.S. Cl.
CPC ............ *B01D 46/0075* (2013.01); *A47L 9/16* (2013.01); *A47L 9/20* (2013.01); *B01D 46/0019* (2013.01);
(Continued)

(58) Field of Classification Search
CPC ................ B01D 46/00; B01D 46/0075; B01D 46/0019; B01D 46/0065; B01D 46/24;
(Continued)

(56) References Cited

U.S. PATENT DOCUMENTS

| 237,134 A | 2/1881 | Senff et al. |
| 1,982,639 A | 12/1934 | Christofferson |

(Continued)

FOREIGN PATENT DOCUMENTS

| AT | 365 087 | 12/1981 |
| CN | 1757370 A | 4/2006 |

(Continued)

OTHER PUBLICATIONS

Search Report dated Nov. 20, 2015, directed to GB Application No. 1511534.8; 1 page.
(Continued)

*Primary Examiner* — T. Bennett McKenzie
(74) *Attorney, Agent, or Firm* — Morrison & Foerster LLP

(57) ABSTRACT

The present invention relates to an appliance comprising, a regenerative filter for filtering a fluid flow, having at least one filter, a filter regenerator for regenerating the regenerative filter, a turbine for driving the filter regenerator, the turbine being driven by the fluid flow passing through the appliance during its use.

12 Claims, 40 Drawing Sheets

(51) Int. Cl.
*A47L 9/16* (2006.01)
*B01D 46/24* (2006.01)
*B01D 50/00* (2006.01)

(52) U.S. Cl.
CPC ......... *B01D 46/0065* (2013.01); *B01D 46/24* (2013.01); *B01D 50/002* (2013.01); *B01D 46/0064* (2013.01); *B01D 2275/10* (2013.01); *B01D 2279/55* (2013.01)

(58) Field of Classification Search
CPC ..... B01D 50/002; B01D 2279/55; A47L 9/00; A47L 9/16; A47L 9/20
USPC .................................................. 55/282–305
See application file for complete search history.

(56) References Cited

U.S. PATENT DOCUMENTS

| | | | |
|---|---|---|---|
| 2,520,589 A | 4/1950 | White | |
| 2,534,171 A | 12/1950 | Kirby | |
| 2,591,567 A | 4/1952 | Lofgren et al. | |
| 2,722,993 A | 11/1955 | Gerber et al. | |
| 3,062,732 A | 11/1962 | Keidel | |
| 3,368,333 A | 2/1968 | Merklin | |
| 3,375,638 A | 4/1968 | Dungler | |
| 3,491,887 A | 1/1970 | Maestrelli | |
| 3,798,704 A | 3/1974 | Kilstrom et al. | |
| 3,977,847 A | 8/1976 | Clark | |
| 4,153,008 A | 5/1979 | Marino et al. | |
| 4,221,576 A | 9/1980 | Phillips, Jr. | |
| 4,350,590 A | 9/1982 | Robinson | |
| 4,378,980 A | 4/1983 | Long | |
| 4,572,745 A * | 2/1986 | House ................... | D01H 11/006 134/10 |
| 4,655,805 A | 4/1987 | Krantz | |
| 4,881,957 A | 11/1989 | Shofner | |
| 5,599,363 A | 2/1997 | Percy | |
| 5,603,740 A | 2/1997 | Roy | |
| 5,912,423 A * | 6/1999 | Doughty ............... | F24F 3/1603 95/107 |
| 6,758,874 B1 * | 7/2004 | Hunter, Jr. ................. | A47L 9/20 15/352 |
| 7,398,593 B2 | 7/2008 | Nitoh et al. | |
| 8,302,251 B2 | 11/2012 | Beskow et al. | |
| 2002/0166199 A1 | 11/2002 | Boles et al. | |
| 2003/0080072 A1 | 5/2003 | Morimura | |
| 2003/0221278 A1 | 12/2003 | Oh | |
| 2004/0063559 A1 | 4/2004 | Ochsenbauer | |
| 2004/0163206 A1 | 8/2004 | Oh | |
| 2005/0081495 A1 * | 4/2005 | Wei .................... | B01D 46/0065 55/290 |
| 2005/0132528 A1 * | 6/2005 | Yau .......................... | A47L 5/24 15/344 |
| 2007/0012188 A1 | 1/2007 | Tandon et al. | |
| 2007/0186372 A1 * | 8/2007 | Rowntree ............. | A47L 9/2857 15/347 |
| 2009/0113662 A1 | 5/2009 | Pineschi | |
| 2009/0313783 A1 | 12/2009 | Nakano et al. | |
| 2010/0043362 A1 * | 2/2010 | Okada ................... | F24F 3/1603 55/296 |
| 2010/0242221 A1 | 9/2010 | Horne et al. | |
| 2011/0067388 A1 | 3/2011 | Zhang | |
| 2012/0097593 A1 | 4/2012 | Maier et al. | |
| 2012/0145817 A1 | 6/2012 | Harris | |
| 2014/0109337 A1 | 4/2014 | Krebs | |
| 2016/0325217 A1 | 11/2016 | Park et al. | |
| 2017/0362977 A1 | 12/2017 | Zhang | |
| 2018/0177370 A1 | 6/2018 | Nicolaou | |
| 2018/0178154 A1 | 6/2018 | Nicolaou | |
| 2018/0192841 A1 | 7/2018 | Nicolaou et al. | |

FOREIGN PATENT DOCUMENTS

| | | | | |
|---|---|---|---|---|
| CN | 101006909 | A | 8/2007 | |
| CN | 101119675 | A | 2/2008 | |
| CN | 201061504 | Y | 5/2008 | |
| CN | 103767629 | A | 5/2014 | |
| DE | 2922552 | A1 | 12/1980 | |
| DE | 4235745 | A1 | 4/1994 | |
| DE | 199 16 539 | | 10/2000 | |
| EP | 0 042 723 | | 12/1981 | |
| EP | 0 057 995 | | 8/1985 | |
| EP | 0 207 797 | | 1/1991 | |
| EP | 0 259 000 | | 9/1992 | |
| EP | 0 626 192 | | 11/1994 | |
| EP | 1 239 760 | | 10/2003 | |
| EP | 1629761 | A2 | 3/2006 | |
| EP | 2225993 | A1 | 9/2010 | |
| EP | 2 335 544 | | 6/2011 | |
| EP | 2335544 | A1 * | 6/2011 | ........... B01D 46/521 |
| EP | 1 715 933 | | 10/2013 | |
| EP | 2 677 916 | | 1/2015 | |
| GB | 514140 | | 10/1939 | |
| GB | 614540 | | 12/1948 | |
| GB | 656180 | | 8/1951 | |
| GB | 2 349 105 | | 10/2000 | |
| GB | 2 388 307 | | 11/2003 | |
| GB | 2388307 | A * | 11/2003 | ............... A47L 9/20 |
| JP | S48-1756 | | 5/1971 | |
| JP | S49-23421 | | 6/1974 | |
| JP | S56-74643 | | 6/1981 | |
| JP | S56-111961 | | 8/1981 | |
| JP | S61-501311 | A | 7/1986 | |
| JP | H11-9527 | A | 1/1999 | |
| JP | 2001-170418 | A | 6/2001 | |
| JP | 2003-310507 | | 11/2003 | |
| JP | 2004-408 | | 1/2004 | |
| JP | 2004-249068 | | 9/2004 | |
| JP | 2004-358032 | A | 12/2004 | |
| JP | 2005-279505 | A | 10/2005 | |
| JP | 2006-90572 | | 4/2006 | |
| JP | 2007-125294 | A | 5/2007 | |
| JP | 2008-385 | A | 1/2008 | |
| JP | 2008-86942 | | 4/2008 | |
| JP | 2009-61312 | A | 3/2009 | |
| JP | 2010-240452 | A | 10/2010 | |
| JP | 2012-529982 | A | 11/2012 | |
| JP | 2013-176603 | A | 9/2013 | |
| JP | 2013-183760 | | 9/2013 | |
| JP | 2013-230406 | A | 11/2013 | |
| JP | 2014-79452 | A | 5/2014 | |
| KR | 10-2010-0088365 | A | 8/2010 | |
| KR | 10-2011-0121389 | | 11/2011 | |
| WO | 00/38025 | A1 | 6/2000 | |
| WO | 00/50347 | A1 | 8/2000 | |
| WO | WO-2007/031497 | | 3/2007 | |
| WO | WO-2007031497 | A1 * | 3/2007 | ............... A47L 9/20 |
| WO | 2008/009886 | A1 | 1/2008 | |
| WO | 2012/113782 | A1 | 8/2012 | |
| WO | 2017/001832 | A1 | 1/2017 | |

OTHER PUBLICATIONS

International Search Report and Written Opinion dated Sep. 15, 2016, directed to International Application No. PCT/GB2016/051928; 9 pages.

Notice of Reasons for Rejection dated Mar. 4, 2019, directed to JP Application No. 2017-567735; 7 pages.

Nicolaou et al., U.S. Office Action dated Jan. 15, 2020, directed to U.S. Appl. No. 15/739,013; 13 pages.

Nicolaou et al., U.S. Office Action dated Jan. 15, 2020, directed to U.S. Appl. No. 15/739,515; 11 pages.

Nicolaou et al., U.S. Office Action dated Sep. 25, 2019, directed to U.S. Appl. No. 15/739,515; 15 pages.

Nicolaou et al., U.S. Office Action dated Sep. 26, 2019, directed to U.S. Appl. No. 15/739,013; 17 pages.

The First Office Action dated Sep. 27, 2019, directed to CN Application No. 201680050786.5; 24 pages.

Nicolaou et al., U.S. Office Action dated Jun. 30, 2020, directed to U.S. Appl. No. 15/739,553; 11 pages.

Nicolaou et al., U.S. Office Action dated Mar. 23, 2020, directed to U.S. Appl. No. 15/739,553; 13 pages.

(56) References Cited

OTHER PUBLICATIONS

Nicolaou et al., U.S. Office Action dated Oct. 21, 2019, directed to U.S. Appl. No. 15/739,553; 12 pages.
Nicolaou, U.S. Office Action dated Jul. 14, 2020 directed to U.S. Appl. No. 15/739,515; 21 pages.

* cited by examiner

B - B

C - C

C - C

B - B

VIEW G

VIEW H

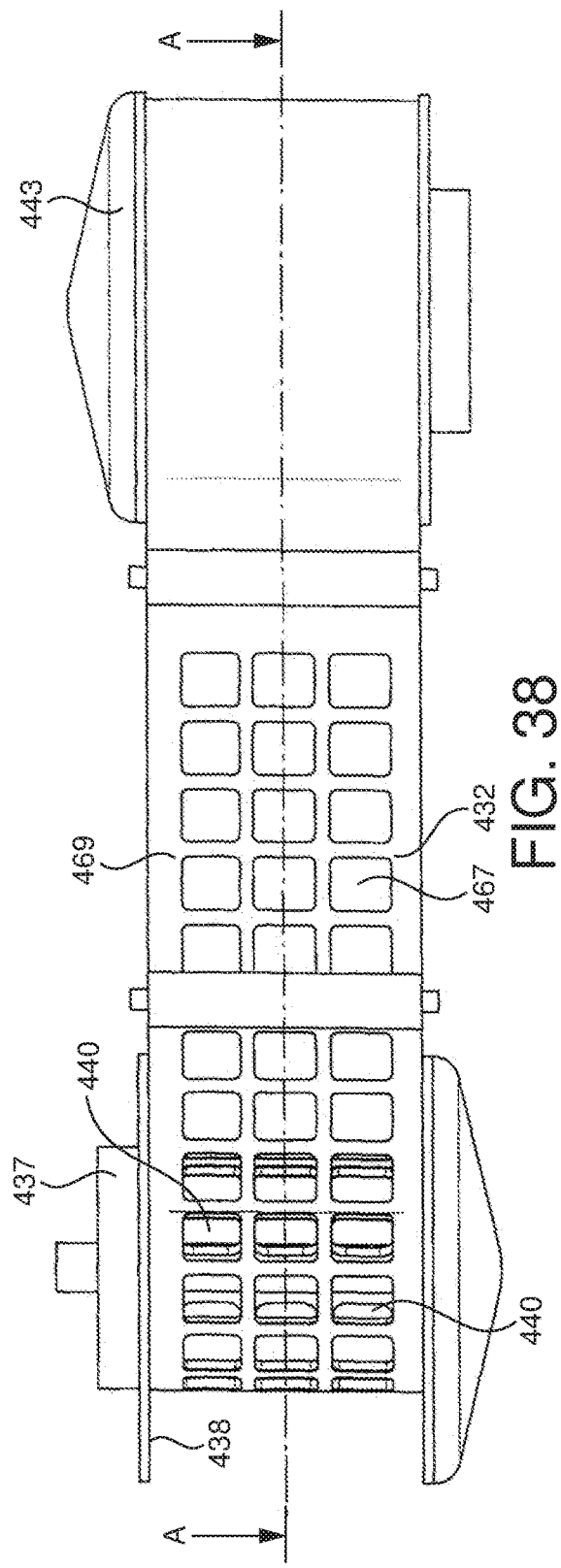
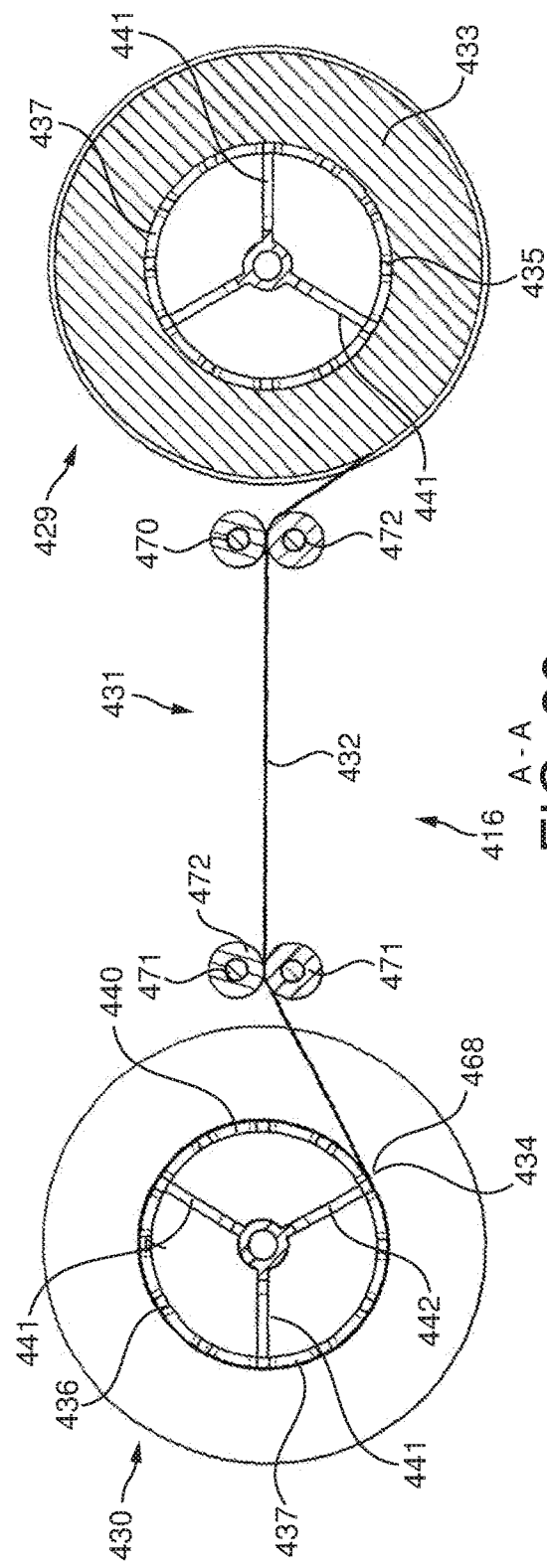
FIG. 38
FIG. 39

SEPARATING APPARATUS

REFERENCE TO RELATED APPLICATIONS

This application is a national stage application under 35 USC 371 of International Application No. PCT/GB2016/051928, filed Jun. 28, 2016, which claims the priority of United Kingdom Application No. 1511534.8, filed Jul. 1, 2015, the entire contents of which are incorporated herein by reference.

FIELD OF THE INVENTION

The present invention relates to a separating apparatus for separating particles from a fluid flow. Particularly, the separating apparatus may be a vacuum cleaner or form part of a vacuum cleaner.

BACKGROUND OF THE INVENTION

Known separating apparatus include those used in vacuum cleaners, for example cyclonic separating apparatus. Such cyclonic separating apparatus are known to comprise a low efficiency cyclone for separating relatively large particles and a high efficiency cyclone located downstream of the low efficiency cyclone for separating any fine particles which remain entrained within the airflow (see, for example, EP 0 042 723B).

Irrespective of the type of separating apparatus used, there may be a risk of a small amount of dirt and dust passing through the separating apparatus and being carried to the motor-driven fan unit. It is undesirable for dirt and dust particles to pass through the fan of a motor and fan unit because the fan may become damaged or may operate less efficiently.

In order to reduce this problem, some vacuum cleaners include a fine filter in an air flow path between the separating apparatus and the airflow generator. This filter is commonly known as a pre-motor filter and is used to extract any fine dirt and dust particles remaining in the air flow after it has passed through the separating apparatus.

It is also known to provide a filter in an air flow path downstream of the air flow generator in order to extract any remaining dirt and dust particles prior to the air flow exiting the appliance. This type of filter is known as a post-motor filter. The post-motor filter may also capture particles produced by any brushes of the motor.

Filter assemblies are used on the Dyson range of vacuum cleaners, for example, on model numbers DC04, DC07, DC12, DC14 and DC15. The principle by which filter assemblies of this type operate is described in GB 2349105 and EP 1239760B.

In vacuum cleaner applications it is desirable for the dust separating efficiency to be as high as possible whilst maintaining suitable filter lifetime. Filters often function by trapping dust particles within the body of the filter medium. Large dust particles can be trapped within the filter medium because they are too large to travel through the gaps in the filter medium. Smaller dust particles can be trapped by becoming attached to the filter medium as a result of electrostatic forces. In use such filters typically become clogged with trapped dust over time and their resistance to the flow of air increases. This resistance to the flow of air affects the performance of the vacuum cleaner.

One solution to this problem has been to replace the filters. There are some filters which are washable however due to the construction of these filters some dust will always remain in the filter, adversely affecting the performance of the machine and sometimes undesirably shortening the lifetime of the cleaner. There is therefore a need for an improved filter.

SUMMARY OF THE INVENTION

Accordingly a first aspect of the present invention provides a separating apparatus comprising, a first cyclonic separating unit, a regenerative filter comprising at least one filter having a plurality of layers of filter material, the filter having a filtering configuration where the plurality of layers of filter material are held together and a regeneration configuration where at least a portion of one of the layers of filter material is spaced from the remainder of the layers of filter material for regeneration, and a filter regenerator for regenerating the filter material.

Having a regenerative filter is a huge advantage over the prior art. Regenerating the filter means that it helps to ensure that the filter does not become blocked and therefore helps to ensure that airflow through the separating apparatus is not unduly restricted which would increase the lifetime of the separating apparatus and maintain performance. It also means that expensive replacement filters are not required. As used herein the term "regenerative filter" shall be taken to mean a filter in which a portion of the loaded dust can be removed from the filter. The term "regenerative filter" does not cover a filter which is removed from the remainder of the separating apparatus for cleaning. The term "regenerative filter" covers a filter which is cleaned during normal use of the separating apparatus or during a cleaning cycle. Preferably the regenerative filter can remove enough dust during regeneration to ensure that the original performance parameters of the separating apparatus are maintained, or substantially maintained. Ideally the pressure rise between before first use and after regeneration will be no more than 30%, but preferably no more than 25, or 20, or 15, or 10, or 5 or 1%.

The regenerative filter is preferably arranged downstream of the first cyclonic separating unit. It may however be arranged upstream of the first cyclonic separating unit.

In a preferred embodiment the regenerative filter comprises a plurality of filters. Having a plurality of filters is advantageous because it allows for continuous filtering and regeneration during use of the separating apparatus. In a preferred embodiment at least one filter is in the filtering configuration and at least one filter is in the regeneration configuration. This means that while one filter is being used as a filter another is being regenerated.

In a particular embodiment a plurality of filters may be arranged to be in the filtering configuration. This advantageously increases the overall surface area of the filter. It is also possible to have a plurality of filters in the regeneration configuration.

The regenerative filter preferably has a filtration zone and a regeneration zone. The filtration zone and the regeneration zone are preferably spaced apart. The filter(s) are preferably moveable between the filtration zone and the regeneration zone. The filter(s) is in its filtering configuration when housed in the filtration zone and in its regeneration configuration when housed in the regeneration zone.

In an embodiment the plurality of layers of filter material in the filtering configuration are preferably held together so that they are fixed relative to each other. They are preferably held in a filter book frame which allows air to pass through the filter material but compresses the layers of filter material together. In the regeneration configuration the layers of filter material may be held together at at least one point, such that at least a portion of one of the plurality of layers of filter material can be spaced from the remainder of the layers of filter material for regeneration.

Ideally in both the filtration and regeneration configurations the layers of filter material are held together along one edge to form a book type filter where the plurality of layers of filter material are fixed together along one edge. Each book type filter may be constructed from a plurality of square or rectangular layers of filter material which are bound along one edge into a book spine. The layers may be bound to form the spine by stitching, gluing or any other suitable technique. This means that when the filter is in the regeneration configuration the non bound edges are free to move. In this way the layers of the filter can move like the leaves of a book.

In use the filter regenerator can move at least a portion of one of the layers of a filter housed in the regeneration zone, such that any dirt deposited on the filter material is knocked or shaken from the filter material. There are several ways in which this could be done. The filter regenerator could be a separate component which in use is arranged to repeatedly make contact with at least a portion of one or more layers of filter material of a filter housed in the regeneration zone, such that any dirt deposited on the filter material is knocked or shaken from the filter material. The regenerator could for example be in the form of a beater bar which is arranged to hit the layers of the filter material housed in the regeneration zone.

In another embodiment a filter may be connected to the filter regenerator when the at least one filter is in its regeneration configuration, in use the filter regenerator may move the filter such that any dirt deposited on the filter material is knocked or shaken from the filter material.

The separating apparatus may further comprise a turbine for driving the filter regenerator, the turbine being driven by fluid flow passing through the separating apparatus during its use.

In the embodiments described above, the filter material may be any suitable material for example metals, glass, fleece, polyester, polypropylene, polyurethane, polytetrafluoroethylene, nylon or any other suitable plastics material. In an alternative embodiment the filter medium may be formed from an organic material for example cotton, cellulose or paper. The filter material may have electrostatic properties.

The filter medium may have a pore size of from 3, or 10, or 50, or 100, or 500, or 1000 pores per inch (PPI) with a pore diameter of from 1 micron or 2 micron, or 3 micron, or 10 micron, or 50 micron, or 100 micron, or 200 micron or 400 micron.

The pore size or type of filter medium may vary along the length and or width of the filter medium. For example the pore size may decrease or increase in a downstream direction.

The separating apparatus has a longitudinal axis. The longitudinal axis of the regenerative filter is in line with the longitudinal axis of the separating apparatus. The first cyclonic separating unit, and the regenerative filter can be arranged concentrically about a common central axis of the separating apparatus.

In a preferred embodiment the regenerative filter may be arranged longitudinally through the separating apparatus. Ideally the regenerative filter may be housed down the centre of the separating apparatus. The first cyclonic separating unit or a portion of it may be arranged around the regenerative filter such that the regenerative filter is partially or totally surrounded by the first cyclonic separating unit.

Ideally the external surface of the regenerative filter is not subject to the cyclonic airflow inside the first cyclonic separating unit. In other words the regenerative filter is not inside the single cylindrical cyclone, but it is housed within and surrounded by the first cyclonic separating unit.

Ideally the first cyclonic separating unit comprises a single cylindrical cyclone and a dust collecting bin. The dust collecting bin may be formed from a lower section of the cylindrical cyclone itself or it may be in the form of a separate dust collecting bin removably attached to the base of the cylindrical cyclone.

The separating apparatus may also further comprise a second cyclonic separating unit. The second cyclonic separating unit may be arranged downstream of the first cyclonic separating unit and upstream of the regenerative filter. The second cyclonic separating apparatus may comprise one or more cyclones. The cyclones in the second cyclonic separating unit are preferably frustoconical in shape. Ideally the second cyclonic cleaning unit comprises a dust collecting bin. The dust collecting bin may be arranged below the second cyclone(s). Instead of having a separate regenerative filter dust collector for collecting dust removed from the filter(s) by the filter regenerator, dust removed from the regenerative filter may collect in the dust collecting bin of the second cyclonic separating unit.

In a preferred embodiment the first cyclonic separating unit may be arranged around the second cyclonic separating unit or a portion of the second cyclonic separating unit, such that the second cyclonic separating unit or a portion of it is surrounded by the first cyclonic separating unit. In this embodiment the second cyclonic separating unit or a portion of it may therefore be housed inwardly of or within the first cyclonic separating unit. In a preferred embodiment the second cyclonic separating unit or a portion of it may be located longitudinally through the first cyclonic separating unit. The first cyclonic separating unit may therefore be annular in shape.

In a particular embodiment the second cyclonic separating unit may comprise a plurality of secondary cyclones arranged in parallel and a dust collecting bin, which may be arranged below the secondary cyclones. In a preferred embodiment the secondary cyclones may be formed in a ring above or at least partially above the first cyclonic separating unit. Ideally the secondary cyclones are centered about the longitudinal axis of the first cyclonic separating unit.

In a preferred embodiment the dust collecting bin of the second cyclonic separating unit may be arranged longitudinally through the separating apparatus such that it is surrounded by and housed inwardly of the first cyclonic separating unit.

In a particular embodiment the regenerative filter is located inwardly of the second cyclonic separating unit. Ideally the regenerative filter is located longitudinally through the centre of the second cyclonic separating unit. In such an embodiment the dust collecting bin of the second cyclonic separating unit may also be annular in shape. In such an embodiment the first cyclonic separating unit, the second cyclonic separating unit and the regenerative filter may be arranged concentrically. Preferably they are arranged about a common central axis of the separating apparatus. Preferably the secondary cyclones surround a top portion of the regenerative filter and the dust collecting bin of the second cyclonic separating unit surrounds a lower portion of the regenerative filter.

In a preferred embodiment the regenerative filter is separate from, but in fluid communication with, the second cyclonic separating unit. The term "separate from" as used herein shall be taken to mean that the regenerative filter is not subjected to the cyclonic airflow set up inside the cyclonic separating unit during use.

In an alternative embodiment, the at least one filter may comprise a scroll type filter through which air to be filtered can pass when it is in the filtering configuration. In the regeneration configuration it may comprise a single layer of filter material. In this embodiment the at least one filter passes through a regeneration zone for regeneration when in its regenerating configuration.

Ideally in this embodiment the regenerative filter comprises a pair of scroll type filters through which air to be filtered can pass, the regenerative filter being arranged such that the filter material is movable in both directions between the first and second scrolls, passing a single layer of filter material through the filter regenerator as it moves between them. It is however possible that the air is only filtered through one of the scrolls. In this type of embodiment where there is one or more scroll filters, preferably two scroll filters, the filter regenerator comprises a pair of opposed brushes between which the at least one filter in its regeneration configuration will pass during use of the separating apparatus. In a preferred embodiment there are two scroll type filters and air to be cleaned passes through both filters. In such an embodiment a duct may be provided between an outlet of the first scroll filter and an inlet of the second scroll filter.

In the embodiment described above the regenerative filter may further comprise a regenerative filter dust collector for collecting dust removed from the filter(s) by the filter regenerator.

In an embodiment the separating apparatus is a vacuum cleaner or forms part of a vacuum cleaner, for example a cylinder, upright, stick or robotic vacuum cleaner. In an embodiment where the separating apparatus is a vacuum cleaner, a first cyclonic separating unit is preferably arranged to be removably mounted to a main body of the vacuum cleaner. The regenerative filter remains attached to the remainder of the separating unit when the first cyclonic separating apparatus is removed.

In an embodiment where the separating apparatus forms part of a vacuum cleaner, the whole of the separating apparatus may be removably mounted to a main body of the vacuum cleaner. Alternatively only the first cyclonic separating unit may be removable and the regenerative filter may remain attached to the remainder of the vacuum cleaner when the first cyclonic separating unit is removed.

Preferably the regenerative filter can be regenerated to the extent that the suction power of the vacuum cleaner after regeneration is not compromised. This regeneration occurs without the need for the operator to remove it from the vacuum cleaner for cleaning or perform any additional tasks than those associated with the normal process of using the vacuum cleaner and/or emptying its bin. The regenerative filter may be removable from the machine but it does not need to be removed for cleaning.

The vacuum cleaner may have a control mechanism for moving the at least one portion of the regenerative filter between the regeneration zone and the filtration zone in response to the separating apparatus and/or the regenerative filter being removed from or mounted onto the remainder of the vacuum cleaner. Alternatively the vacuum cleaner may have a powered control mechanism for moving the at least one portion of the regenerative filter between the regeneration zone and the filtration zone. For example one or more motors may be used to move the at least one portion of the regenerative filter between the regeneration zone and the filtration zone.

The regenerative filter may be fixed to the separating apparatus. The regenerative filter is preferably not removable from the separating apparatus. The regenerative filter may be fixed to the vacuum cleaner. The regenerative filter is preferably not removable from the vacuum cleaner. One or more filters of the regenerative filter can be regenerated whilst they are housed within the separating apparatus. One or more of the filters of the regenerative filter may be regenerated whilst the separating apparatus is in use. One or more of the filters of the regenerative filter may be regenerated whilst the vacuum cleaner is in use. One or more of the filters of the regenerative filter may be regenerated whilst the vacuum cleaner is in a regeneration mode.

The separating apparatus may also be incorporated into another appliance where it is desired to filter air flow which is passing through the appliance. An example of such an appliance might be a fan, fan heater, purifier or humidifier.

A second aspect of the present invention provides a surface cleaning apparatus comprising a regenerative filter having at least one filter, the at least one filter comprising a plurality of layers of filter material, the filter having a first filtering configuration where the plurality of layers are held together such that air to be cleaned can pass through the plurality of layers of filter media during use of the surface treating apparatus, and a second regeneration configuration wherein at least a portion of one of the plurality of layers of filter material is spaced from the remainder of the layers of filter material for regeneration, and a filter regenerator for regenerating the filter material.

Such an arrangement is advantageous because the air to be filtered must pass through multiple layers of filter material. Spacing at least a portion of one of the plurality of layers of filter material from the remainder of the layers of filter material for regeneration means that much more dirt can be removed from the filter than if the filter is cleaned whilst all the layers are held together.

The regenerative filter may comprise a plurality of filters. At least one filter can be in the filtering configuration and at least one filter can be in the regeneration configuration. In a preferred embodiment a plurality of filters can be in the filtering configuration. Ideally a plurality of filters are in the regeneration configuration. This is advantageous because it means that at least one filter can be used as a filter whilst another filter is being regenerated.

The regenerative filter may comprise a filtration zone and a regeneration zone which are spaced apart. The at least one filter is preferably moveable between the filtration zone, where the at least one filter is in its filtering configuration, to the regeneration zone where the at least one filter is in its regeneration configuration. This is advantageous because a dirty filter which has been used for filtration can be moved to the regeneration zone for regeneration and a regenerated filter can be moved to the filtration zone and used for filtration.

Preferably in the filtering and regeneration configuration the plurality of layers of filter material are held together along one edge to form a book type filter. In use the filter regenerator can move at least a portion of one of the layers of a filter in the regeneration configuration, such that any dirt deposited on the filter material is knocked or shaken from the filter material.

In use the filter regenerator preferably repeatedly makes contact with at least a portion of one or more leaves of filter material of a filter in the regeneration configuration, such that any dirt deposited on the filter material is knocked or shaken from the filter material. Alternatively at least one filter can be connected to the filter regenerator when the at least one filter is in its regeneration configuration. In use the filter regenerator can move the filter such that any dirt deposited on the filter material can be shaken from the filter material.

In an alternative embodiment of the second aspect the at least one filter may comprise a scroll type filter when it is in the filtering configuration, and a single layer of filter material in the regeneration configuration. Ideally the at least one filter in its regeneration configuration can be arranged to pass through a regeneration zone for regeneration.

In a particular embodiment the surface cleaning appliance may comprise a pair of scroll type filters through which air to be filtered can pass. The regenerative filter may be arranged such that the filter material can be moved in both directions between the first and second scrolls, passing a single layer of filter material through the filter regenerator as it moves between them. In this embodiment the filter regenerator may comprise a pair of opposed brushes between which the at least one filter in its regeneration configuration can pass during use of the separating apparatus.

The surface cleaning appliance may further comprise a surface contacting head. It may further comprise a separating apparatus. The separating apparatus may comprise a further filter.

The separating apparatus is preferably removable from the remainder of the surface cleaning appliance. The regenerative filter may be housed in the separating apparatus.

A third aspect of the present invention provides a regenerative filter comprising at least one filter having a plurality of layers of filter material, the filter having, a first filtering configuration where the plurality of layers of filter material are held together so that they are fixed relative to each other, and a second regeneration configuration where the layers of filter material are held together at at least one point, such that at least a portion of one of the plurality of layers of filter material can be spaced from the remainder of the layers of filter material for regeneration, the filter being movable from a filtration zone, where the first filter is in its filtering configuration, to a regeneration zone which is spaced from the filtration zone and where the first filter is in its regeneration configuration, and a filter regenerator for regenerating the filter material, the filter regenerator being arranged to move at least a portion of at least one layer of filter material when the filter is housed in the regeneration zone.

This is advantageous because a dirty filter which has been used for filtration can be moved to the regeneration zone for regeneration and a regenerated filter can be moved to the filtration zone and used for filtration.

In the filtering and regeneration configuration the plurality of layers of filter material are preferably held together along one edge to form a book type filter. In use the filter regenerator ideally moves at least a portion of at least one of the layers of filter material of the filter when it is housed in the regeneration zone, such that any dirt deposited on the filter material is knocked or shaken from the filter material. In a particular embodiment the filter regenerator may repeatedly make contact with at least a portion of one or more layers of filter material of the filter when it is housed in the regeneration zone, such that any dirt deposited on the filter material is knocked or shaken from the filter material.

In an alternative embodiment of the third aspect of the present invention the filter can be connected to the filter regenerator when the filter is in its regeneration configuration, and in use the filter regenerator moves at least a portion of the filter such that any dirt on the filter material is shaken from the filter material.

The regenerative filter may comprise a plurality of filters. Preferably at least one filter is in the filtering configuration and at least one filter is in the regeneration configuration. A plurality of filters may be in the filtering configuration. A plurality of filters may be in the regeneration configuration.

The or each filter can be mounted on a frame, the frame being movable between the filtration zone and the regeneration zone.

The regenerative filter may be removably attached to an appliance. The or each filter may be movable between the filtration zone and the regeneration zone in response to the regenerative filter being attached to the remainder of the appliance.

Alternatively or additionally the or each filter may be movable between the filtration zone and the regeneration zone in response to the regenerative filter being removed from the remainder of the appliance.

A fourth aspect of the present invention provides a regenerative filter comprising, a length of filter material, a first perforated filter support, a second perforated filter support, a filter regenerator, and an intermediate duct, a first end of the filter material being wound around the first perforated filter support to form a first scroll type filter through which air to be filtered can pass, a second end of the filter material being wound around the second perforated filter support to form a second scroll type filter through which air to be filtered can pass, the regenerative filter being arranged such that the filter material is movable in both directions between the first and second perforated filter supports, by passing a single layer of filter material through the filter regenerator as it moves between them, the intermediate duct being arranged to take airflow which has passed through the first scroll type filter to the second scroll type filter for filtration, during use of the regenerative filter.

This arrangement is advantageous because it means that the air is being passed through all of the layers of filter material. The number of layers of filter material through which the air to be cleaned must pass, never falls below a certain number.

In a preferred embodiment the first scroll type filter is housed in a first scroll housing. The second scroll type filter is preferably housed in a second scroll housing. In such an embodiment the intermediate duct can connect the first scroll housing to the second scroll housing. Using the scroll housing and the duct helps to ensure that all of the air passes through the scroll type filters.

The filter regenerator is preferably housed in a regeneration zone. The filter regenerator may be located between the first and second scroll type filters. The filter regenerator may comprise a pair of opposed brushes between which the single layer of filter material can pass during use of the regenerative filter.

The regenerative filter may comprise an air inlet. In a preferred embodiment the regenerative filter may comprise an air outlet.

The regenerative filter may further comprise a scroll winding device for moving the filter material between the first and second perforated filter supports. The scroll winding device may be at least one motor. In a preferred embodiment each perforated filter support can be mounted on a drive shaft which may be connected to an associated motor.

The length of filter material in the regenerative filter may have a tail section at each end which has a larger pore size than the remainder of the filter material.

In a particular aspect a robotic surface treating appliance has a regenerative filter as described above. The regenerative filter may be housed in the main body of the appliance. The robotic surface treating appliance may further comprise a separating apparatus, for example a cyclonic separating apparatus. The separating apparatus may be removable from the remainder of the robotic surface treating appliance. The regenerative filter is preferably fixed to the robotic surface treating appliance. Regeneration can occur whilst the regenerative filter is attached to the remainder of the robotic surface treating appliance. Regeneration may occur during normal use of the robotic surface treating appliance, for example whilst it is being used to clean a surface. Alternatively or additionally the robotic surface treating appliance may be arranged to have a regeneration cycle which can be run whilst the robotic surface treating appliance is not in normal use. This may for example be arranged to occur whilst the robotic surface treating appliance is being recharged.

A fifth aspect of the present invention provides an appliance comprising, a regenerative filter for filtering a fluid flow, having at least one filter, a filter regenerator for regenerating the regenerative filter, a turbine for driving the filter regenerator, the turbine being driven by the fluid flow passing through the appliance during its use.

This is advantageous as it does not require any additional power source to drive the filter regenerator.

The turbine is preferably arranged to be driven by fluid exhausted from the regenerative filter during use of the appliance. In a particular embodiment the turbine can be arranged downstream of the regenerative filter. The turbine can be connected to the filter regenerator via one or more gears. Ideally the turbine is connected to the filter regenerator via a drive shaft.

In a preferred embodiment the at least one filter of the regenerative filter may comprise a plurality of layers of filter material, the filter having a first filtering configuration where the plurality of layers are held together and the air to be cleaned passes through the plurality of layers of filter media and a second regeneration configuration where at least a portion of one of the plurality of layers of filter material is spaced from the remainder of the layers of filter material for regeneration.

The regenerative filter may comprise a plurality of filters. The regenerative filter preferably comprises a filtration zone and a regeneration zone which are spaced apart. Ideally the at least one filter is moveable between the filtration zone and the regeneration zone. In use the filter regenerator may be able to move at least a portion of the regenerative filter, such that any dirt deposited on the regenerative filter is knocked or shaken from the regenerative filter. In a particular embodiment, and whilst the appliance is in use, the filter regenerator repeatedly makes contact with at least a portion of the regenerative filter, such that any dirt deposited on the regenerative filter can be knocked or shaken from the regenerative filter.

In an alternative embodiment the regenerative filter may be connected to the filter regenerator and in use the filter regenerator can move the regenerative filter such that any dirt deposited on the regenerative filter can be shaken from the regenerative filter.

A sixth aspect of the present invention provides a regenerative filter comprising, a length of material having a first support tail and a filter portion, a first end of the material being wound around a first perforated support to form a first scroll type filter through which air to be filtered can pass, and a second end of the material being fixed to a filter support, the regenerative filter being arranged such that the material is movable in both directions between the first perforated support and the filter support, passing through a filter regenerator as it moves between them, the first end of the material forms the first support tail which extends from the first perforated support to at least the filter regenerator when the material is unwound from the first perforated support, the first support tail having a more open structure than the structure of the filter portion.

This is advantageous because the support tail does not pass through the filter regenerator. If the support tail did not have a more open structure than the structure of the filter portion then the tail portion would get blocked with dirt and dust. The more open structure means that dirt and dust does not get trapped in the tail. The support tail can have a very open structure as long as it remains strong enough to attach the remainder of the filter material to the filter support. An open structure may allow particles of at least 400 microns to pass through.

The first support tail has a larger pore size than the pore size of the filter portion. As used herein the term "pore" shall be taken to mean any aperture or opening.

In a preferred embodiment the filter support can be a second perforated support. Ideally the second end of the material can be wound around the second perforated support to form a second scroll type filter through which air to be filtered can pass.

This is advantageous because it means that air can be filtered through both of the scroll type filters. In such an embodiment a second support tail may be provided. The second support tail may extend from the second perforated support to at least the filter regenerator when the material is unwound from the second perforated support.

The first scroll type filter may be housed in a first scroll housing. The second scroll type filter may be housed in a second scroll housing. The filter regenerator is preferably housed in a regeneration zone. Ideally the filter regenerator can be located between the first scroll type filter and the filter support.

The filter regenerator preferably comprises a pair of opposed brushes between which the filter portion of the material can pass during use of the regenerative filter. The regenerative filter preferably further comprises an air inlet and/or an air outlet. In a preferred embodiment the regenerative filter may further comprise a winding device for moving the length of material between the first perforated filter support and the filter support. The winding device may be at least one motor. In a preferred embodiment the first perforated filter support and the filter support can be mounted on a drive shaft which can be connected to an associated motor.

The support tail(s) may have a pore size of from 2.5 mm to 15 mm. Preferably the support tail(s) have a pore size of from 5 to 15 mm. The pores in the support tail(s) are preferably arranged to overlap in each layer wound around the first and or second perforated supports, such that there is a clear passageway for air to flow through the pores. The pores in the support tail(s) may be square, circular or rectangular in shape.

In a preferred embodiment the filter portion may have a pore size of from 1 micron to 400 micron. Preferably the filter portion has from 3 to 1000 pores per inch (PPI). In a particular embodiment the pore size of the filter portion may increase or decrease along the length of the filter portion.

The pore size of the filter portion and/or the support tail(s) may increase in a downstream direction.

A seventh aspect of the present invention provides a length of material having a first support tail and a filter portion wherein the first support tail has an open structure and the filter portion has a filtering structure.

As stated above in relation to the sixth aspect, an open structure may allow particles of at least 400 microns to pass through.

In a preferred embodiment a first support tail may be connected to a first end of the filter portion and a second support tail may be connected to a second end of the filter portion. In a preferred embodiment the support tail(s) may have a pore size of from 2.5 mm to 15 mm. The first support tail may have a larger pore size than the pore size of the filter portion. As used herein the term "pore" shall be taken to mean any aperture or opening.

The support tail(s) preferably have a pore size of from 5 to 15 mm.

In a particular embodiment the support tail(s) may be formed from at least two strips of material arranged in parallel such that one or more rectangular pores are arranged between the strips of material. Other arrangements are envisaged, for example where there is a diagonal or crossed arrangement of strips of material. The pores in the support tail(s) may for example be square, diamond, circular or rectangular in shape.

The filter portion preferably has a pore size of from 1 micron to 400 micron. The filter portion may have from 3 to 1000 pores per inch (PPI). The pore size of the filter portion may increase or decrease along the length of the filter portion. The pore size of the filter portion and/or the support tail(s) may increase in a downstream direction.

An eighth aspect of the present invention provides a surface treating appliance comprising, a regenerative filter having at least one filter, the regenerative filter being removably mounted to the surface treating appliance, the at least one filter being movable from a filtration zone to a regeneration zone, the filtration zone being spaced from the regeneration zone, and a control mechanism for moving the at least one filter between the regeneration zone and the filtration zone in response to the regenerative filter being removed from or mounted onto the surface treating appliance.

This is advantageous because it means that the movement of the at least one filter between the regeneration zone and the filtration zone happens automatically during normal use of the appliance and a user does not need to remember to move the filters.

The regenerative filter is preferably housed in a separating apparatus which may be removably mounted to the remainder of the surface treating appliance. Ideally the surface treating appliance comprises a plurality of filters. At least one filter is preferably in the regeneration zone and at least one filter is preferably in the filtration zone. A plurality of filters may be in the filtration zone. A plurality of filters may be in the regeneration zone.

The or each filter can be mounted on a frame, the frame being movable between the filtration zone and the regeneration zone. The frame is preferably connected to the control mechanism. The control mechanism may comprise a rack and pinion drive. The control mechanism may comprise a pawl drive collar. Any other suitable control mechanism may be used.

The control mechanism is preferably arranged to ensure that the at least one filter can only move in one direction between the filtration zone and the regeneration zone.

In a particular embodiment a resilient member may project outwardly from the regenerative filter when it is removed from the remainder of the surface treating appliance, the resilient member can be located such that it will be compressed when the regenerative filter is mounted onto the remainder of the surface treating appliance, compression of the resilient member resulting in activation of the control mechanism to result in movement of at least one filter between the filtration and regeneration zones. In an embodiment where the regenerative filter is housed in a separating apparatus which is removably mounted to the surface treating appliance, the resilient member may project outwardly from the separating apparatus when it is removed from the remainder of the surface treating appliance.

A ninth aspect of the present invention provides a surface treating appliance comprising a regenerative filter, and a filter regenerator, the regenerative filter comprising a length of filter material rolled into a first scroll type filter through which air to be filtered can pass and a second scroll type filter through which air to be filtered can pass, the regenerative filter being arranged such that the filter material is movable in both directions between the first and second scroll type filters, the filter material passing through a filter regenerator as it moves between the first and second scroll type filters during use, the separating apparatus further comprising at least one drive means which moves the filter material between the first and second scrolls continuously during use of the surface treating appliance such that the filter material is constantly getting regenerated as it passes through the filter regenerator.

This system is advantageous since the filter is constantly being regenerated whilst the appliance is in use.

In a preferred embodiment the drive means may comprise at least one motor. Each scroll type filter may be mounted on a drive shaft which can be connected to an associated motor. The filter regenerator preferably comprises a pair of opposed brushes between which a single layer of the filter material can pass.

The regenerative filter can be fixed to the surface treating appliance and regeneration of the regenerative filter occurs continuously during use of the surface treating appliance.

The first scroll type filter is preferably mounted on a first perforated support. The second scroll type filter is preferably mounted on a second perforated support. The first scroll type filter may be housed in a first scroll type filter housing. The second scroll type filter may be housed in a second scroll type filter housing.

The surface treating appliance may further comprise at least one cyclonic separator. The surface treating appliance may further comprise a further filter, for example a foam filter, impaction filter, electrostatic filter, bag filter, pleated filter or any other suitable filter. The at least one cyclonic separator and/or the further filter may be arranged upstream or downstream of the regenerative filter.

In an embodiment with at least one cyclonic separator, the separator may be removably attached to the remainder of the surface treating appliance.

Features described above in connection with the first aspect of the invention are equally applicable to each of the second to ninth aspects of the invention and vice versa. In all aspects above the regenerative filter may form part of an appliance, for example a surface treating appliance. It may for example form part of a robotic surface treating appliance.

BRIEF DESCRIPTION OF THE DRAWINGS

The invention will now be described, by way of example, with reference to the accompanying drawings, in which:

FIG. 38 shows a side view of the regenerative filter shown in FIG. 35;

FIG. 39 shows a section through the regenerative filter shown in FIG. 38, taken along the line A-A;

DETAILED DESCRIPTION OF THE INVENTION

Figure 1:
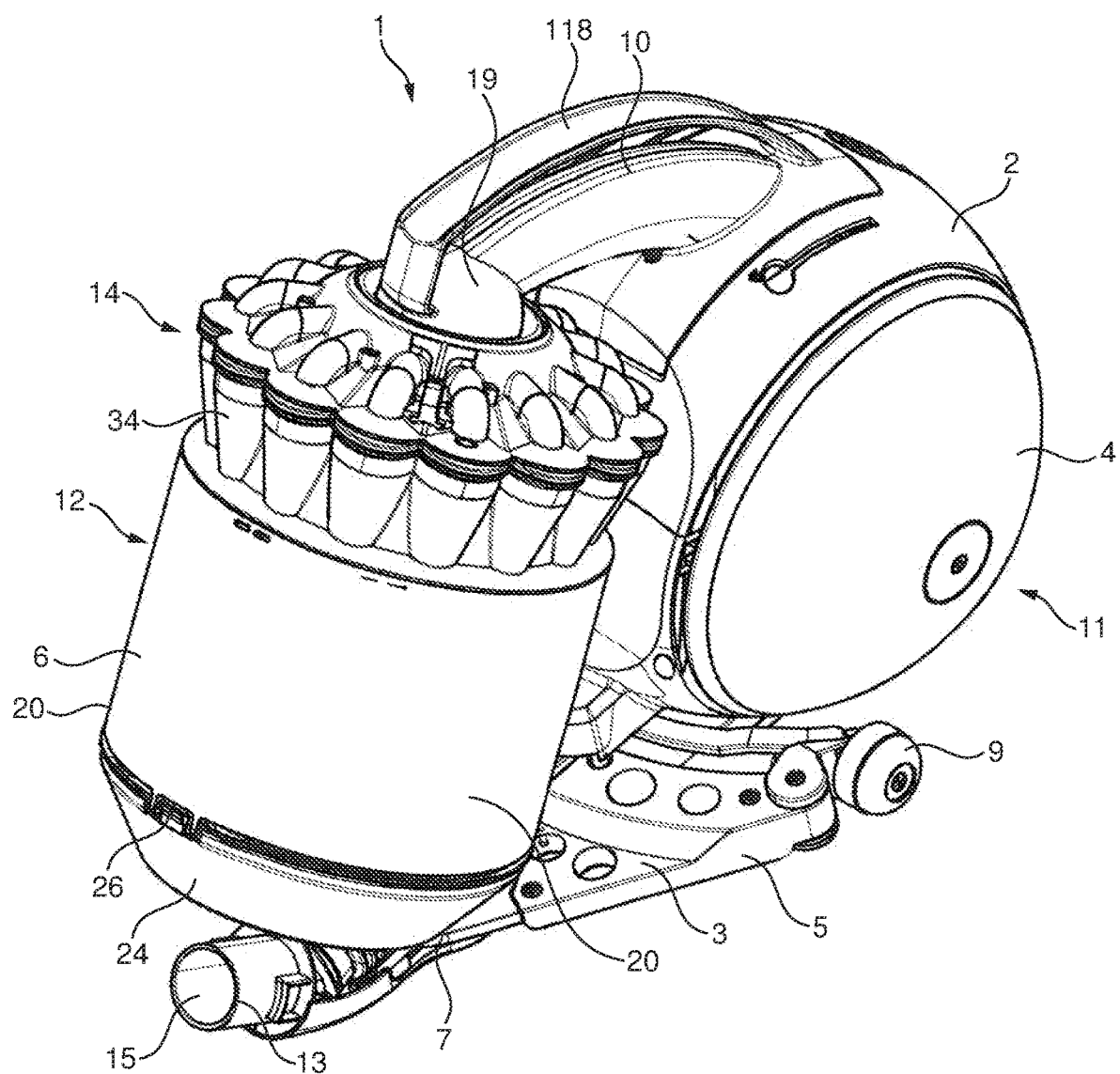
FIG. 1 is a canister vacuum cleaner incorporating a first embodiment of separating apparatus according the present invention, with the duct in the lowered position.

Like reference numerals refer to like parts throughout the specification.

With reference to FIGS. 1 to 16 a vacuum cleaner is shown and indicated generally by the reference numeral 1.

In FIGS. 1, 2, 12 and 13 the vacuum cleaner 1 comprises a main body 2 and a pair of wheels 4 mounted on the main body 2 for manoeuvring the vacuum cleaner 1 across a surface to be cleaned. The main body 2 and wheels 4 together form a rolling assembly 11. The rolling assembly 11 is substantially spherical in shape. The wheels 4 are dome shaped. The vacuum cleaner 1 also comprises a removably mounted separating apparatus 6.

Commonly, a floor-engaging cleaner head (not shown) is coupled to the distal end of a hose (not shown) via a wand (not shown) to facilitate manipulation of a dirty air inlet (not shown) over the surface to be cleaned. The hose communicates with the separating apparatus 6 via an inlet duct 13. A motor and fan unit 8 is housed within the main body 2 for drawing dust laden air into the separating apparatus 6 via the hose.

A chassis 3 is connected to the main body 2. The chassis 3 is generally in the shape of an arrow head pointing forwardly from the main body 2. The chassis 3 comprises side edges 5 which extend rearwardly and outwardly from the front tip 7 of the chassis 3. The angling of the side edges 5 can assist in manoeuvring the vacuum cleaner 1 around corners, furniture or other items upstanding from the floor surface, as upon contact with such an item these side edges 5 tend to slide against the upstanding item to guide the main body 2 around the upstanding item.

A pair of chassis wheels 9 for engaging the floor surface are connected to the chassis 3. The chassis wheels 9 are located behind the side edges 5 of the chassis 3. Each chassis wheel 9 is mounted on a respective axle fitted to the chassis 3, so that the chassis wheel 9 can rotate relative to the axle, and thus relative to the chassis 3.

The chassis wheels 9 also provide support members for supporting the rolling assembly 11 as the vacuum cleaner 1 is manoeuvred over a floor surface. For increased support to the rolling assembly 11, the distance between the points of contact of the chassis wheels 9 with the floor surface is greater than that between the points of contact of the wheels 4, 4 of the rolling assembly 11 with that floor surface.

The separating apparatus 6 may be mounted on the main body 2, inlet duct 13, the chassis 3 or any other suitable component. In FIGS. 1, 2, 12 and 13 the separating apparatus 6 is mounted on the inlet duct 13. The inlet duct 13 comprises an inlet section 15 for receiving the dirt-bearing fluid flow from the hose and wand assembly, and an outlet section 17 for coupling the inlet section 15 to the separating apparatus 6 to convey the dirt-bearing fluid flow into the separating apparatus 6. The inlet section 15 is pivotably connected to the chassis 3, whereas the outlet section 17 is connected to the main body 2 of the rolling assembly 11 so that the inlet section 15 is pivotable relative to the outlet section 17. Alternatively, the outlet section 17 may be connected to the chassis 3.

In use, dust laden air drawn into the separating apparatus 6 via the hose has the dust particles separated from it in the separating apparatus 6. The dirt and dust is collected within the separating apparatus 6 while the cleaned air is channeled past the motor and fan unit 8 for cooling purposes before being ejected from the vacuum cleaner 1. The cleaned air travels from the separating apparatus 6 to the motor and fan unit 8 through a duct 10.

Figure 2:
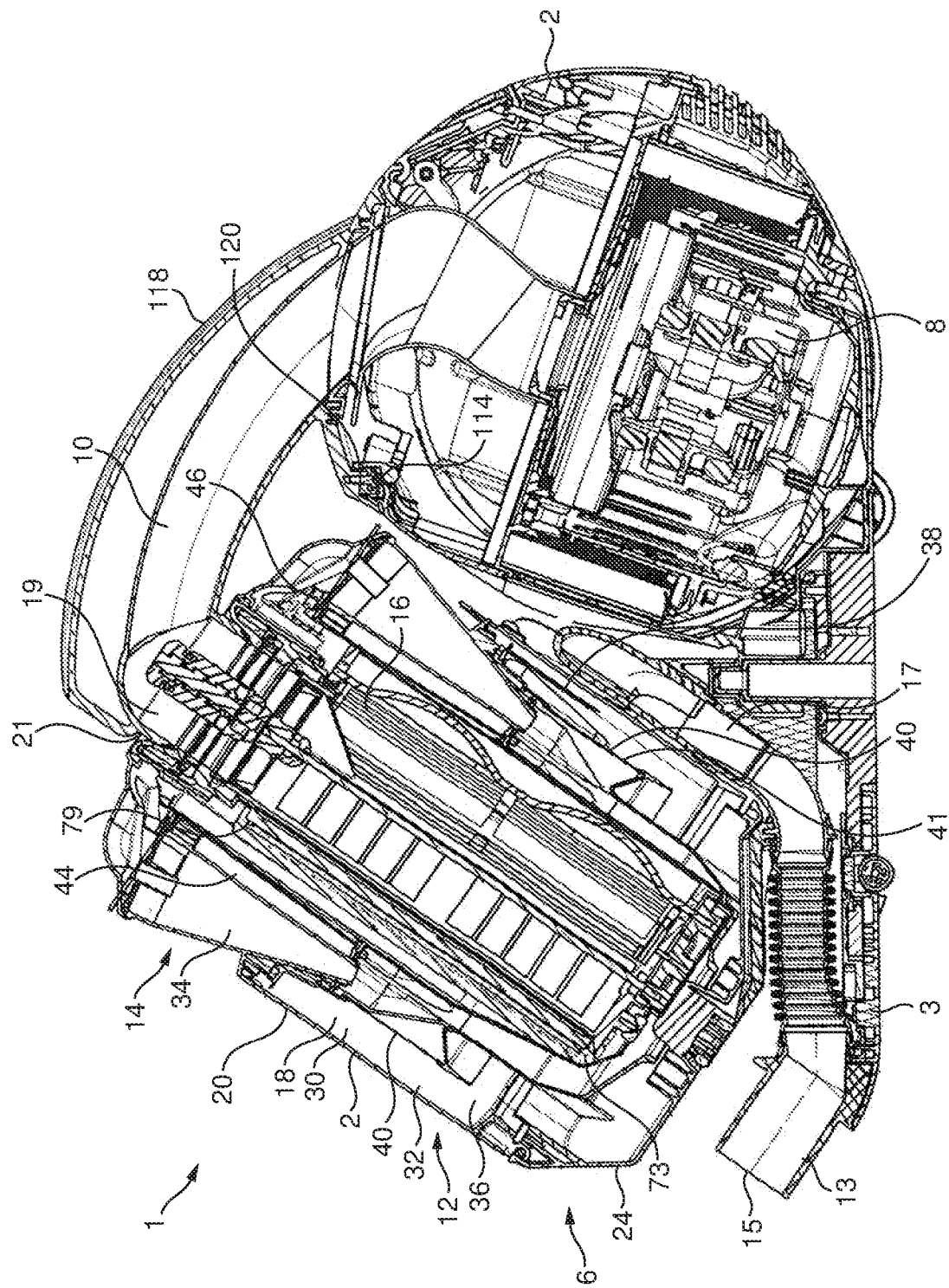
FIG. 2 is a section through the vacuum cleaner shown in FIG. 1.
Figure 3:
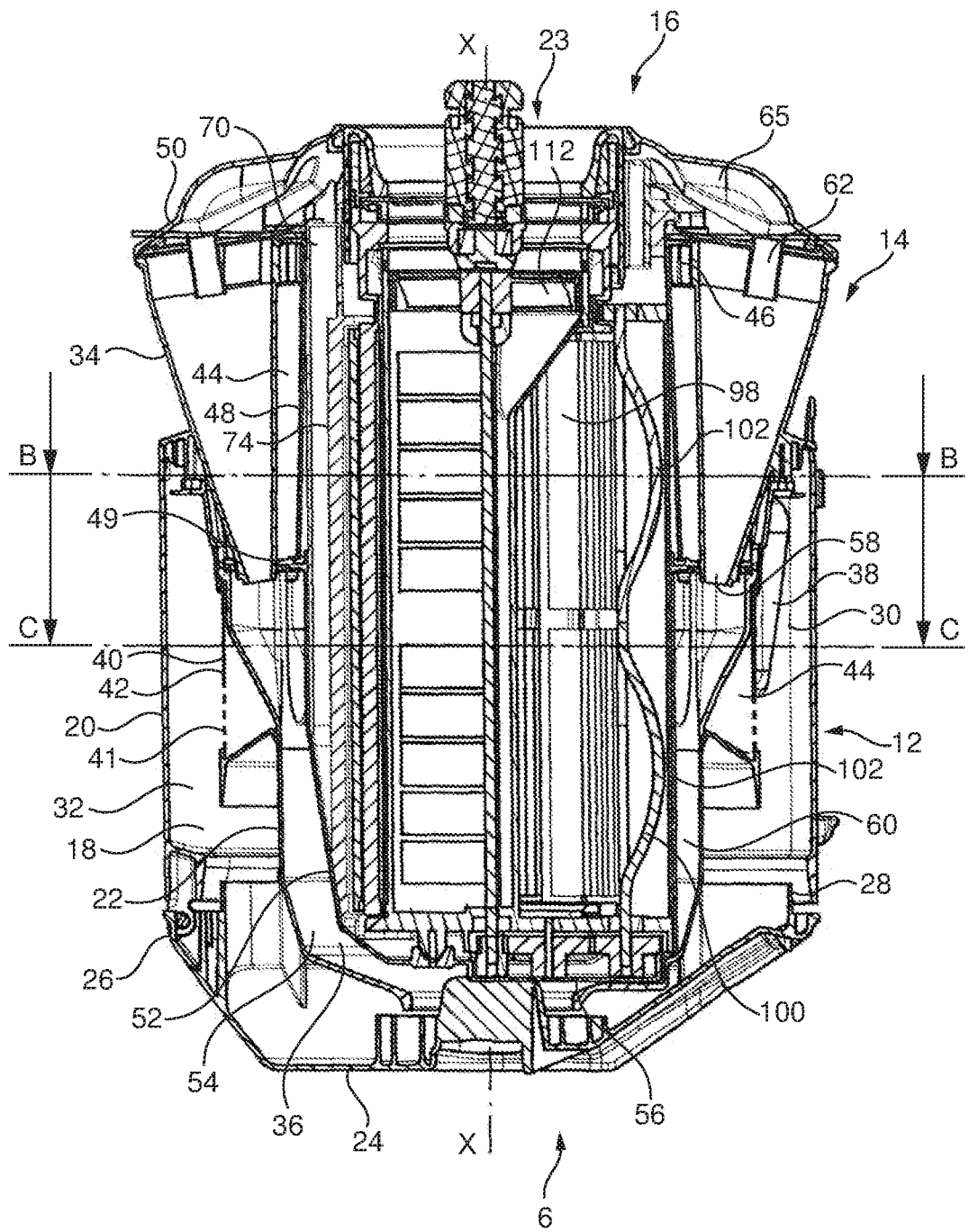
FIG. 3 is a close up of the separating apparatus shown in FIG. 2, showing the regenerative filter.
Figure 13:
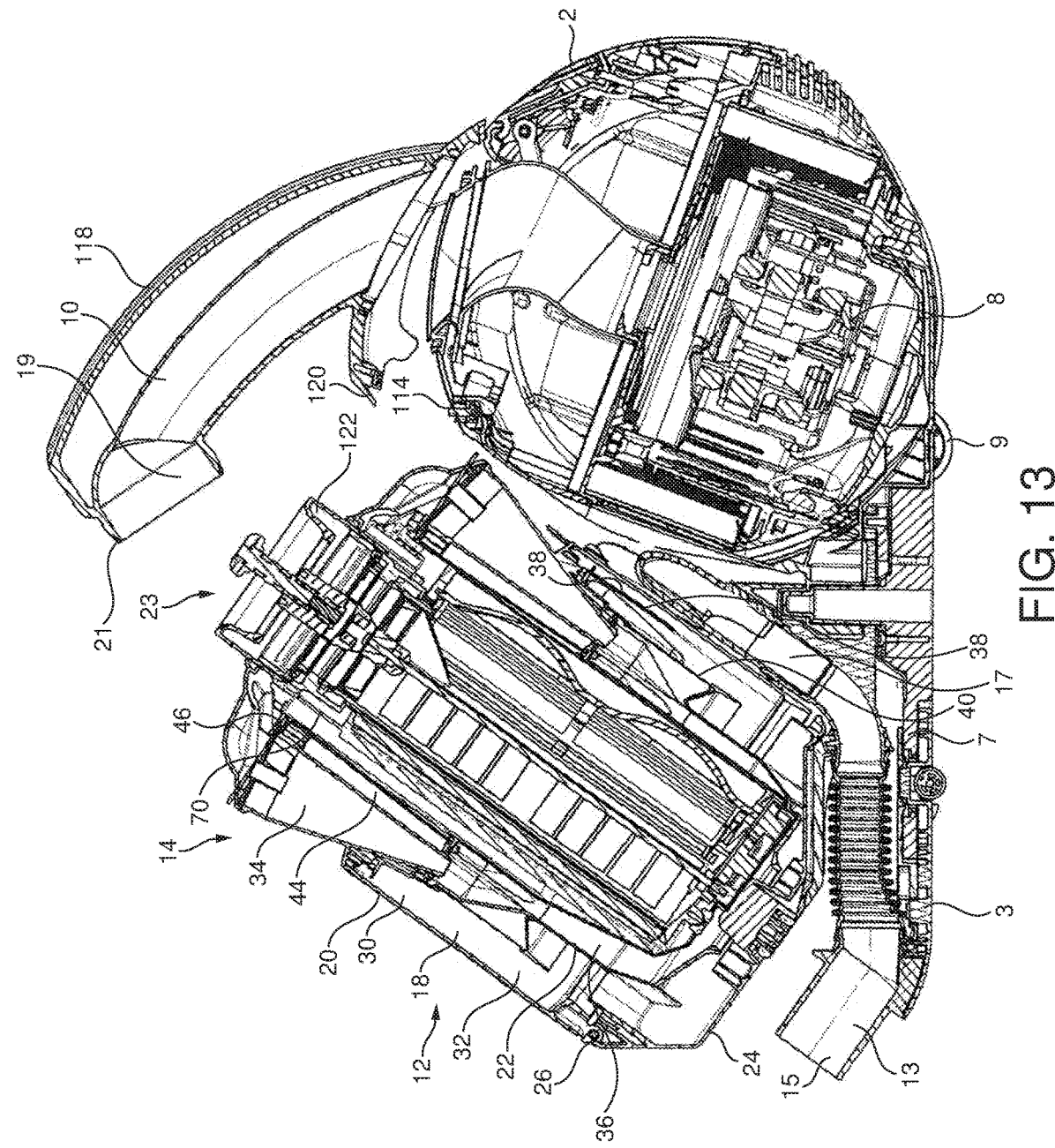
FIG. 13 shows a section through the vacuum cleaner shown in FIG. 12.
Figure 14:
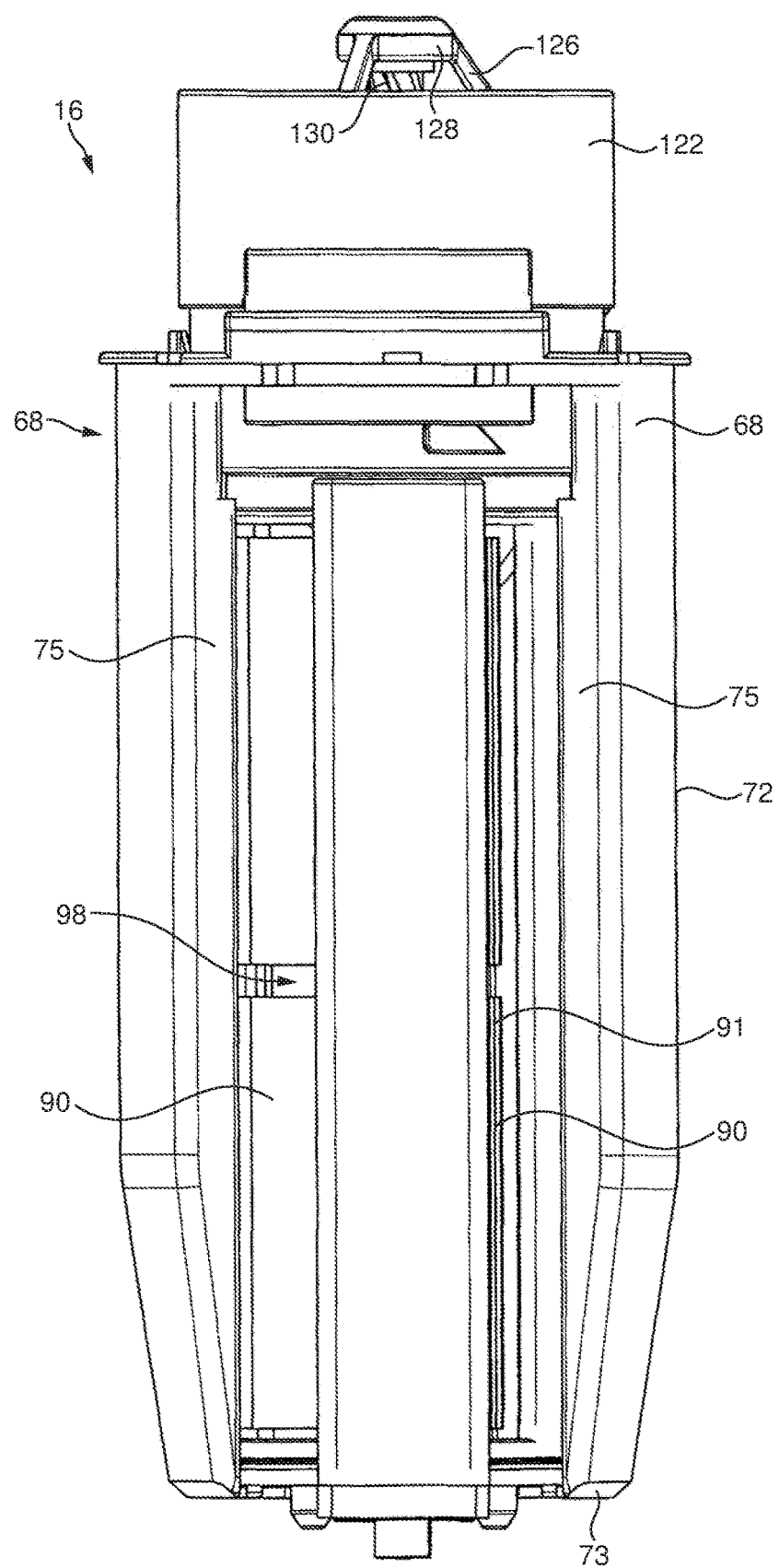
FIG. 14 shows an end elevation view of the regenerative filter shown in FIG. 13.

The separating apparatus 6 forming part of the vacuum cleaner 1 is shown in more detail in FIGS. 2, 3 and 13. The specific overall shape of the separating apparatus 6 can be varied according to the type of vacuum cleaner 1 in which the separating apparatus 6 is to be used. For example, the overall length of the separating apparatus 6 can be increased or decreased with respect to the diameter of the separating apparatus 6.

The separating apparatus 6 comprises a first cyclonic separating unit 12, a second cyclonic separating unit 14 and a regenerative filter 16.

The first cyclonic separating unit 12 can be seen to be the annular chamber 18 located between the outer wall 20 which is substantially cylindrical in shape and a middle wall 22 which is located radially inwardly from the outer wall 20 and spaced from it. The lower end of the first cyclonic separating unit 12 is closed by a base 24 which is pivotably attached to the outer wall 20 by means of a pivot 26 and held in a closed position by a catch 28. In the closed position, the base 24 is sealed against the lower ends of the walls 20, 22. Releasing the catch 28 allows the base 24 to pivot away from the outer wall 20 and the middle wall 22 for emptying the first cyclonic separating unit 12 and collection bin 36.

In this embodiment the top portion of the annular chamber 18 forms a cylindrical cyclone 30 of the first cyclonic separating unit 12 and the lower portion forms a first dust collecting bin 32. The second cyclonic separating unit 14 comprises 14 secondary cyclones 34 which are arranged in parallel and a second dust collecting bin 36.

A dust laden air inlet 38 is provided in the outer wall 20 of the cylindrical cyclone 30. The dust laden air inlet 38 is arranged tangentially to the outer wall 20 so as to ensure that incoming dust laden air is forced to follow a helical path around the annular chamber 18. A fluid outlet from the first cyclonic separating unit 12 is provided in the form of a shroud 40. The shroud 40 comprises a cylindrical wall 42 in which a large number of perforations 41 are formed. The only fluid outlet from the first cyclonic separating unit 12 is formed by the perforations 41 in the shroud 40.

A passageway 44 is formed downstream of the shroud 40. The passageway 44 communicates with the second cyclonic separating unit 14. The passageway 44 may be in the form of an annular chamber which leads to inlets 46 of the secondary cyclones 34 or may be in the form of a plurality of distinct air passageways each of which leads to a separate secondary cyclone 34.

An upper wall 48 extends downwardly from a vortex finder plate 50 which forms a top surface of each of the secondary cyclones 34. The upper wall 48 is tubular and its lower end 49 is sealed to an inner wall 52. The inner wall 52 is tubular and is located radially inwardly of the middle wall 22 and is spaced from it so as to form a second annular chamber 54 between them.

When the base 24 is in the closed position, the inner wall 52 may reach down to and be sealed against the base 24. Alternatively the wall 52 may stop short of the base 24 and may join with a filter base plate 56.

The secondary cyclones 34 are arranged in a circle substantially or totally above the first cyclonic separating unit 12. A portion of the secondary cyclones 34 may be surrounded by a portion of the top of the first cyclonic separating unit 12. The secondary cyclones 34 are arranged in a ring which is centred on the axis of the first cyclonic separating unit 12. Each secondary cyclone 34 has an axis which is inclined downwardly and towards the axis of the first cyclonic separating unit 12.

Each secondary cyclone 34 is frustoconical in shape and comprises a cone opening 58 which opens into the top of the second annular chamber 54. In use dust separated by the secondary cyclones 34 will exit through the cone openings 58 and will be collected in the second annular chamber 54. The second annular chamber 54 thus forms the second dust collecting bin 36 of the second cyclonic separating unit 14. A vortex finder 62 is provided at the upper end of each secondary cyclone 34. The vortex finders 62 may be an integral part of the vortex finder plate 50 or they may pass through the vortex finder plate 50. In the embodiment shown the vortex finders 62 fluidly connect with the regenerative filter 16.

In the embodiment shown the vortex finders 62 lead into a plenum 65 which leads to the regenerative filter 16.

It can be seen that the regenerative filter 16 is at least partially surrounded by the first and second cyclonic separating units 12, 14. The regenerative filter 16 is therefore arranged longitudinally down the centre of the separating apparatus 6 such that the secondary cyclones 34 and at least a portion of the second dust collecting bin 36 surround the regenerative filter 16. It can be seen that the secondary cyclones 34 surround a top portion of the regenerative filter 16 and the second dust collecting bin 36 surrounds a lower portion of the regenerative filter 16. It can also be seen that the regenerative filter 16 extends from near the vortex finder plate 50 to near the base 24. The first cyclonic separating unit 12 surrounds a lower portion of the secondary cyclones 34 and the second dust collecting bin 36. Thus the first cyclonic separating unit 12 also surrounds the regenerative filter 16. The first cyclonic separating unit 12, the second cyclonic separating unit 14 and the regenerative filter 16 are therefore arranged concentrically about a common central axis of the separating apparatus 6.

Figure 6:
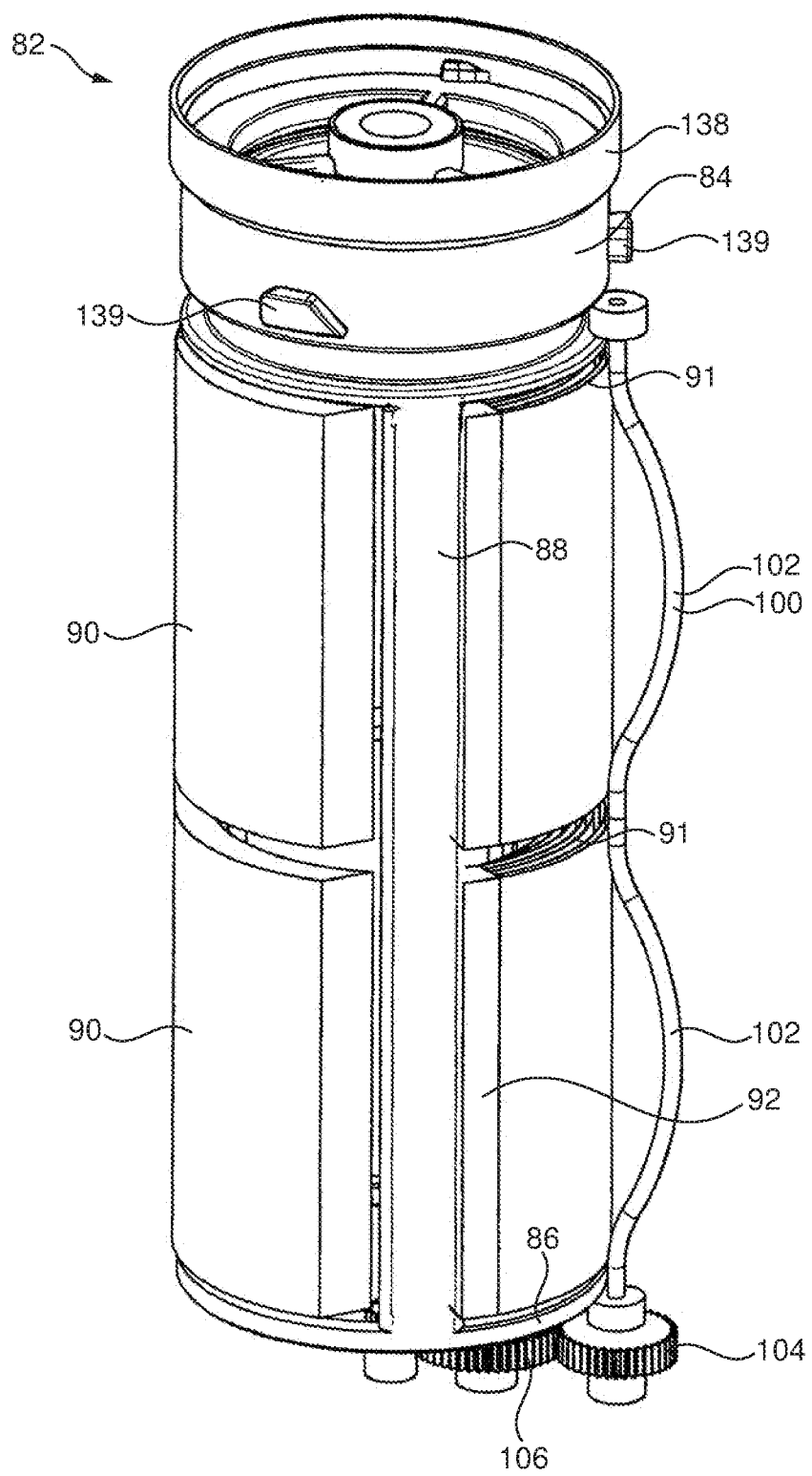
FIG. 6 shows a perspective view of the filter book frame of the regenerative filter of the first embodiment of the separating apparatus.
Figure 7:
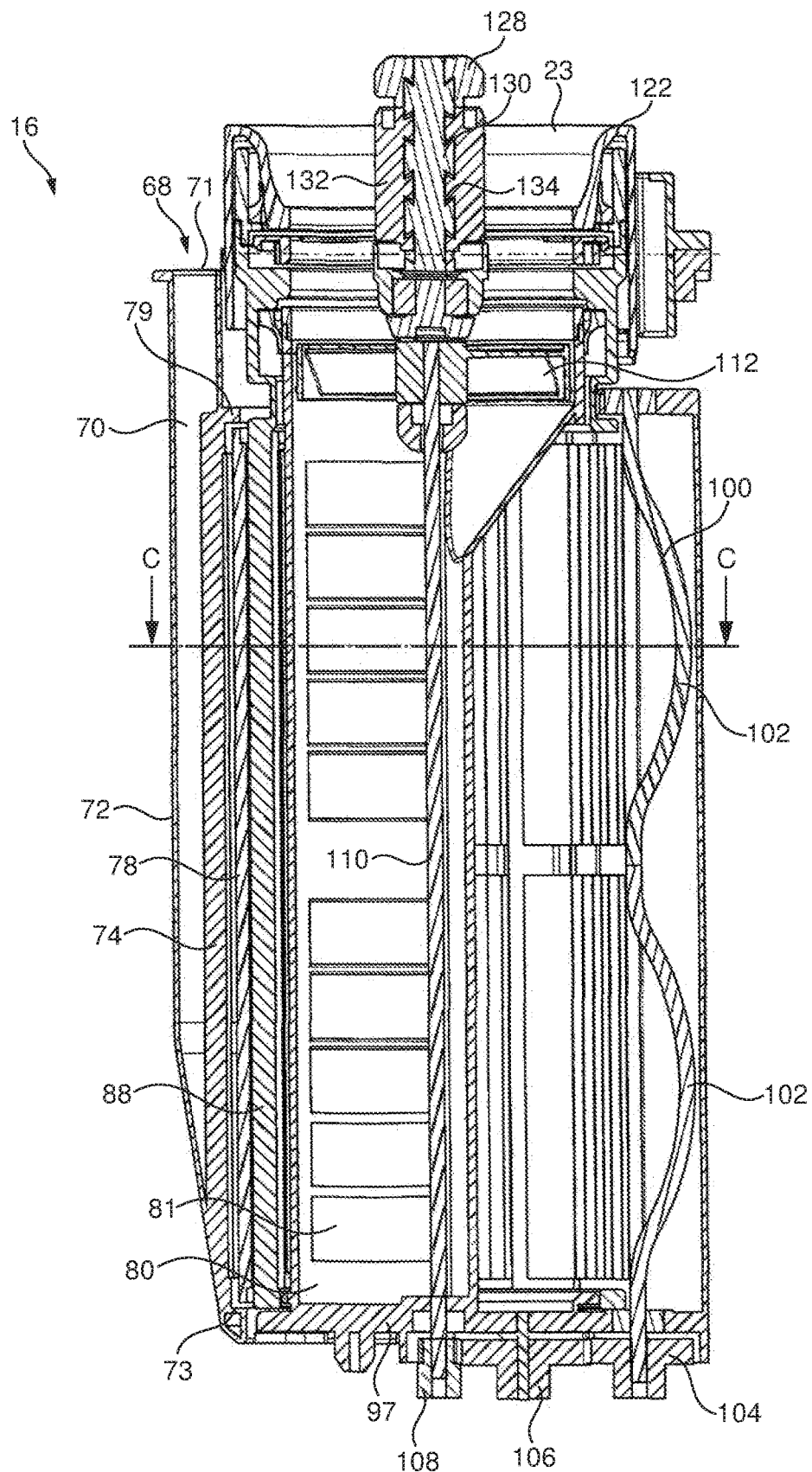
FIG. 7 shows a close up view of the regenerative filter shown in FIG. 3.
Figure 8:
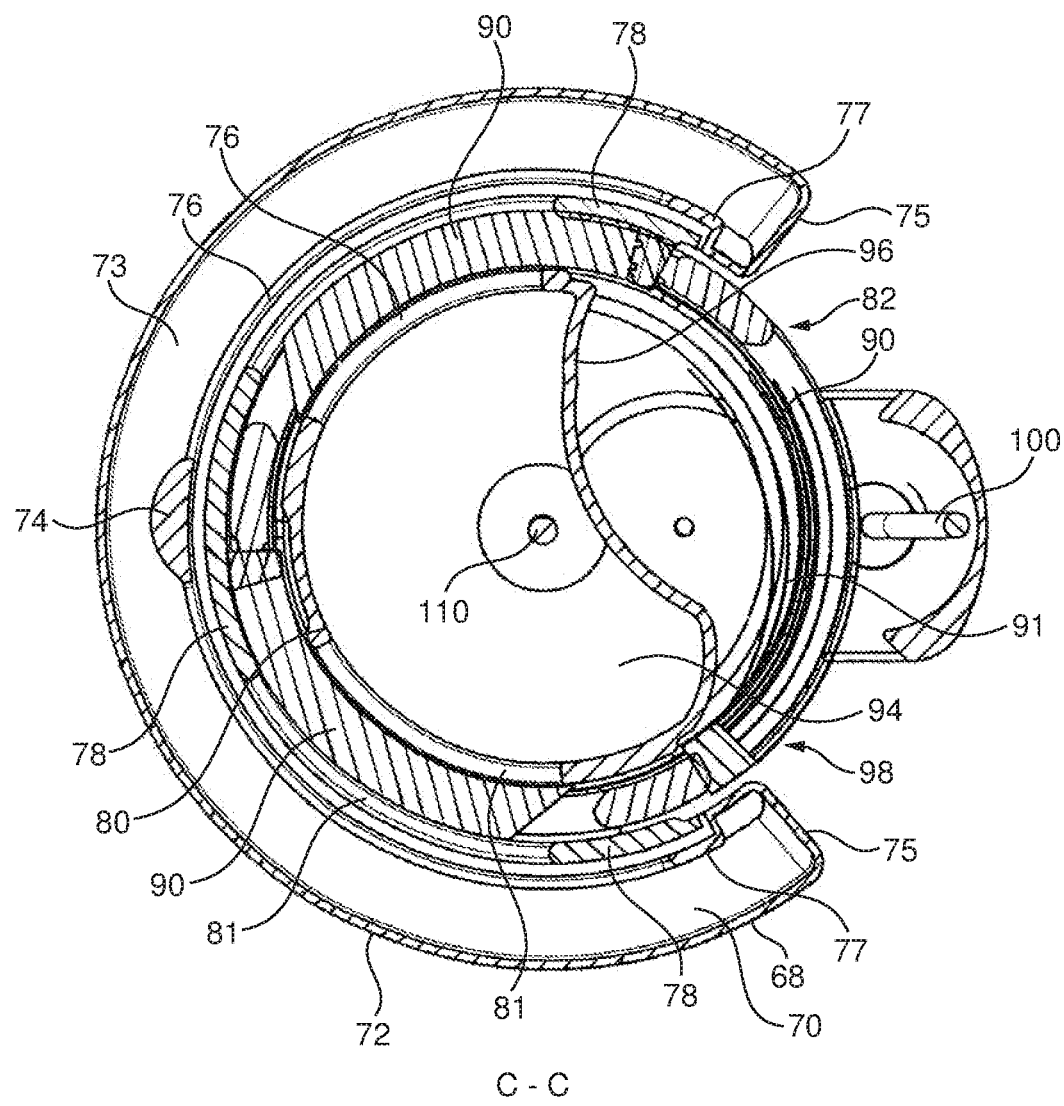
FIG. 8 shows a section through the regenerative filter shown in FIG. 7, taken along the line C-C.
Figure 9:
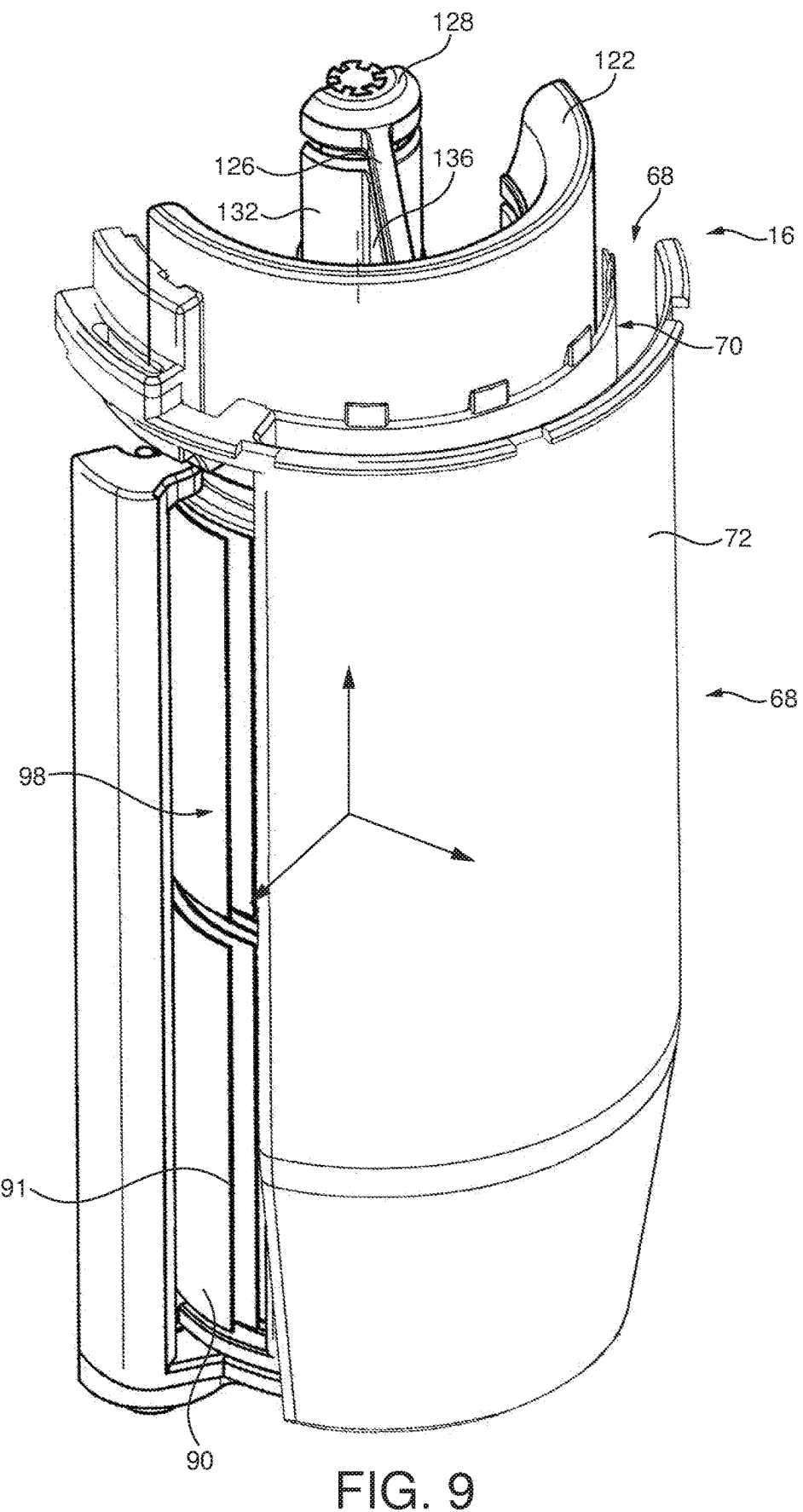
FIG. 9 shows a partial perspective view of the regenerative filter from the first embodiment of the separating apparatus.

The regenerative filter 16 is shown in more detail in FIGS. 4 to 11 and 14 to 16. The regenerative filter 16 has an inlet duct housing 68 which defines a filter inlet duct 70. It can be seen best in FIGS. 7 and 15 that the filter inlet duct 70 is elongate and extends along the length of the separating apparatus 6. From FIGS. 4, 5, 8 and 16 it can be seen that it is also horseshoe shaped when viewed in a cross section taken perpendicular to the axis X of the separating apparatus 6. The filter inlet duct 70 is in airflow communication with the plenum 65. The inlet duct housing 68 has a solid outer wall 72, a base wall 73, side walls 75 and an upper wall 79. The side walls 75 run the length of the solid outer wall 72 and project at right angles from it towards the longitudinal axis of the regenerative filter 16. The inlet duct housing 68 also comprises an apertured inner wall which as shown in FIG. 8 is in the form of a rib 74 and a pair of flanges 77. The rib 74 is located concentrically inwardly of the solid outer wall 72 opposite its centre point and upstands from the inner edge of the base wall 73. The flanges 77 depend from the side walls 75 and point towards the rib 74 along an annular path which follows the curve of the solid outer wall 72 to form the horseshoe shaped filter inlet duct 70. The upper wall 79 joins the top edges of the rib 74 and the flanges 77 following an annular path.

During use of the vacuum cleaner 1, air can pass from the plenum 65 into the top of the filter inlet duct 70 anywhere along its upper opening 71. Air then passes out of the inlet duct 70 through the apertured inner wall between the rib 74 and flanges 77.

Located concentrically inwardly of the filter inlet duct 70 is a filter cage 76. The filter cage can be seen best in FIG. 8. An outer filter cage wall 78 which is also horseshoe shaped in cross section is held in place against the apertured inner wall by the rib 74, the upper wall 79, the base wall 73 and the flanges 77. This outer filter cage wall 78 has a plurality of rectangular shaped apertures 81. An inner filter cage wall 80 is provided concentrically inwardly of the outer filter cage wall 78. The inner filter cage wall 80 has a plurality of rectangular shaped apertures 81. The apertures 81 on the outer filter cage wall 78 may correspond in shape, size and/or position to the apertures 81 on the inner filter cage wall 80. The apertures 81 could of course be of other shapes such as square or diamond shaped.

The filter cage 76 is arranged such that the inner filter cage wall 80 is spaced from the outer filter cage wall 78 by a distance which is just wide enough to house a portion of a cylindrical tube shaped filter book frame 82. The filter cage 76 is arranged to be fixed in place such that it does not move with respect to the remainder of the separating apparatus 6. The filter book frame 82 is arranged such that it can rotate within the filter cage 76 when desired. The mechanism by which the filter book frame 82 can be moved and the filter cage 76 is fixed will be discussed in more detail later.

The filter book frame 82 is shown best in FIG. 6. The filter book frame 82 is formed from an open cylindrical top portion 84, an open cylindrical bottom portion 86 and three support struts 88 which join the top portion 84 to the bottom portion 86. The support struts 88 are spaced equally around the circumference of the filter book frame 82. Attached to each of the support struts 88 is a pair of filter books 90 spaced axially along the length of the support struts 88. Each filter book 90 is constructed from a plurality of square or rectangular leaves of filter material 91 which are bound along one edge into a book spine 92. The leaves may be bound to form the spine 92 by stitching, gluing or any other suitable technique. These multiple layers can work in combination to capture dust particles much smaller than the nominal mesh hole size. The multiple layers may capture the dust particles by impaction, where dust particles above a certain size have momentum such that they cannot follow the airflow to divert around obstructive fibers, or by interception, where the dust particles have a sufficient size so that even if they follow air streams around obstructive fibers, they still touch the fiber and are trapped.

The book spines 92 are attached to the support struts 88. The book spines 92 may be attached to the support struts 88 by overmoulding, stitching, gluing or any other suitable technique. In total this means that there are six filter books 90 arranged in three sets of two filter books 90, with two filter books 90 attached to each support strut 88. It is of course possible to have only a single filter book 90 attached to each support strut 88. It is also possible that the regenerative filter 16 could have less or more than three support struts 88, each of which may have one or more filter books 90.

Figure 4:
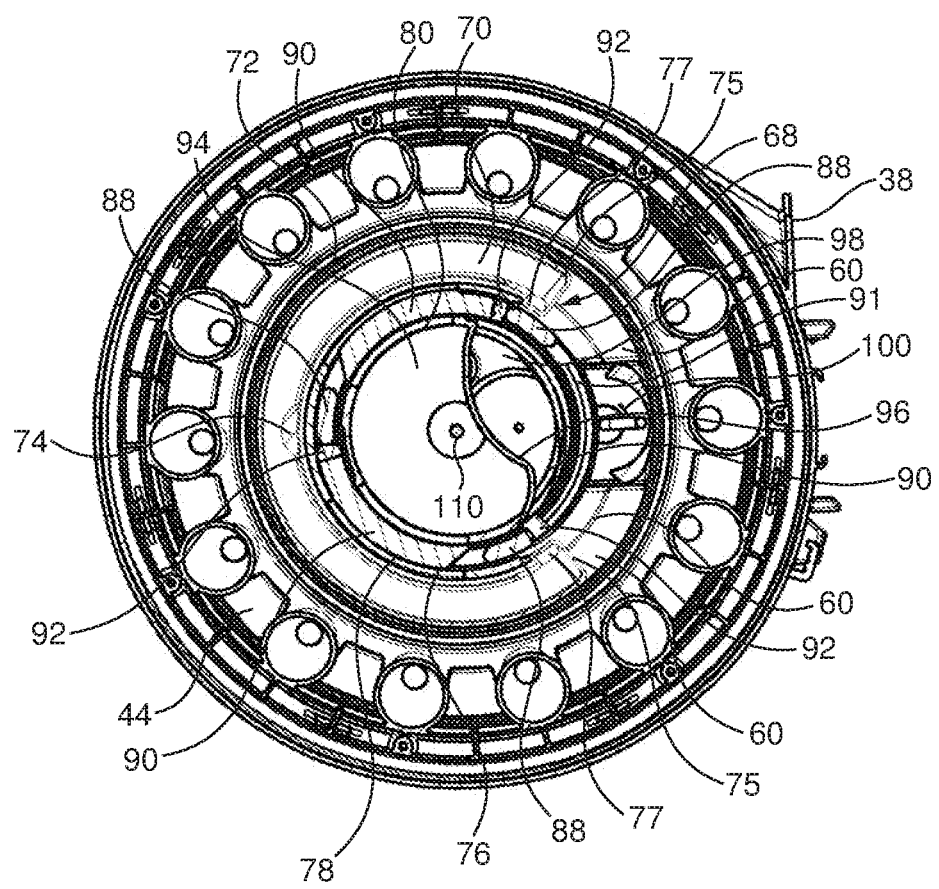
FIG. 4 shows a section through the separating apparatus shown in FIG. 3, taken along the line B-B.
Figure 5:
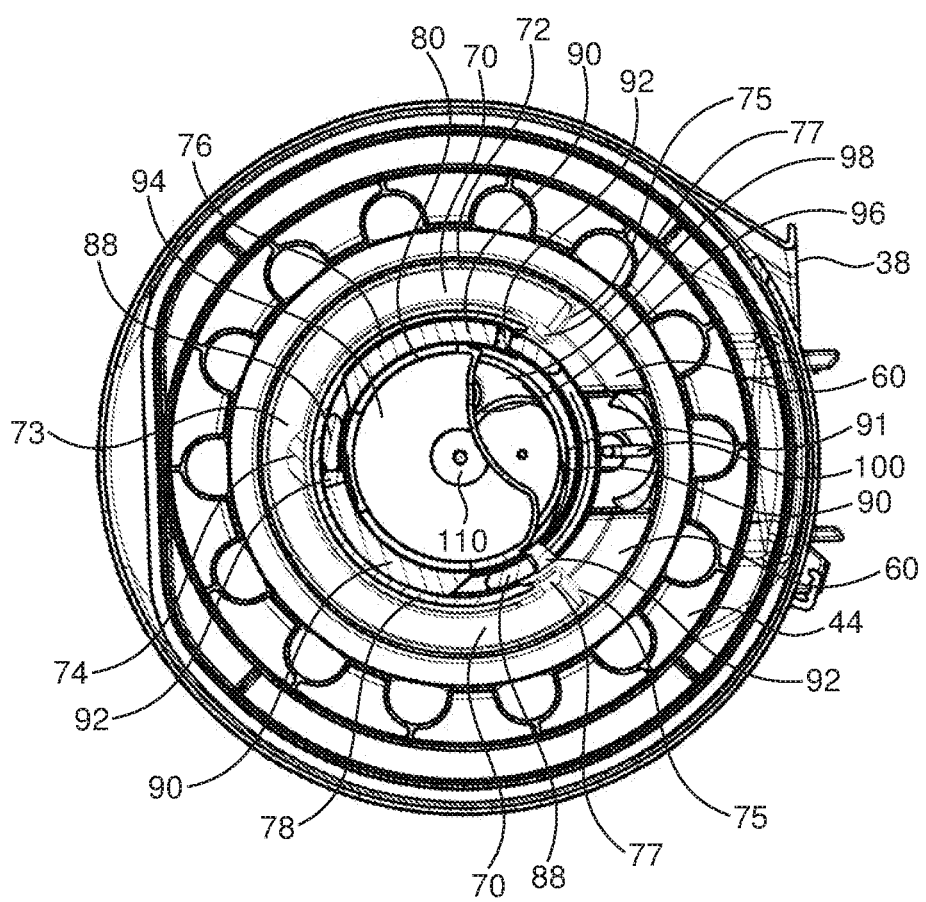
FIG. 5 shows a section through the separating apparatus shown in FIG. 3, taken along the line C-C.

As shown best in FIGS. 4, 5 and 8 it can be seen that at any one time four filter books 90 will be housed between the outer and inner cage walls 78, 80 of the filter cage 76. When the filter books 90 are housed in the filter cage 76 they are held on both their internal and external faces by the inner and outer walls 78, 80 of the filter cage 76 which serves to compress the leaves of filter material 91 of the filter books 90 to minimize and preferably remove any gaps between adjacent leaves of the filter material 91. These compressed filter books 90 are in their filtering configuration and can be used to filter dirty air passing from the filter inlet duct 70.

The inner filter cage wall 80 also forms a portion of an outlet duct 94 of the separating apparatus 6. The outlet duct 94 is tubular in shape but has a generally crescent moon shape when viewed in a cross section taken perpendicular to the longitudinal axis of the separating apparatus 6. The partially cylindrical portion of the outlet duct 94 is formed from the inner filter cage wall 80 and the remainder of outlet duct 94 is formed from an inwardly curving solid wall 96. An outlet duct base plate 97, which can be seen best in FIG. 7, is positioned at the lower end of the outlet duct 94 to seal its lower end to ensure that all air that has passed through the regenerative filter 16 passes out through the open upper end 23 of the regenerative filter 16. The outlet duct base plate 97 also extends outwardly to close the lower end of the filter cage 76 to ensure that in use all air passes through the filter books 90.

Figure 15:
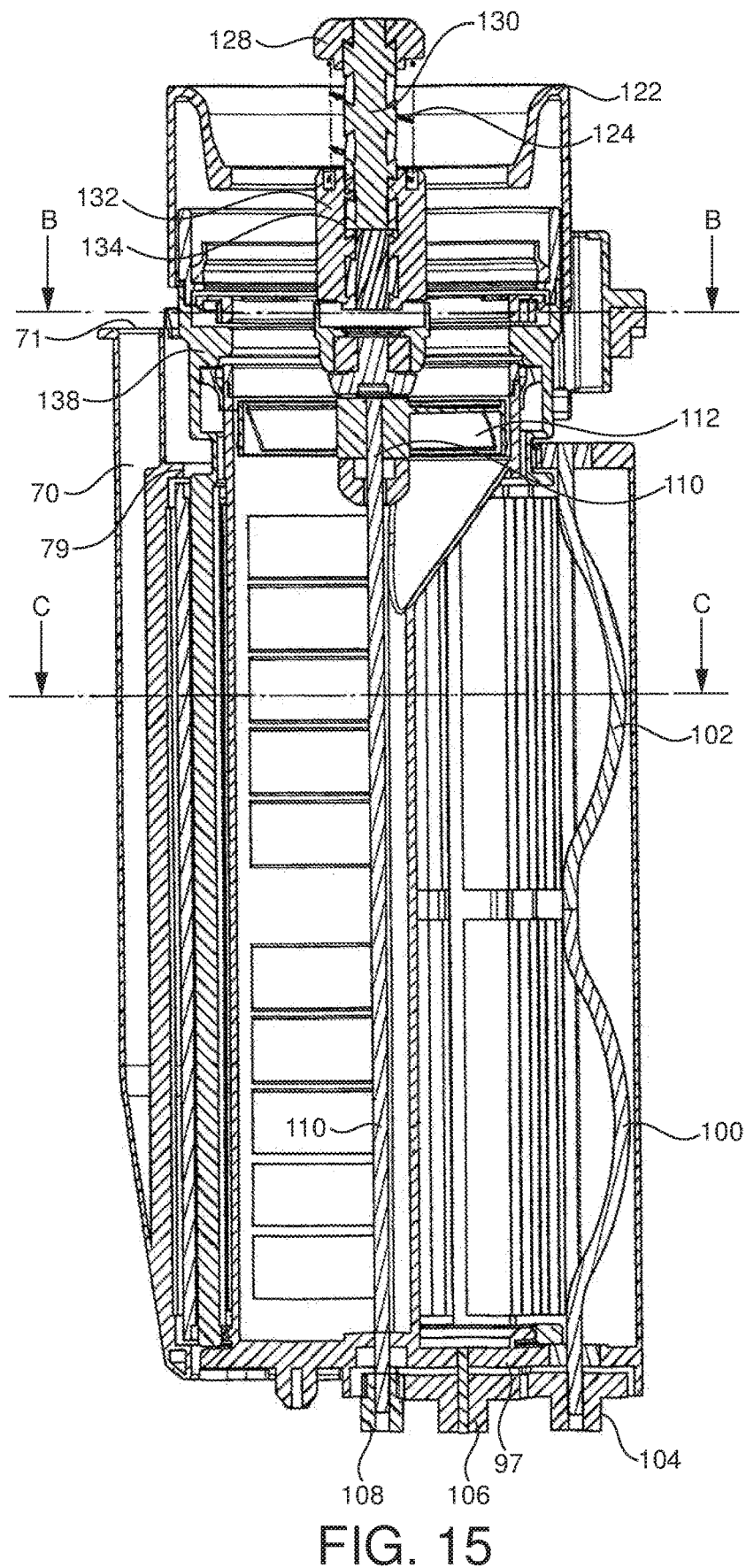
FIG. 15 shows an enlarged view of the regenerative filter shown in FIG. 13.
Figure 16:
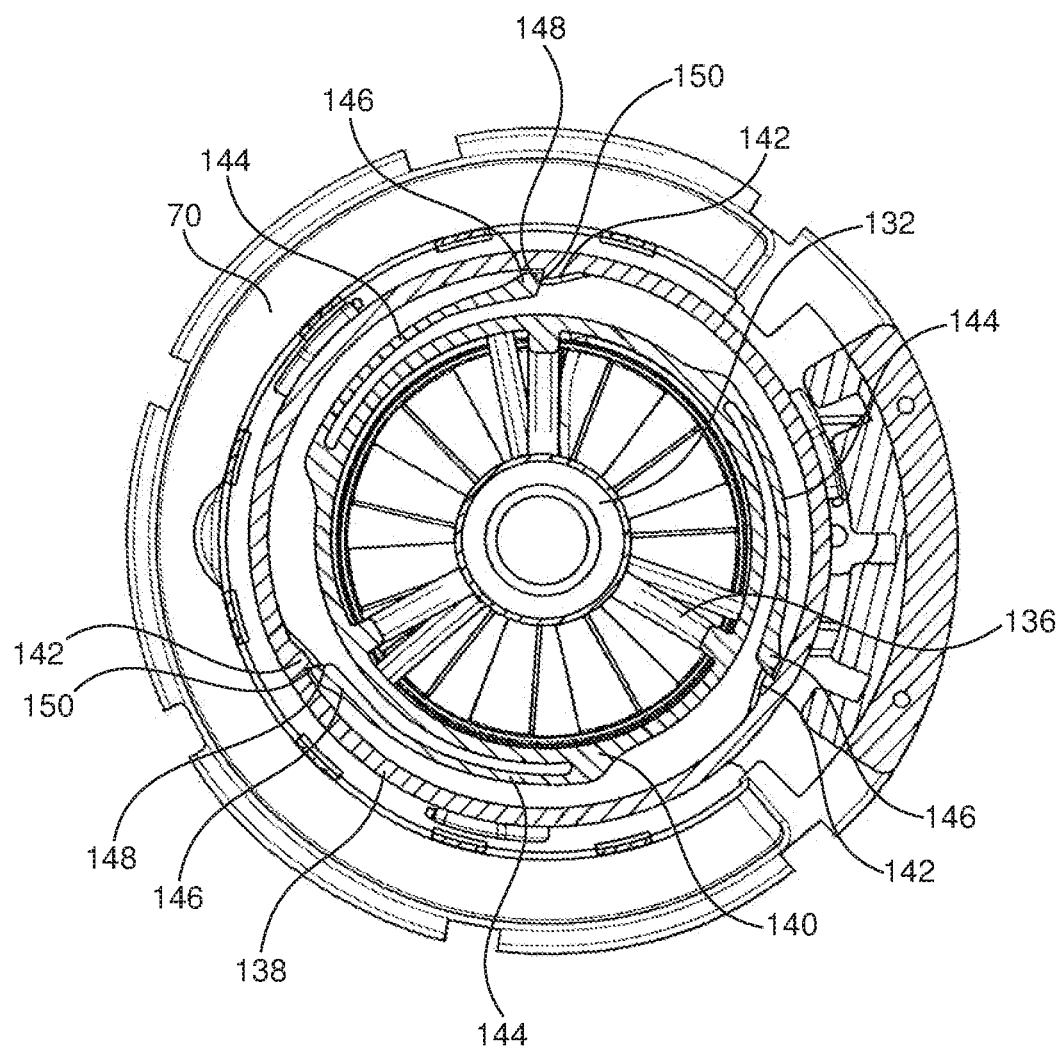
FIG. 16 shows a section through the regenerative filter shown in FIG. 15, taken along the line B-B.

The remaining two filter books 90 are housed in a regeneration chamber 98. The regeneration chamber 98 is elongate in shape. The filter books 90 which are housed in the regeneration chamber 98 are not compressed and therefore there are gaps between one or more of the leaves of filter material 91. A beater bar 100 runs along the length of the regeneration chamber 98. The beater bar 100 is elongate and sinuous. In FIGS. 7 and 15 it can be seen that the beater bar 100 has two outwardly projecting beater portions 102. The beater bar 100 is mounted at its base on a beater bar gear 104. This beater bar gear 104 forms part of a gear train comprising an intermediary gear 106 and a primary gear 108. The primary gear 108 is mounted on a rotatable shaft 110 which runs through the centre of the outlet duct 94 and is connected at its upper end to a turbine 112. In use of the vacuum cleaner 1, air which has passed through the filter books 90 and into the outlet duct 94 travels upwardly through the turbine 112. This causes the rotatable shaft 110 to rotate which in turn, via the gear train, causes the beater bar 100 to rotate. As the beater bar 100 rotates the outwardly projecting beater portions 102 hit the filter books 90 which are housed in the regeneration chamber 98. Any dust which has lodged on the filter books 90 can therefore be dislodged by the beater bar 100. In this way the filter books 90 housed in the regeneration chamber 98 can be cleaned and regenerated when the vacuum cleaner is being used to clean a surface. Any dust dislodged by the beater bar 100 falls into the dust collecting chamber 36 of the second cyclone separating unit 14. The turbine 112 and the rotatable shaft 110 are centered on the longitudinal axis of the separating apparatus 6.

During use of the embodiment described above, dust laden air enters the separating apparatus 6 via the dust laden air inlet 38 and, because of the tangential arrangement of the inlet 38, the dust laden air follows a helical path around the outer wall 20 of the first cyclonic separating unit 12. Larger dirt and dust particles are deposited by cyclonic action in the annular chamber 18 and collected in the first dust collecting bin 32. The partially-cleaned dust laden air exits the annular chamber 18 via the perforations 41 in the shroud 40 and enters the passageway 44. The partially-cleaned dust laden air then passes into tangential inlets 46 of the secondary cyclones 34. Cyclonic separation is set up inside the secondary cyclones 34 so that separation of some of the dust particles which are still entrained within the airflow occurs. The dust particles which are separated from the airflow in the secondary cyclones 34 are deposited in the second annular chamber 54 which forms at least part of the second dust collecting bin 36 of the second cyclonic separating unit 14. The further cleaned dust laden air then exits the secondary cyclones 34 via the vortex finders 62 into the plenum 65. The further cleaned dust laden air then passes into the regenerative filter 16. The further cleaned dust laden air passes out of the plenum 65 and down the filter inlet duct 70. The air then travels through the filter cage 76 and through the filter books 90 which are housed in the filter cage 76. Dirt and dust is deposited on the leaves of filter material 91 as the dust laden air passes through the filter books 90. The further cleaned air then travels up through the outlet duct 94 and through the turbine 112. As stated above, air passing through the turbine 112 causes the rotatable shaft 110 to rotate which rotates the primary gear 108. The gear train which is connected to this primary gear 108 causes the beater bar 100 to rotate. As the beater bar 100 rotates, the projecting beater portions 102 bump into the leaves 91 of filter material of the filter books 90 which are located in the regeneration chamber 98. This bumping causes the leaves 91 of the filter book 90 to shake and move resulting in any dirt and dust deposited on the leaves 91 being removed. The dust and dirt falls from the leaves 91 into the second dust collecting bin 36. This filtering and regeneration continues as the vacuum cleaner 1 is being used to clean a surface.

At any one time four filter books 90 are located in the filter cage 76 and two filter books 90 are located in the regeneration chamber 98 for regeneration. It is however possible to move the filter book frame 82 with its attached filter books 90 through the filter cage 76 such that two of the filter books 90 which have been used for filtration can be moved to the regeneration chamber 98 for cleaning. At the same time, the filter books 90 which have been regenerated in the regeneration chamber 98 can be moved into the filter cage 76 to provide a regenerated filter for use in filtering dirty air. The filter cage 76 remains stationary during movement of the filter book frame 82. This operation of moving the filter frame 82 and thus the filter books 90 can be repeated as many times as desired.

Movement of the filter book frame 82 and thus the filter books 90 is controlled by a mechanism which is activated when the duct 10 is connected to the separating apparatus 6. This mechanism will be described in detail below.

The duct 10 has an air inlet 19 which comprises an annular sealing member 21 for engaging the open upper end 23 of the outlet duct 94 of the separating apparatus 6. With reference to FIGS. 1, 2, 12 and 13 it can be seen that the air inlet 19 of the duct 10 is generally dome-shaped, and enters the separating apparatus 6 through the open upper end 23 of the regenerative filter 16 to engage the sealing member 21 and form an air-tight seal therewith. The sealing member 21 may be overmoulded with the duct 10 during assembly, or otherwise attached to the duct 10. Alternatively, the sealing member 21 may be integral with or attached to the open upper end 23 of the regenerative filter 16.

The duct 10 is generally in the form of a curved arm extending between the separating apparatus 6 and the rolling assembly 11. The duct 10 is moveable relative to the separating apparatus 6 to allow the separating apparatus 6 to be removed from the vacuum cleaner 1. The end of the duct 10 which is remote from the air inlet 19 of the duct 10 is pivotably connected to the main body 2 of the rolling assembly 11 to enable the duct 10 to be moved between a lowered position in which the duct 10 is in fluid communication with the separating apparatus 6, and a raised position which allows the separating apparatus 6 to be removed from the vacuum cleaner 1.

The duct 10 is biased towards the raised position by a resilient member located on the main body 2. The main body 2 comprises a biased catch 114 for retaining the duct 10 in the lowered position against the force of the resilient member, and a catch release button 116. The duct 10 comprises a handle 118 to allow the vacuum cleaner 1 to be carried by the user when the duct 10 is retained in its lowered position. Alternatively, the duct 10 may be used to carry the vacuum cleaner 1. The catch 114 is arranged to co-operate with a finger 120 connected to duct 10 to retain it in its lowered position. Depression of the catch release button 116 causes the biased catch 114 to move away from the finger 120, against the biasing force applied to the catch 114, allowing the resilient member to move the duct 10 to its raised position.

Figure 12:
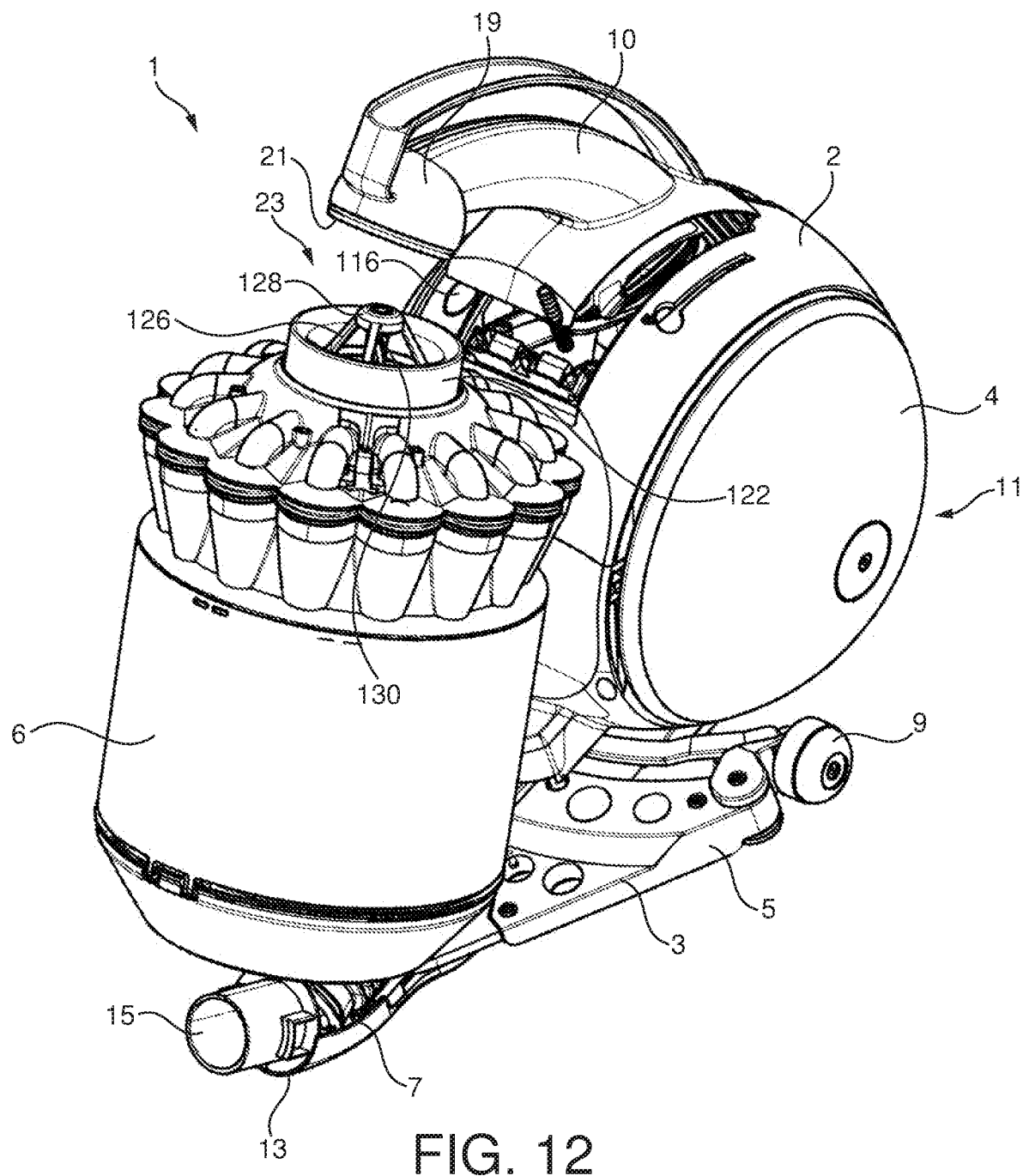
FIG. 12 shows a perspective view of the vacuum cleaner shown in FIG. 1 with the duct 10 in the raised position.

FIGS. 1 and 2 show the vacuum cleaner 1 when the duct 10 is in its lowered position and FIGS. 12 and 13 show the vacuum cleaner 1 when the duct 10 is in its raised position. FIGS. 1 to 11 show positions of various components of the vacuum cleaner 1 when the duct 10 is in the lowered position. FIGS. 12 to 16 show positions of various components of the vacuum cleaner 1 when the duct 10 is in the raised position. In FIG. 15 where the duct 10 would be in its raised position it can be seen that the separating apparatus 6 has a top cap 122 which is urged upwardly by a spring 124. The top cap 122 has three arms 126 which project inwardly and upwardly towards the central axis of the separating apparatus 6. These arms 126 can be seen best in FIGS. 12 and 14. These arms 126 join at a screw shaft cap 128. The screw shaft cap 128 houses the top portion of a screw shaft 130. The screw shaft 130 and top cap 122 are fixed relative to each other and are locked rotationally with respect to the axis of the separating apparatus 6.

The top cap 122 has three projections 123 which project outwardly from the outer surface 125 of the top cap 122. These can be seen best in FIG. 11. These projections 123 locate within three corresponding indents 127 which are located on an inner surface 129 of a rotation prevention lock 131. This rotation prevention lock 131 is fixed to the solid outer wall 72 of the inlet duct housing 68. The indents 127 are elongate extending along the length of the top cap 122 parallel to the longitudinal axis of the separating apparatus 6 and allow the projections 123 space to travel up and down them. The inlet duct housing 68 forms part of the regenerative filter 16. The regenerative filter 16 is non cylindrical and so when it is positioned within the separating apparatus 6 it is unable to rotate thus ensuring that even though the top cap 122 can move up and down, it and filter cage 76 cannot rotate.

The lower end of the screw shaft 130 is located within an internal shaft 134 of a pawl drive collar 132. The internal shaft 134 of the pawl drive collar 132 has spiral grooves which correspond to spiral grooves on the screw shaft 130. The pawl drive collar 132 is attached by three pawl drive arms 136 which extend downwardly and away from the longitudinal axis of the separating apparatus 6. These pawl drive arms can be seen best in FIG. 16. The pawl drive arms 136 join a pawl drive housing 140 which is ring shaped and sits inside a rotation cage 138 which is attached to the top of the filter book frame 82. The rotation cage 138 has three lugs 142 which project inwardly from its inner surface towards the pawl drive housing 140. The pawl drive housing 140 has three elongate resilient members 144 which are connected at one end to the pawl drive housing 140. Elongate resilient members 144 are equally spaced around the inner surface of the pawl drive housing 140. Each elongate resilient member 144 extends from the pawl drive housing 140, following the annular curve of the pawl drive housing 140 in a clockwise direction. At the end of each of the elongate resilient members 144 is a pawl 146. In the configuration shown in FIG. 16 where the duct 10 is raised an abutting surface 148 of each pawl 146 rests against a stop surface 150 of a respective lug 142. In this arrangement the filter book frame 82 is held in a fixed position. In this position the separating apparatus 6 can be removed from the remainder of the vacuum cleaner 1 and the first and second dust collecting bins 32, 36 can be emptied by releasing catch 28 to allow the base 24 to pivot away from the outer, middle and inner walls 20, 22, 52 thus allowing any dust collected in the dust collecting bins 32, 36 to fall out of the separating apparatus 6.

After a user has emptied the dust collecting bins 32, 36 the separating apparatus 6 must be put back on to the remainder of the vacuum cleaner 1 before it can be used again. This therefore is a good time to move the filter book frame 82 to move at least some of the used filter books 90 into the regeneration chamber 98 whilst at the same time moving the filter books 90 which were regenerated during the previous vacuum cleaning operation to be moved into the filter cage 76 for use as a filter. This movement happens automatically when the duct 10 is moved to its closed position.

Figure 10:
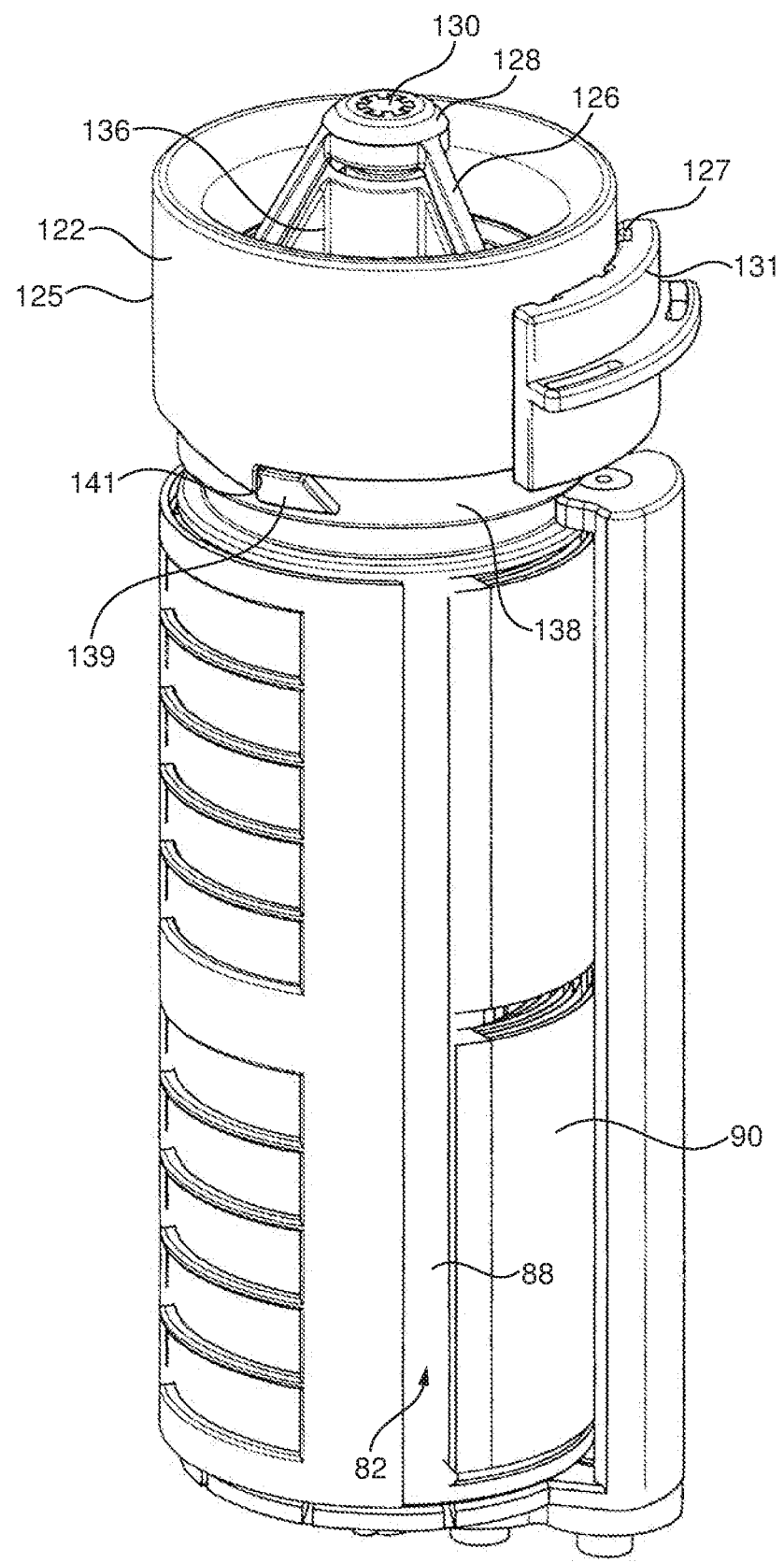
FIG. 10 shows a perspective view of the filter cage of the regenerative filter of the first embodiment of separating apparatus.
Figure 11:
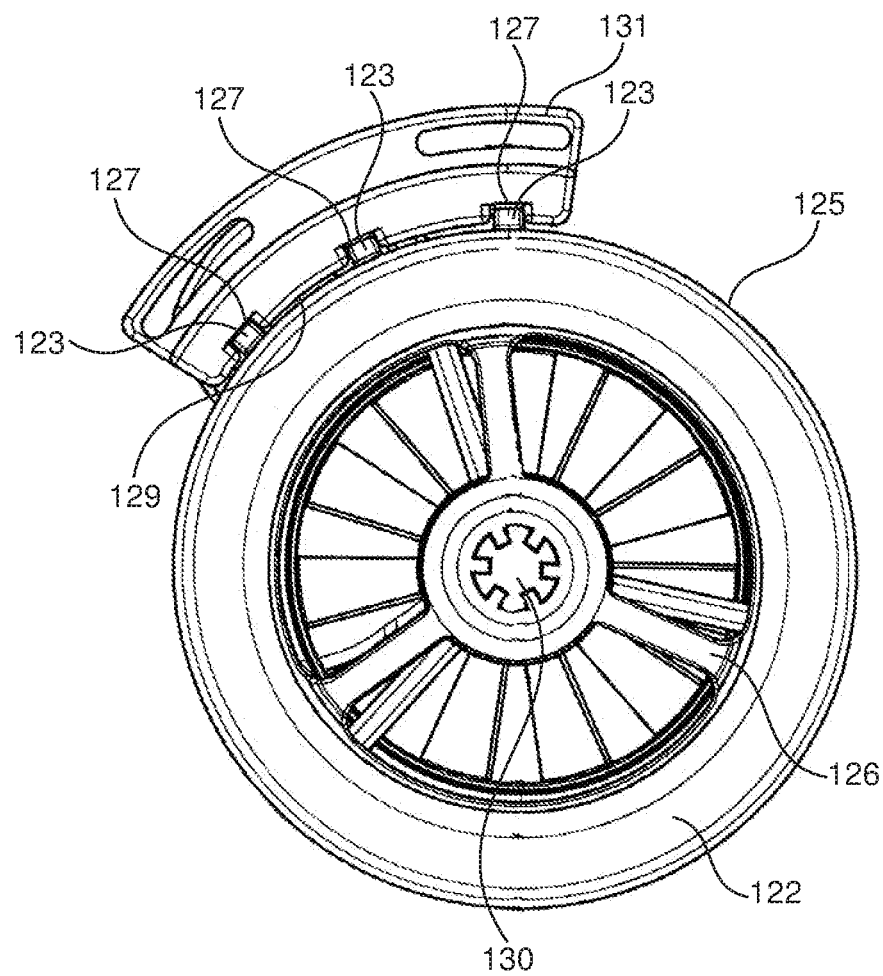
FIG. 11 shows a top elevation view of the filter cage shown in FIG. 10.

When duct 10 is pushed downward the air inlet 19 pushes against the sprung top cap 122. Pushing down on the top cap 122 causes the screw threads on the screw shaft 130 and the internal shaft 134 to engage. As stated earlier the screw shaft 130 is fixed and locked rotationally with respect to the axis of the separating apparatus 6 thus as the screw shaft is forced downwards the pawl drive collar 132, the pawl drive arms 136 and thus the pawl drive housing 140 are all forced to rotate in an clockwise direction. The abutting surface 148 of the pawls 146 therefore push on the stop surfaces 150 of the lugs 142 causing a rotation cage 138 to rotate. The rotation cage 138 is attached to the top of the filter book frame 82 and thus the filter book frame 82 and the filter books 90 which it holds also rotate. Over-rotation prevention lugs 139, which can be seen in FIGS. 6 and 10, are provided on the external surface of the rotation cage 138 to prevent over rotation of the rotation cage 138. These over-rotation prevention lugs 139 engage with notches 141 cut out from the lowermost edge of the top cap 122. This can be seen best in FIG. 10.

This rotation of the filter book frame 82 results in two axially arranged filter books 90 being moved from the filter cage 76 into the regeneration chamber 98 and the two axially arranged filter books 90 which were arranged in the regeneration chamber 98 being moved into the filter cage 76 for use as a filter. The filter books 90 which have been moved into the regeneration chamber 98 will then be cleaned by the action of the beater bar 100 during the next vacuum cleaning operation.

When a user desires to remove the separating apparatus 6 for bin emptying, they will press the catch release button 116 causing the biased catch 114 to move away from the finger 120, against the biasing force applied to the catch 114, allowing the resilient member to move the duct 10 to its raised position. As this happens spring 124 acts on the screw shaft cap 128 forcing it, the screw shaft 130 and the top cap 122 upwardly. Moving the screw shaft 130 upwardly causes the pawl drive collar 132 to rotate in an anti-clockwise direction. Moving the pawl drive collar 132 in an anti-clockwise direction causes the pawl drive housing 140 and the resilient members 144 to move in an anti-clockwise direction. During this anti-clockwise movement the elongate resilient members 144 are able to flex such that the pawls 146 move over the lugs 142. This means that the pawls 146 do not push against the lugs 142 and thus the rotation cage 138 does not rotate. This means that when the duct 10 is opened the filter books 90 remain in a fixed position. When the duct 10 is closed the filter books 90 rotate.

It will be appreciated from the description that the separating apparatus 6 includes two distinct stages of cyclonic separation and a distinct stage of filtration through leaves 91 of filter material. The first cyclonic separating unit 12 comprises a single cylindrical cyclone 30. The relatively large diameter of the outer wall 20 of which means that comparatively large particles of dirt and debris will be separated from the air because the centrifugal forces applied to the dirt and debris are relatively small. Some fine dust will be separated as well. A large proportion of the larger debris will reliably be deposited in the first dust collecting bin 32.

There are 14 secondary cyclones 34, each of which has a smaller diameter than the cylindrical cyclone 30 and so is capable of separating finer dirt and dust particles than the cylindrical cyclone 30. They also have the added advantage of being challenged with air which has already been cleaned by the cylindrical cyclone 30 and so the quantity and average size of entrained dust particles is smaller than would otherwise have been the case. The separation efficiency of the secondary cyclones 34 is considerably higher than that of the cylindrical cyclone 30 however some small particles will still pass through the secondary cyclones 34 to the regenerative filter 16.

A second embodiment of a separating apparatus 206 is shown in FIGS. 17 to 26. It can be seen from FIGS. 17 and 18 that the arrangement of cyclonic separating units are very similar to that shown in the first embodiment. The separating apparatus 206 comprises a first cyclonic separating unit 212, a second cyclonic separating unit 214 and a regenerative filter 216. Again the specific overall shape of the separating apparatus 206 can be varied according to the type of vacuum cleaner 1 in which the separating apparatus 206 is to be used.

The first cyclonic separating unit 212 can be seen to be the annular chamber 218 located between the outer wall 220 which is substantially cylindrical in shape and a middle wall 222 which is located radially inwardly from the outer wall 220 and spaced from it. The lower end of the first cyclonic separating unit 212 is closed by a base 224 which is pivotably attached to the outer wall 220 by means of a pivot and held in a closed position by a catch. In the closed position, the base 224 is sealed against the lower ends of the walls 220, 222. Releasing the catch allows the base 224 to pivot away from the outer wall 220 and the middle wall 222 for emptying the first cyclonic separating unit 212.

In this embodiment the top portion of the annular chamber 218 forms a cylindrical cyclone 230 of the first cyclonic separating unit 212 and the lower portion forms a first dust collecting bin 232. The second cyclonic separating unit 214 comprises 12 secondary cyclones 234 which are arranged in parallel and a second dust collecting bin 236.

A dust laden air inlet 238 is provided in the outer wall 220 of the cylindrical cyclone 230. The dust laden air inlet 238 is arranged tangentially to the outer wall 220 so as to ensure that incoming dust laden air is forced to follow a helical path around the annular chamber 218. A fluid outlet from the first cyclonic separating unit 212 is provided in the form of a shroud 240. The shroud 240 comprises a cylindrical wall 242 in which a large number of perforations 241 are formed. The only fluid outlet from the first cyclonic separating unit 212 is formed by the perforations 241 in the shroud 240.

A passageway 244 is formed downstream of the shroud 240. The passageway 244 communicates with the second cyclonic separating unit 214. The passageway 244 may be in the form of an annular chamber which leads to inlets 246 of the secondary cyclones 234 or may be in the form of a plurality of distinct air passageways each of which leads to a separate secondary cyclone 234.

An upper wall 248 extends downwardly from a vortex finder plate 250 which forms a top surface of each of the secondary cyclones 234. The upper wall 248 is tubular and its lower end 249 is sealed to an inner wall 252. The inner wall 252 is tubular and is located radially inwardly of the middle wall 222 and is spaced from it so as to form a second annular chamber 254 between them. This second annular chamber 254 forms the second duct collecting bin 236.

When the base 224 is in the closed position, the inner wall 252 may reach down to and be sealed against the base 224. Alternatively the inner wall 252 may stop short of the base 224 and may join with a filter base plate.

The secondary cyclones 234 are arranged in a part circle substantially or totally above the first cyclonic separating unit 212. A portion of the secondary cyclones 234 may be surrounded by a portion of the top of the first cyclonic separating unit 212. The secondary cyclones 234 are arranged in a horseshoe shaped ring which is centred on the axis of the first cyclonic separating unit 212. Each secondary cyclone 234 has an axis which is inclined downwardly and towards the axis of the longitudinal axis of the first cyclonic separating unit 212.

Each secondary cyclone 234 is frustoconical in shape and comprises a cone opening 258 which opens into the top of the second dust collecting bin 236. In use dust separated by the secondary cyclones 234 will exit through the cone openings 258 and will be collected in the second dust collecting bin 236. A vortex finder is provided at the upper end of each secondary cyclone 234. The vortex finders may be an integral part of the vortex finder plate 250 or they may pass through the vortex finder plate 250. The vortex finders fluidly connect with the regenerative filter 216. The vortex finders lead into a plenum 265 which leads to the regenerative filter 216.

It can be seen that the regenerative filter 216 is at least partially surrounded by the first and second cyclonic separating units 212, 214. The regenerative filter 216 is therefore arranged longitudinally down the centre of the separating apparatus 206 such that the secondary cyclones 234 and at least a portion of the second dust collecting bin 236 surround the regenerative filter 216. It can be seen that the secondary cyclones 234 surround a top portion of the regenerative filter 216 and an upper portion of the second dust collecting bin 236 surrounds a lower portion of the regenerative filter 216. The first cyclonic separating unit 212 surrounds a lower portion of the secondary cyclones 234 and the second dust collecting bin 236. Thus the first cyclonic separating unit 212 also surrounds a portion of the regenerative filter 216. The first cyclonic separating unit 212, the second cyclonic separating unit 214 and the regenerative filter 216 are therefore arranged concentrically about a common central axis of the separating apparatus 206.

Figure 17:
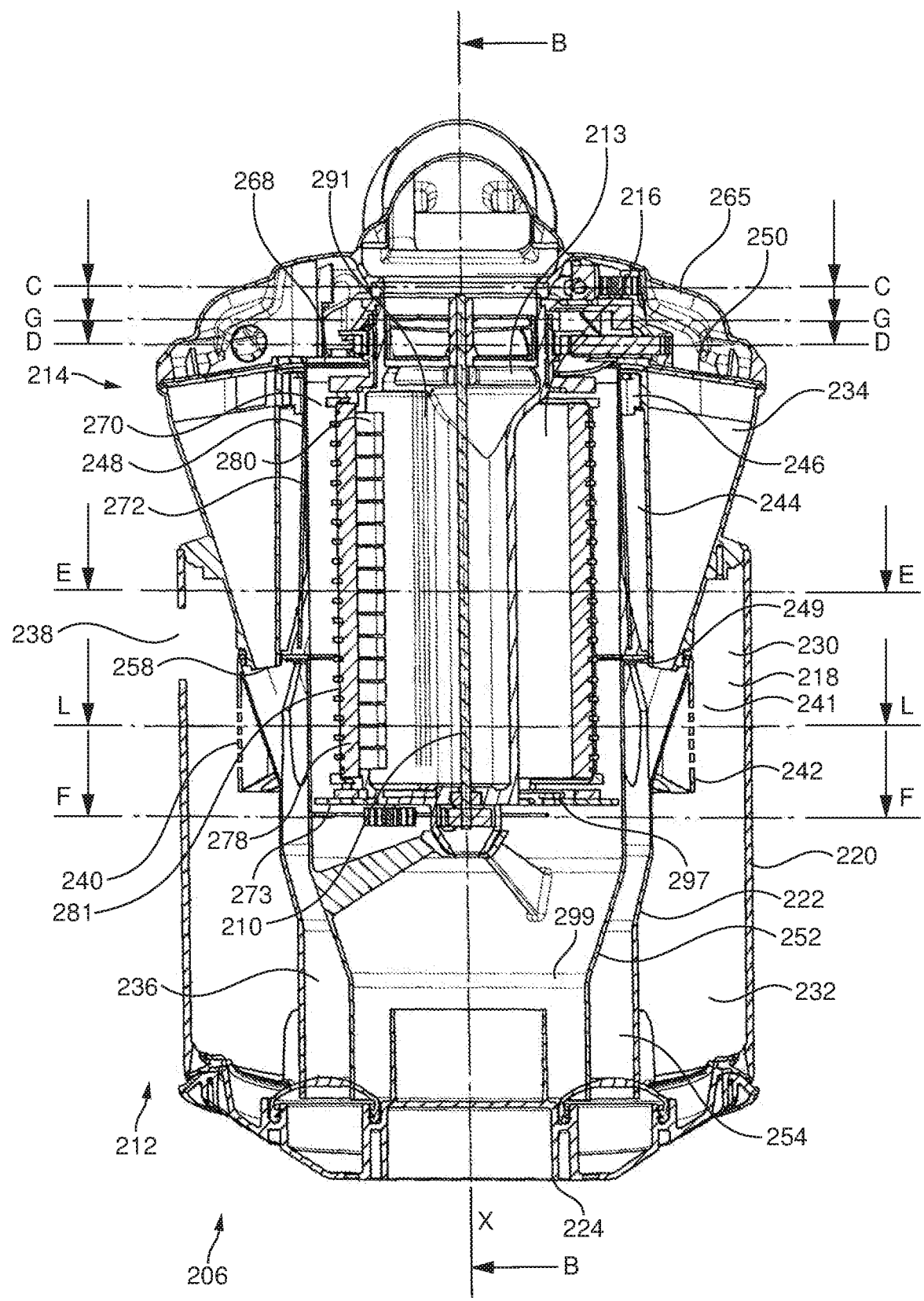
FIG. 17 shows a section through a second embodiment of separating apparatus according to the present invention.
Figure 18:
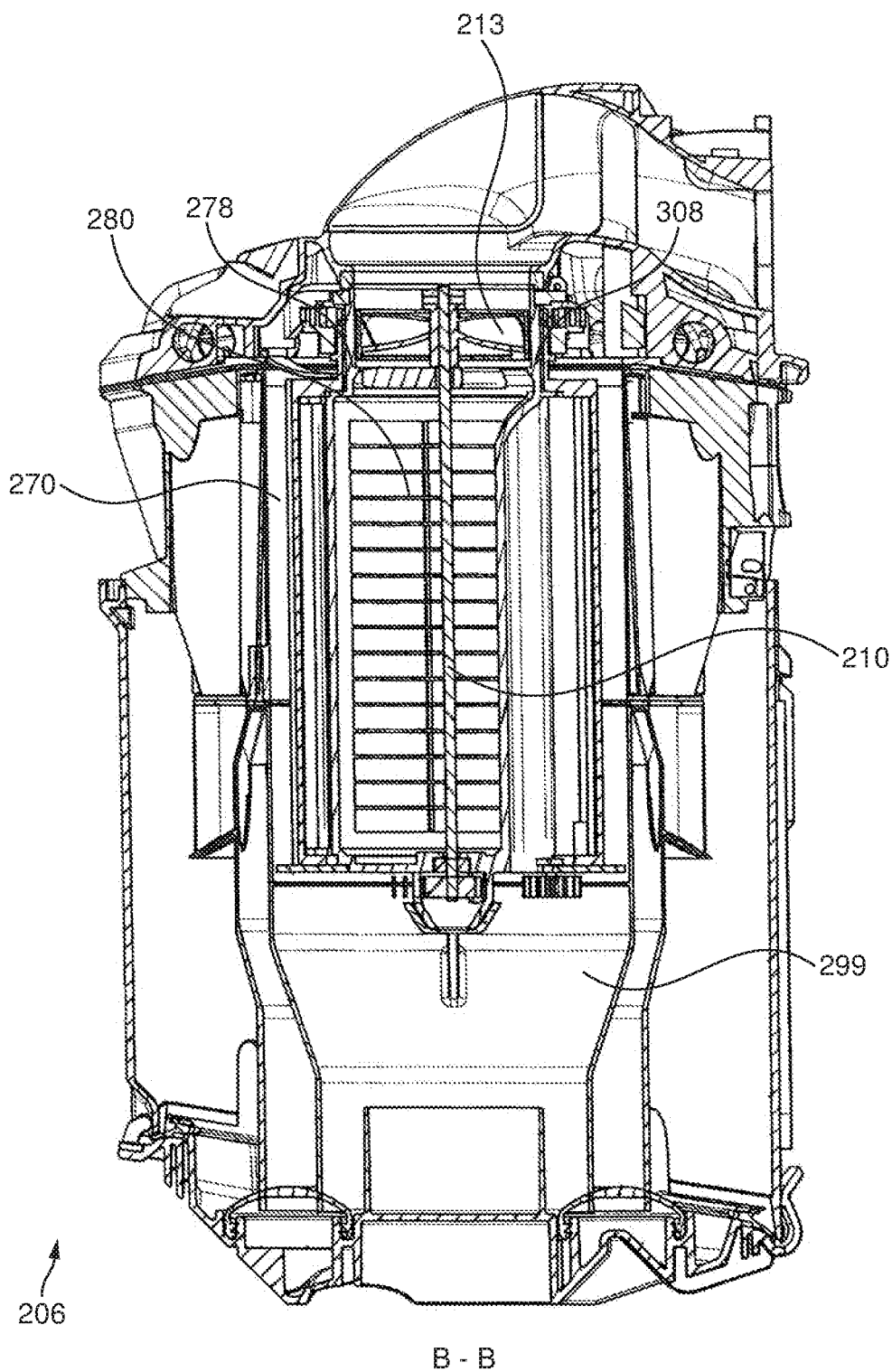
FIG. 18 shows a section through the separating apparatus shown in FIG. 17, taken along the line B-B.
Figure 19A:
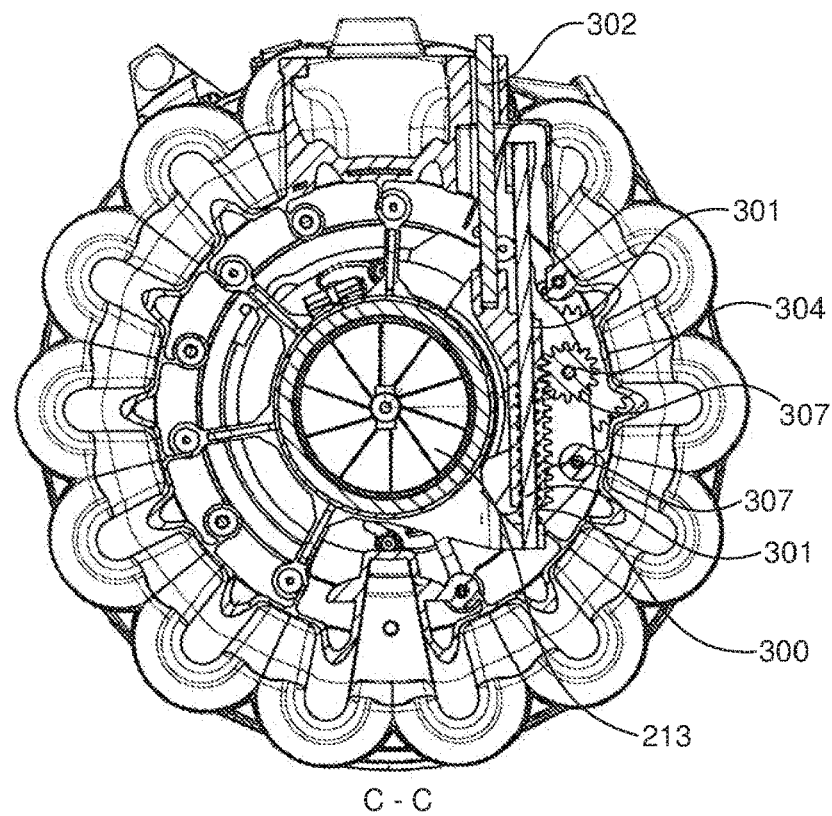
FIG. 19a shows a section through the separating apparatus shown in FIG. 17, taken along the line C-C.
Figure 19B:
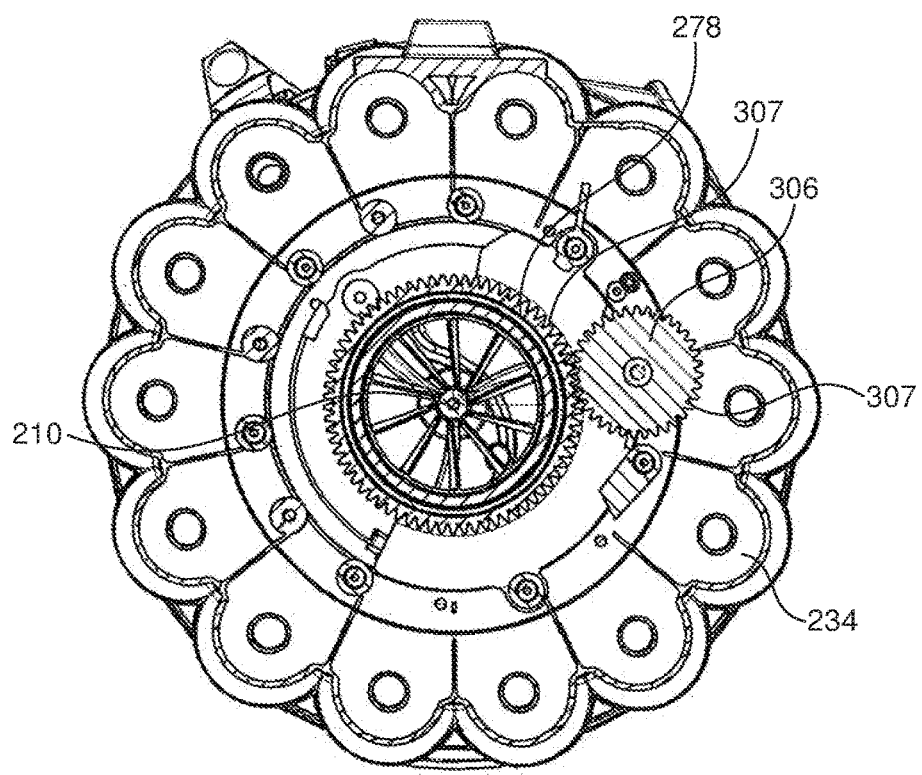
FIG. 19b shows a section through the separating apparatus shown in FIG. 17, taken along the line D-D.
Figure 20A:
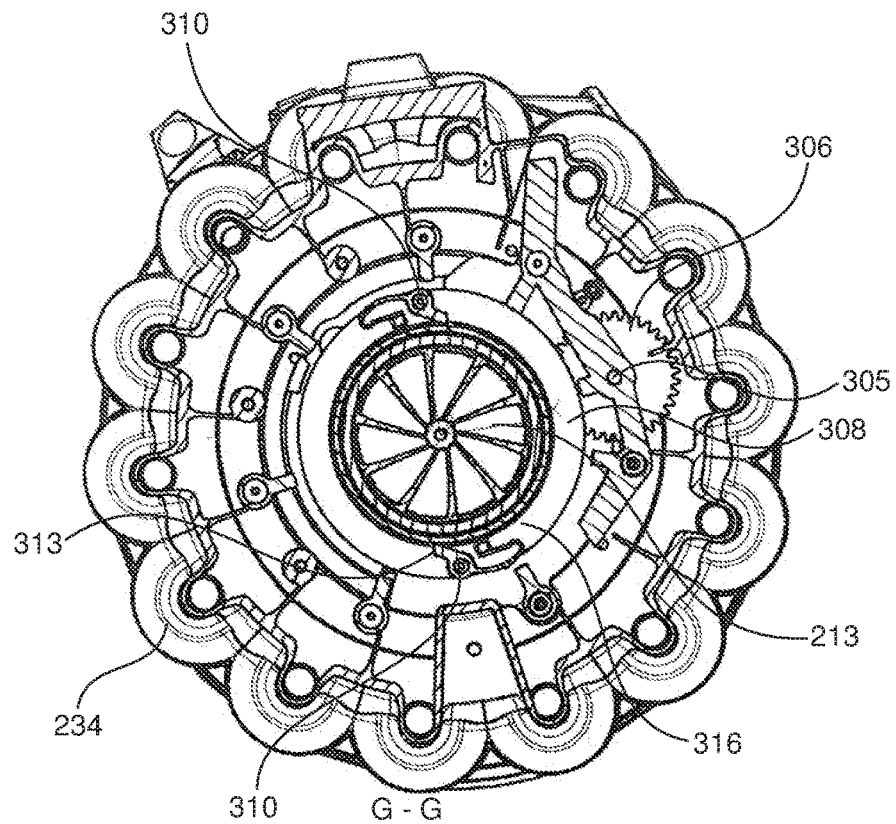
FIG. 20a shows a section through the separating apparatus shown in FIG. 17, taken along the line G-G.
Figure 20B:
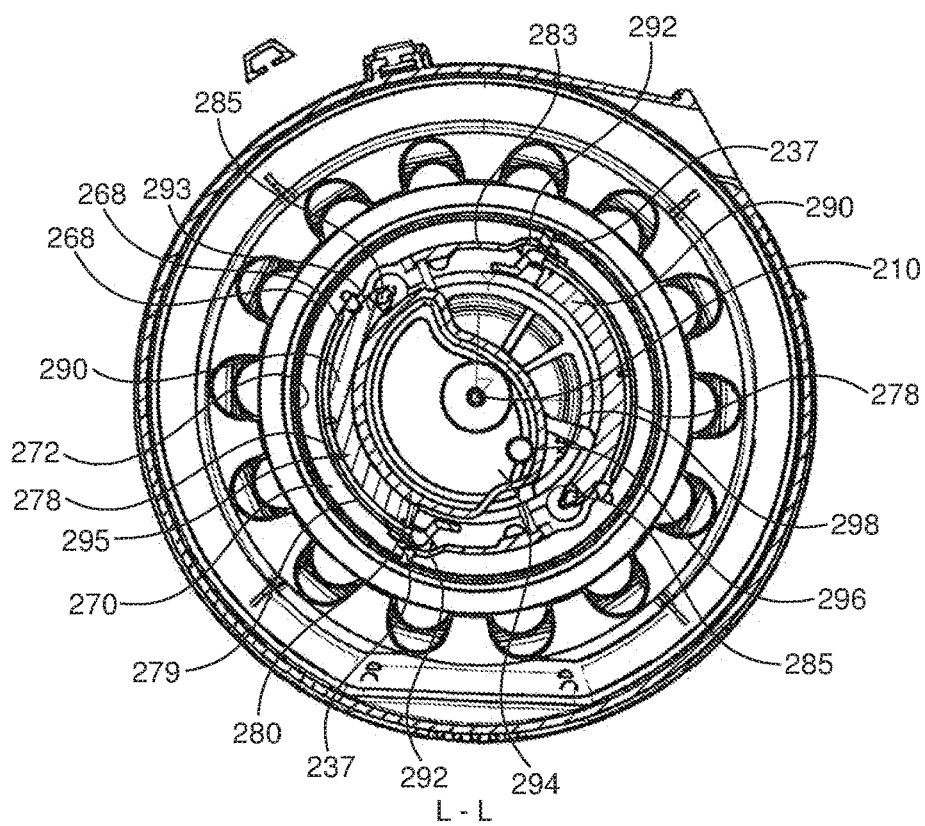
FIG. 20b shows a section through the separating apparatus shown in FIG. 17, taken along the line L-L.
Figure 21A:
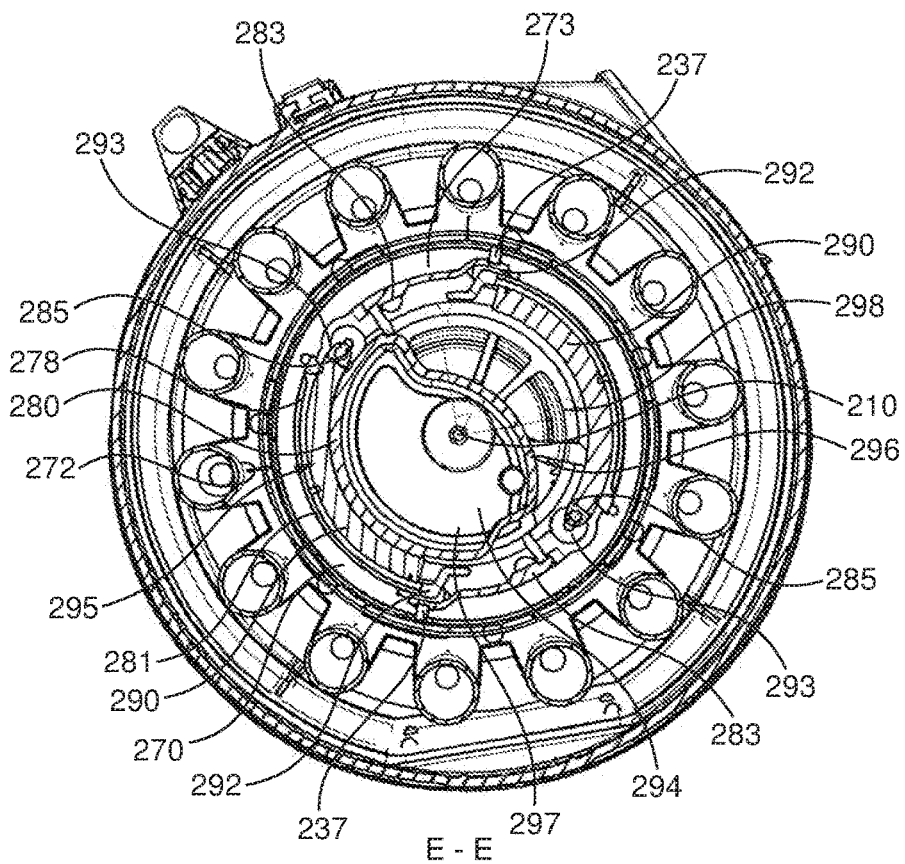
FIG. 21a shows a section through the separating apparatus shown in FIG. 17, taken along the line E-E.
Figure 21B:
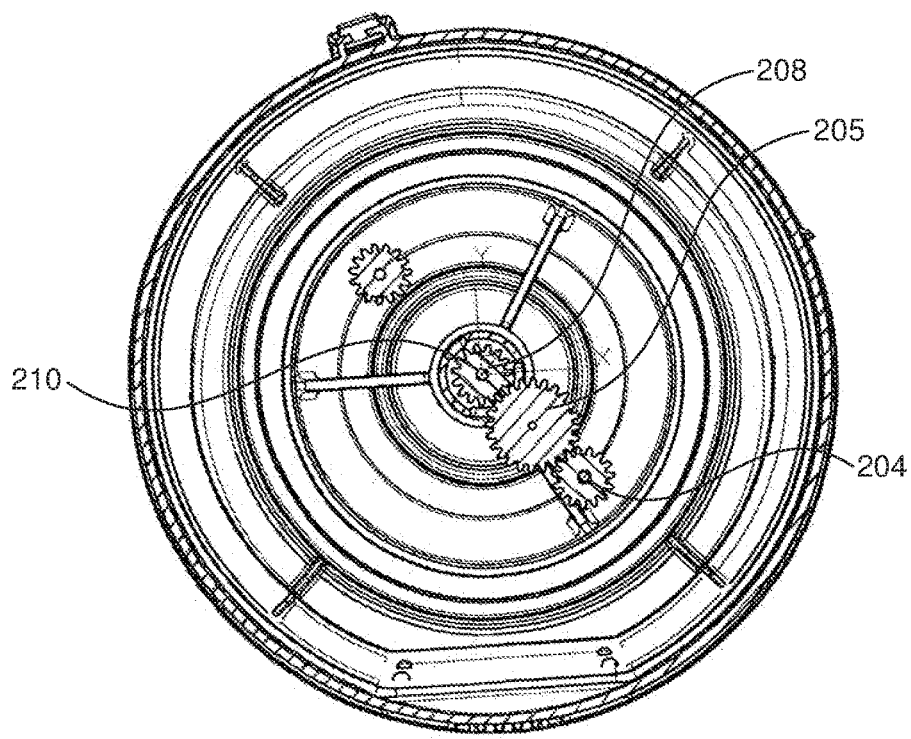
FIG. 21b shows a section through the separating apparatus shown in FIG. 17, taken along the line F-F.

The regenerative filter 216 has an inlet duct housing 268 which defines a filter inlet duct 270. In FIGS. 17 and 18 it can be seen that the filter inlet duct 270 is elongate and extends along the length of the regenerative filter 216. It is however horseshoe shaped when viewed in a cross section taken perpendicular to the longitudinal axis of the separating apparatus 206. The horseshoe shape can be viewed best in FIGS. 20*b* and 21*a*. The filter inlet duct 270 is in airflow communication with the plenum 265. The inlet duct housing 268 is formed from a number of components. A portion of a solid outer wall 272 forms the outer wall of the inlet duct housing 268. The inlet duct housing also has a base wall 273. The solid outer wall 272 is substantially cylindrical in shape but only a portion of this forms part of the inlet duct housing 268 as can be seen in FIGS. 20*b* and 21*a*. The longitudinal axis of the solid outer wall 272 is in line with the longitudinal axis of the separating apparatus 206. Positioned inwardly of the solid outer wall 272 is the outer filter cage wall 278. In this embodiment a portion of the outer filter cage wall 278 also forms the inner wall of the inlet duct housing 268. In this embodiment the outer filter cage wall 278 which is generally cylindrical in shape is arranged such that it can move relative to the solid outer wall 272. This means that the portion of the outer filter cage wall 278 which forms the inner wall of the inlet duct housing 268 changes as the outer filter cage wall 278 moves.

Figure 22:
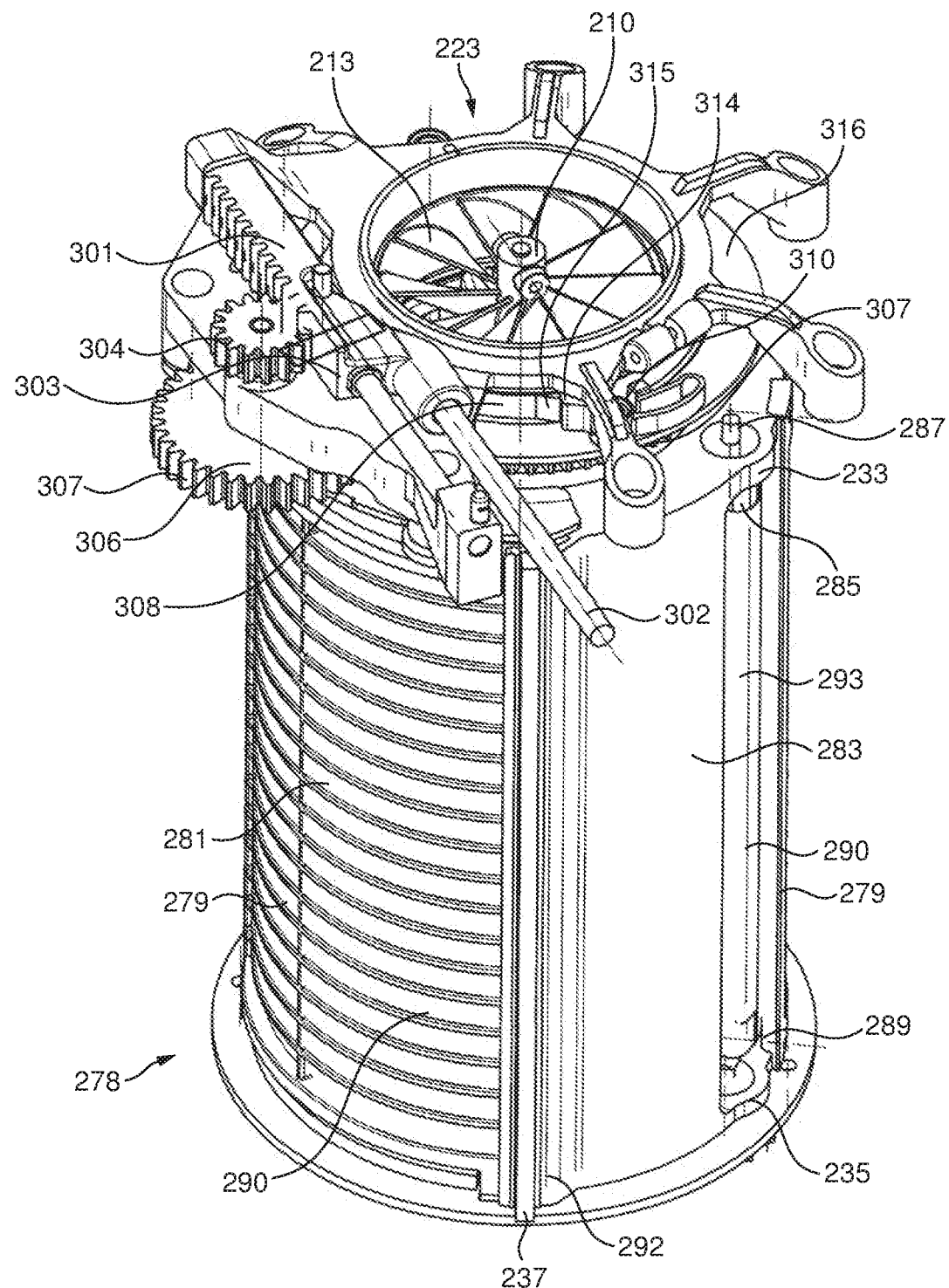
FIG. 22 shows a detailed view of the filter cage of the second embodiment with the drive mechanism in the closed position.
Figure 23:
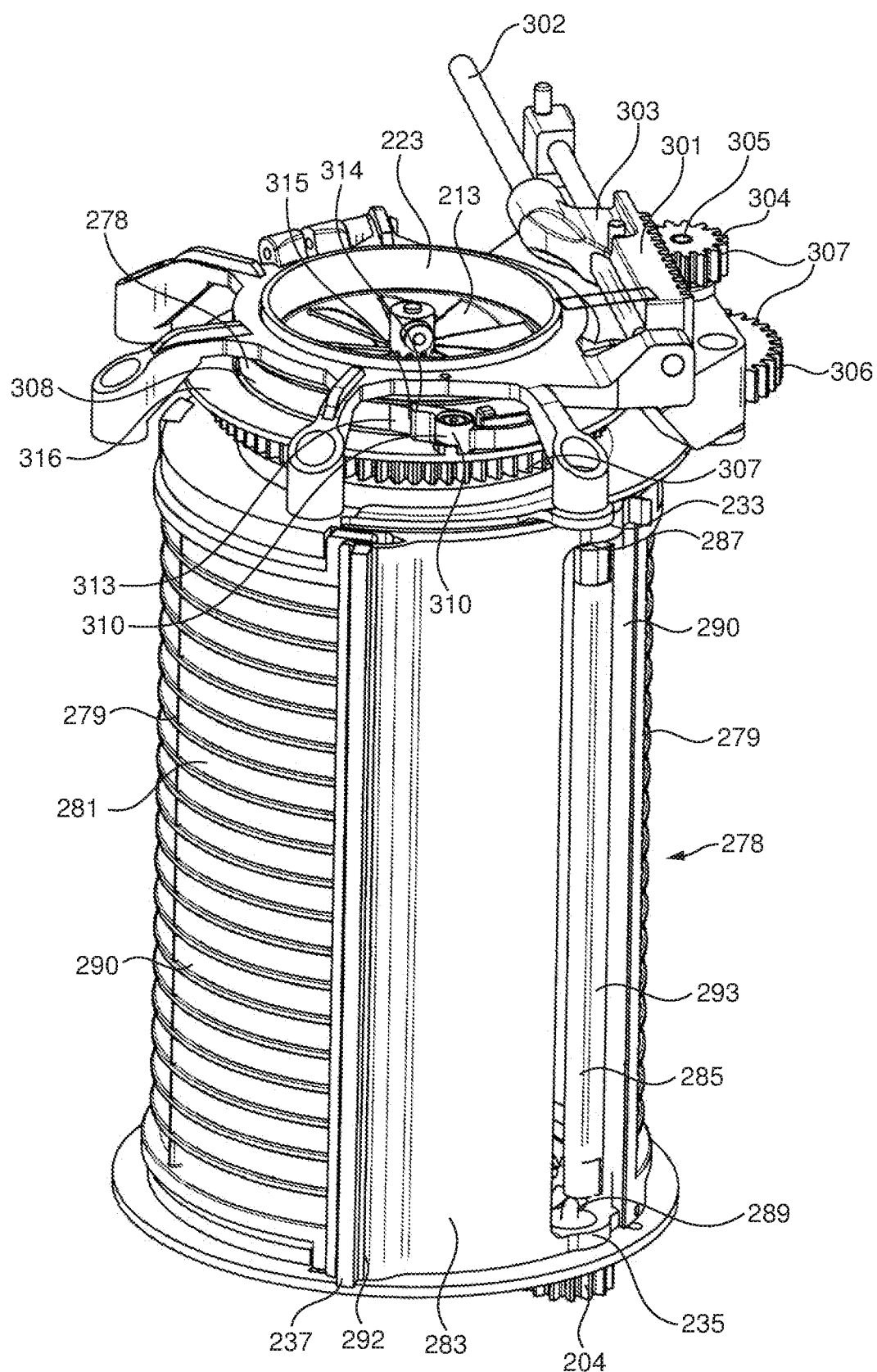
FIG. 23 shows an alternative view of the filter cage shown in FIG. 22.
Figure 24:
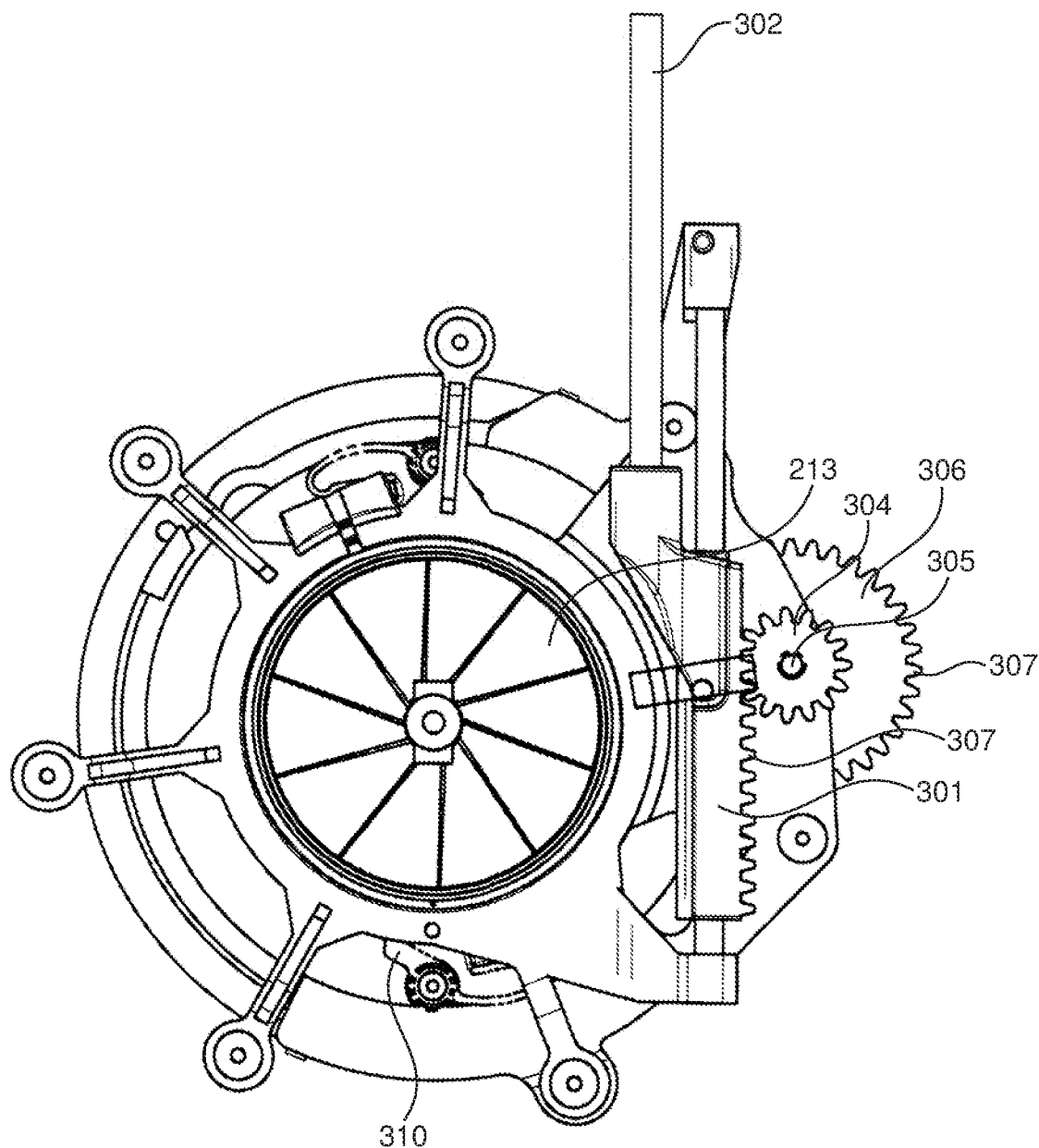
FIG. 24 shows a plan view of the filter cage shown in FIG. 23.
Figure 26:
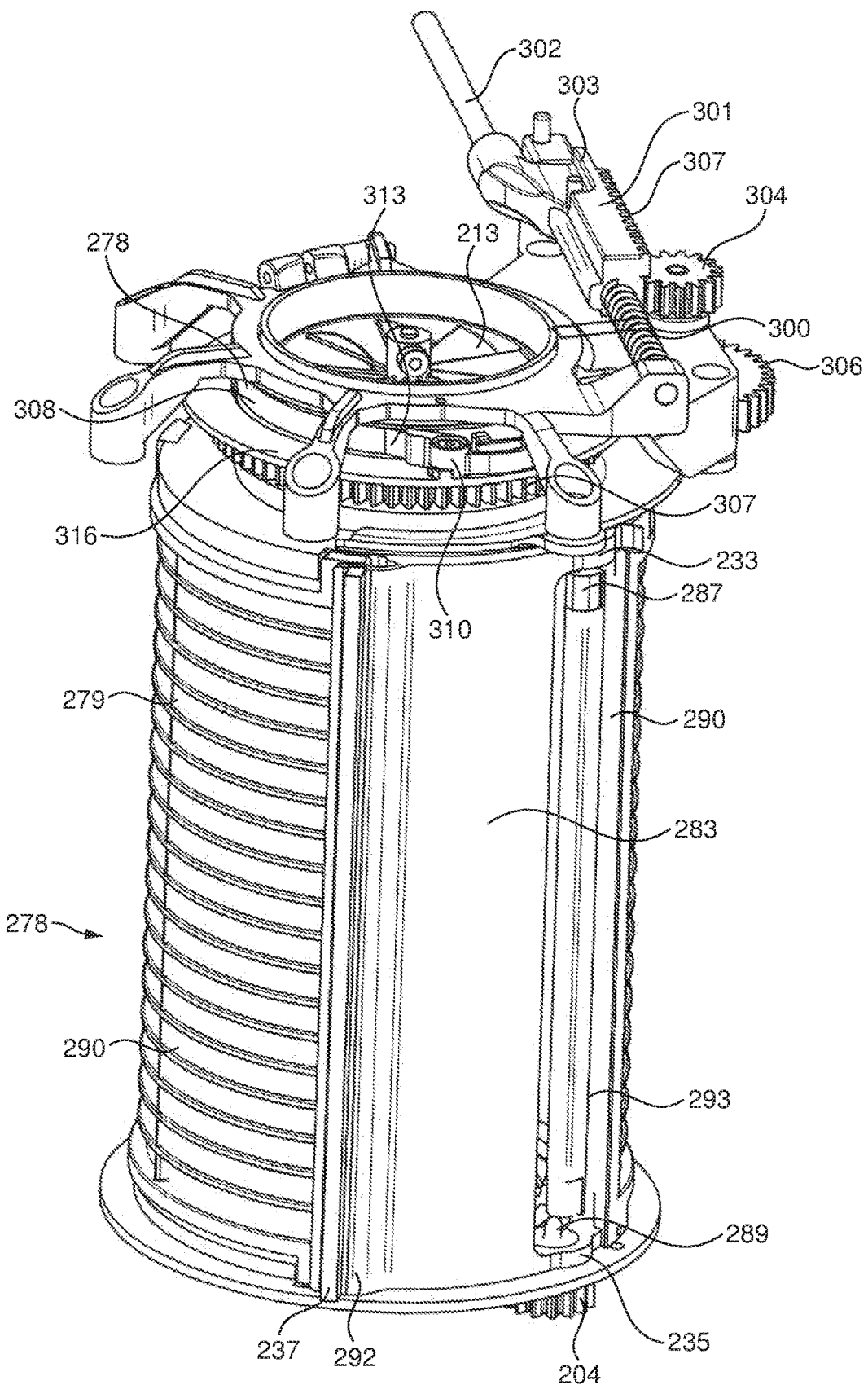
FIG. 26 shows a perspective view of the filter cage shown in FIG. 25.
Figure 27:
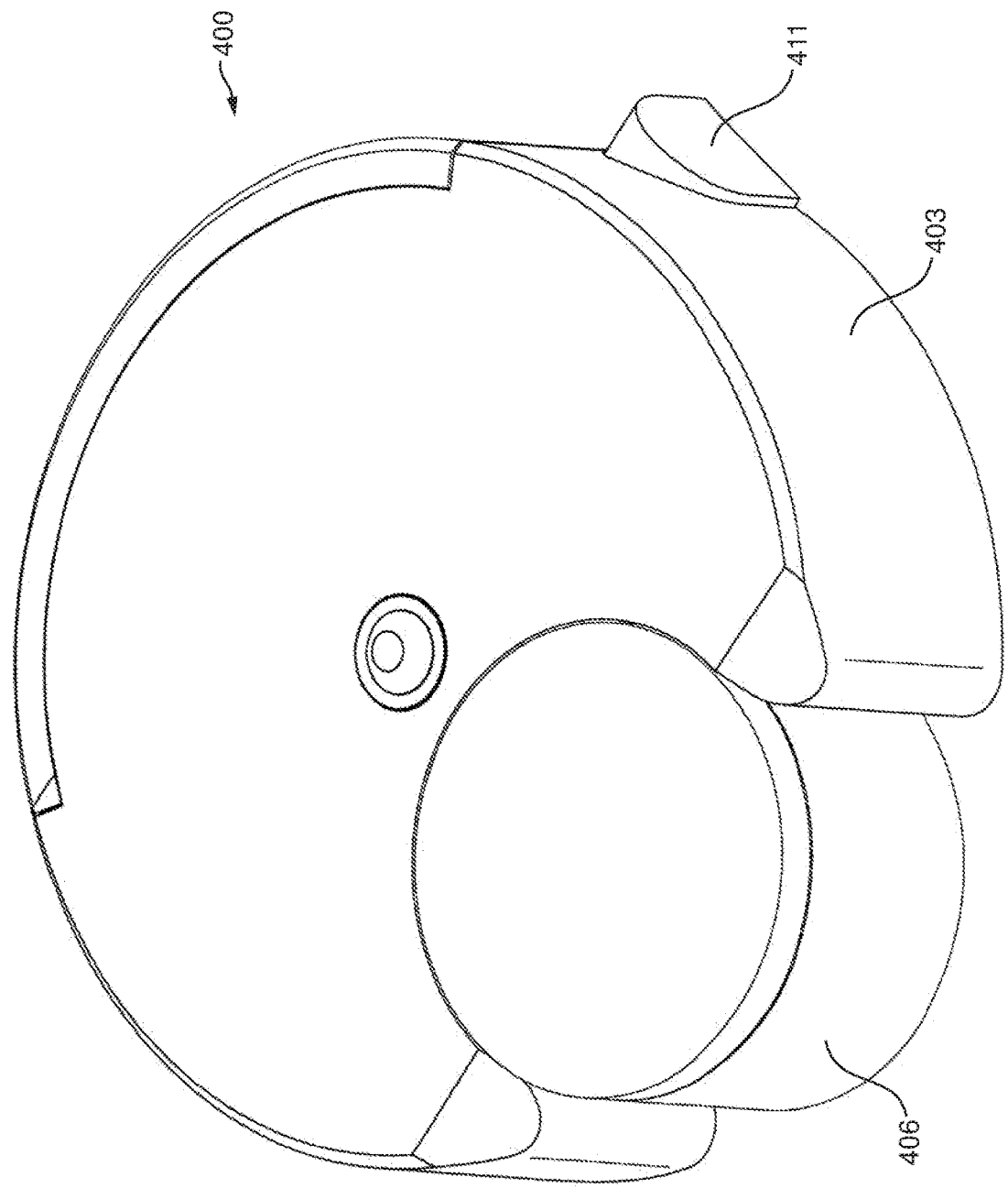
FIG. 27 shows a front perspective view of robot vacuum cleaner showing a third embodiment of a separating apparatus according to the present invention.
Figure 28:
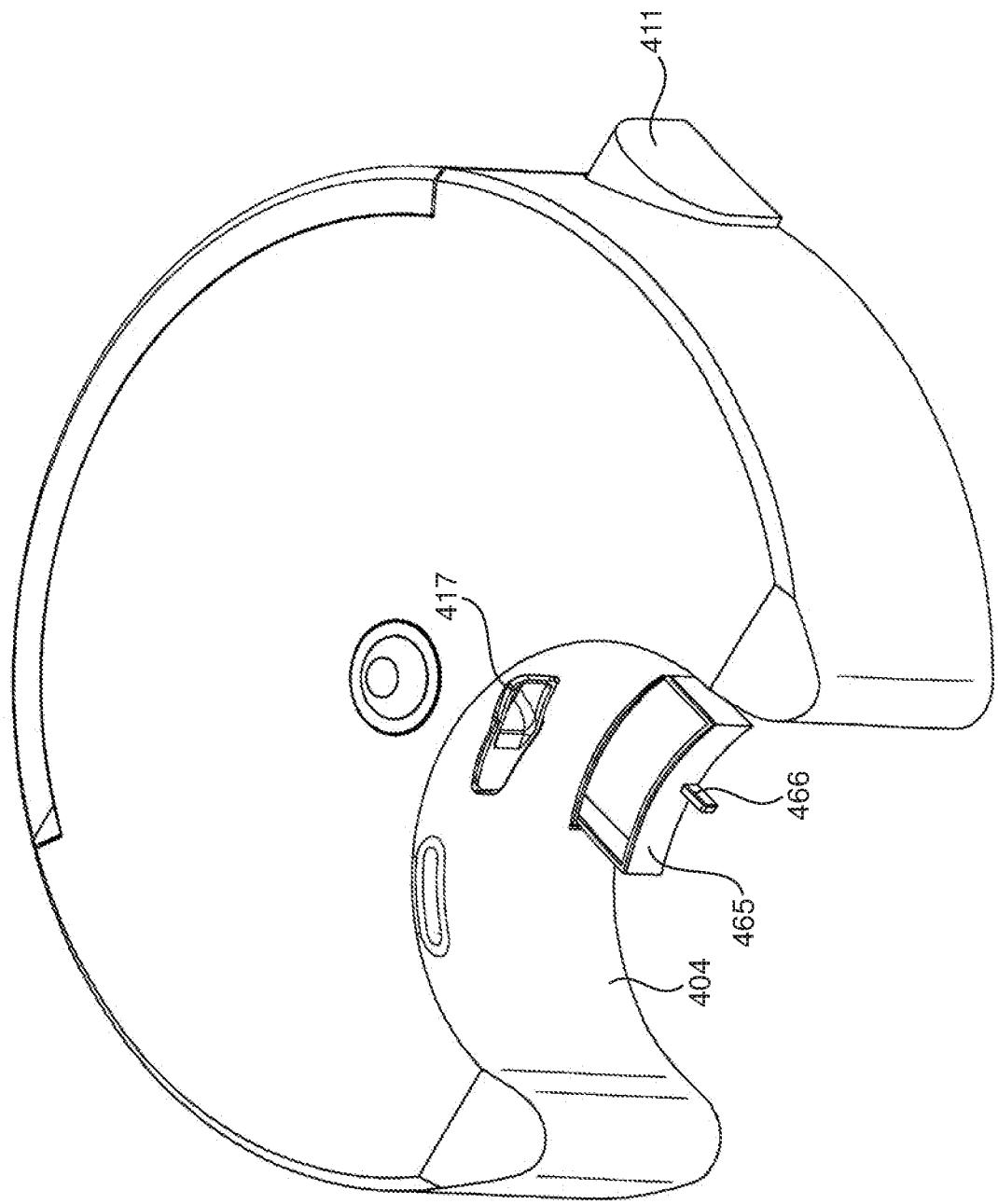
FIG. 28 shows the vacuum cleaner shown in FIG. 27 with the cyclonic separator removed and the dust collection drawer open.
Figure 29:
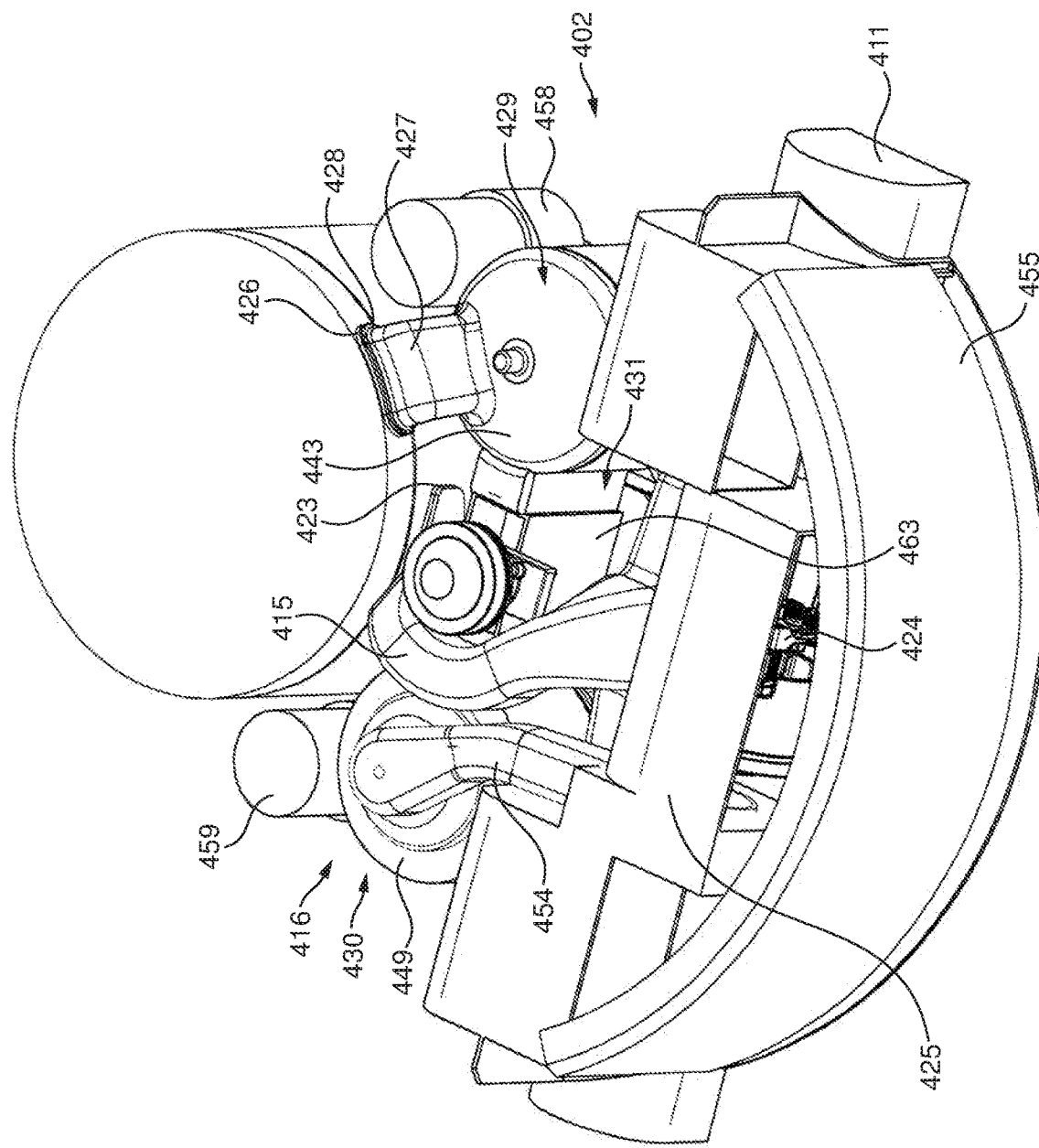
FIG. 29 shows a rear perspective view of the vacuum cleaner shown in FIG. 27 with the outer casing removed.
Figure 30:
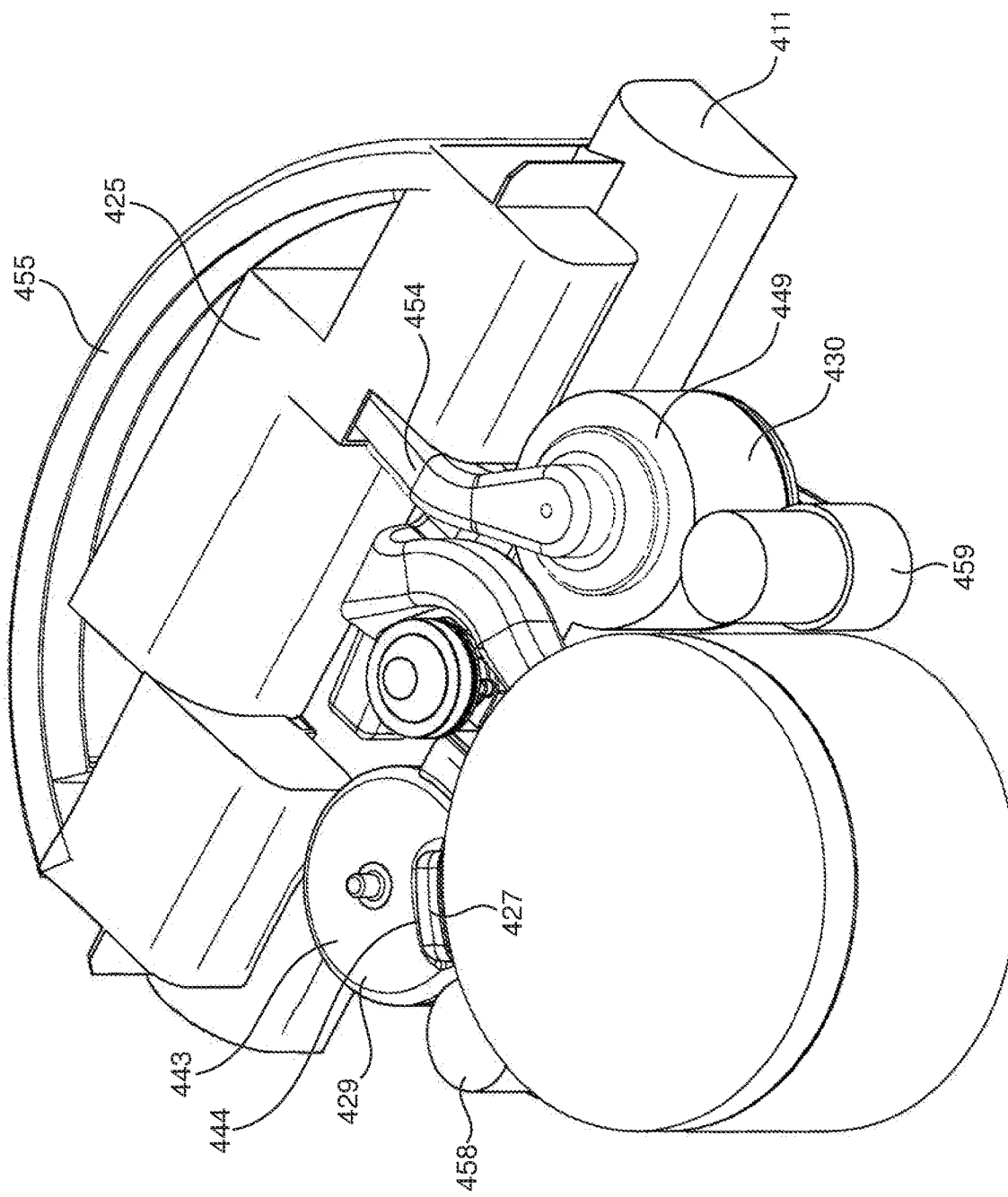
FIG. 30 shows a front perspective view of the vacuum cleaner shown in FIG. 27 with the outer casing removed.

The outer filter cage wall 278 can be seen best in FIGS. 22, 23 and 26. The outer filter cage wall 278 can be seen to comprise two filter areas 279 having a plurality of rectangular shaped apertures 281. The filter areas 279 are each attached to a respective filter book holder 283. These filter book holders 283 also form a portion of the outer filter cage wall 278. The filter book holders 283 each house a cranked rod 285. The top end 287 of each cranked rod 285 passes through an upper bearing 233 at the top of each filter book holder 283 and the lower end 289 of each cranked rod 285 passes through a lower bearing 235 at the bottom of each filter book holder 283. The upper and lower bearings 233, 235 oppose each other. The cranked rod 285 is free to rotate within the upper and lower bearings 233, 235. Attached to each cranked rod 285 is a filter book 290.

At any one time one of the filter areas 279 of rectangular shaped apertures 281 along with its respective filter book holder 283 will form the inner wall of the inlet duct housing 268. The other filter area 279 of rectangular shaped apertures 281 and its respective filter book holder 283 will be housed within the confines of the solid outer wall 272 but will not form part of the inlet duct housing 268. They will instead be located within a regeneration zone 298. Inlet duct seals 237 are positioned between the solid outer wall 272 and the first ends 292 of each of the filter book holders 283. These inlet duct seals 237 ensure that all air passing from the plenum 265 into the filter inlet duct 270 pass through the rectangular shaped apertures 281 which form the inner wall of the inlet duct housing 268.

An inner filter cage wall 280 is provided concentrically inwardly of the outer filter cage wall 278. The inner filter cage wall 280 has a plurality of rectangular shaped apertures (not shown) which are arranged to oppose the plurality of rectangular shaped apertures 281 on the outer filter cage wall 278. The apertures 281 on the outer filter cage wall 278 may correspond in shape, size and/or position to the apertures on the inner cage wall 280. The apertures could of course be of other shapes such as square or diamond.

A portion of the inner filter cage wall 280 and the outer filter cage wall 278 is arranged such that the inner filter cage wall 280 is spaced from the apertures 281 on the outer filter cage wall 278 by a distance which is just wide enough to house a filter book 290. As stated above, the outer filter cage wall 278 is arranged to rotate such that it can move with respect to the remainder of the separating apparatus 206. This rotation of the outer filter cage wall 278 also causes the filter books 290 which are attached to the outer filter cage wall 278 to rotate. The mechanism by which the outer filter cage wall 278 can be moved will be discussed in more detail later.

Each filter book 290 is constructed from a plurality of square or rectangular leaves of filter material 291 which are bound along one edge into a book spine 293. The leaves may be bound to form the spine 293 by stitching, gluing or any other suitable technique. The book spines 293 are attached to the cranked rods 285. The book spines 293 may be attached to the cranked rod 285 by overmoulding, stitching, gluing or any other suitable technique. In total this means that there are two filter books 290 in the regenerative filter 216, with one filter book 290 attached to each cranked rod 285. The book spines 293 allow the cranked rod 285 to freely rotate. It is of course possible to have more than one filter book 290 attached to each cranked rod 285. It is also possible that the regenerative filter 216 could have more than two cranked rods 285, each of which may have one or more filter books 290.

In the embodiment shown in FIGS. 20b and 21a it can be seen that at any one time one filter book 290 will be housed between the outer and inner cage walls 278, 280 in a filtration zone 295. When the filter book 290 is housed in the filtration zone 275 they are held on both their internal and external faces by the inner and outer walls 278, 280 which serves to compress the leaves of filter material 291 of the filter book 290 to minimize and preferably remove any gaps between adjacent leaves 291. This compressed filter book 290 is in a filtering configuration and can be used to filter dirty air passing from the filter inlet duct 270.

The inner filter cage wall 280 also forms a portion of an outlet duct 294 of the separating apparatus 206. The outlet duct 294 is tubular in shape but has a generally crescent moon shape when viewed in a cross section taken perpendicular to the longitudinal axis of the separating apparatus 206. The partially cylindrical portion of the outlet duct 294 is formed from the inner filter cage wall 280 and the remainder of outlet duct is formed from an inwardly curving solid wall 296. An outlet duct base plate 297 is positioned at the lower end of the outlet duct 294 to seal its lower end to ensure that all air that has passed through the regenerative filter 216 passes out through the open upper end of the filter 223. The outlet duct base plate 297, seen best in FIG. 17, also extends outwardly to close the lower ends of the outer and inner cage walls 278, 280 to ensure that in use all air passes through the filter books 290.

The remaining filter book 290 is housed in the regeneration zone 298. The regeneration zone 298 is elongate in shape. The filter book 290 which is housed in the regeneration zone 298 is not compressed and therefore there are gaps between one or more of the leaves of filter material 291. The cranked rod 285 runs along the length of the regeneration zone 298. The cranked rod 285 is fixed at its lower end 289 on to a cranked rod gear 204. This cranked rod gear 204 forms part of a gear train comprising an intermediary gear 205 and a primary gear 208. These gears can be seen best in FIG. 21b. Each of the cranked rods 285 have a cranked rod gear 204 but only the cranked rod gear 204 which is located in the regeneration zone 298 is linked with the remainder of the gear train 206, 208. The primary gear 208 is mounted on a rotatable shaft 210 which runs through the centre of the outlet duct 294 and is connected at its upper end to a turbine 213. In use of the vacuum cleaner 1, air which has passed through the filter book 290 and into the outlet duct 294 travels upwardly through the turbine 213. This causes the rotatable shaft 210 to rotate which in turn, via the gear train, causes the cranked rod 285 housed in the regeneration zone 298 to rotate. As the cranked rod 285 rotates filter book 290 is shaken. Any dust which has lodged on the filter book 290 can therefore be dislodged. In this way the filter book 290 housed in the regeneration zone 298 can be cleaned and regenerated. Any dust dislodged by the shaking of the filter book 290 falls into a third dust collecting chamber 299. The turbine 213 and the rotatable shaft 210 are centered on the longitudinal axis of the separating apparatus 206.

During use of the embodiments described above dust laden air enters the separating apparatus 206 via the dust laden air inlet 238 and, because of the tangential arrangement of the inlet 238, the dust laden air follows a helical path around the outer wall 220 of the first cyclonic separating unit 212. Larger dirt and dust particles are deposited by cyclonic action in the annular chamber 218 and collected in the first dust collecting bin 232. The partially-cleaned dust laden air exits the annular chamber 218 via the perforations 241 in the shroud 240 and enters the passageway 244. The partially-cleaned dust laden air then passes into tangential inlets 246 of the secondary cyclones 234. Cyclonic separation is set up inside the secondary cyclones 234 so that separation of some of the dust particles which are still entrained within the airflow occurs. The dust particles which are separated from the airflow in the secondary cyclones 234 are deposited in the second annular chamber 254 which forms at least part of the second dust collecting bin 236 of the second cyclonic separating unit 214. The further cleaned dust laden air then exits the secondary cyclones 234 into the plenum 265. The further cleaned dust laden air then passes into the regenerative filter 216.

The further cleaned dust laden air passes out of the plenum 265 and down the filter inlet duct 270. The air then travels through the filter book 290 which is housed between the inner and outer filter cage walls 278, 280 in the filtration zone 295. Dirt and dust is deposited on the leaves of filter material 291 as the dust laden air passes through the filter book 290. The further cleaned air then travels up through the outlet duct 294 and through the turbine 213. As stated above, air passing through the turbine 213 causes the rotatable shaft 210 to rotate, which in turn rotates the primary gear 208. Rotation of the primary gear 208 causes rotation of the intermediate gear 205 which in turn causes rotation of the cranked rod gear 204 in the regeneration zone 298. This in turn causes the cranked rod 285 to rotate. As the cranked rod 285 rotates, the leaves 291 of filter material of the filter book 290 are shaken. This shaking causes any dirt and dust deposited on the leaves 291 to be removed. The dust and dirt falls from the leaves 291 into the third dust collecting bin 299. This filtering and regeneration continues as the vacuum cleaner 1 is being used to clean a surface.

At any one time one filter book 290 is located in the filtration zone 295 and one filter book 290 is located in the regeneration zone 298 for regeneration. It is however possible to move the outer filter cage wall 278 with its attached filter books 290 such that that the filter book 290 which has been used for filtration can be moved to the regeneration zone 298 for cleaning. At the same time, the filter book 290 which has been regenerated in the regeneration zone 298 can be moved into the filtration zone 295 to provide a regenerated filter for use in filtering dirty air. The outer wall 272 and the inner filter cage wall 280 remain stationary during this movement. This operation of moving the filter books 290 can be repeated as many times as desired.

Movement of the outer filter cage wall 278 and thus the filter books 290 is controlled by a mechanism which is activated when the separating apparatus 206 is connected to the remainder of the vacuum cleaner. This mechanism will be described in detail below.

Figure 25:
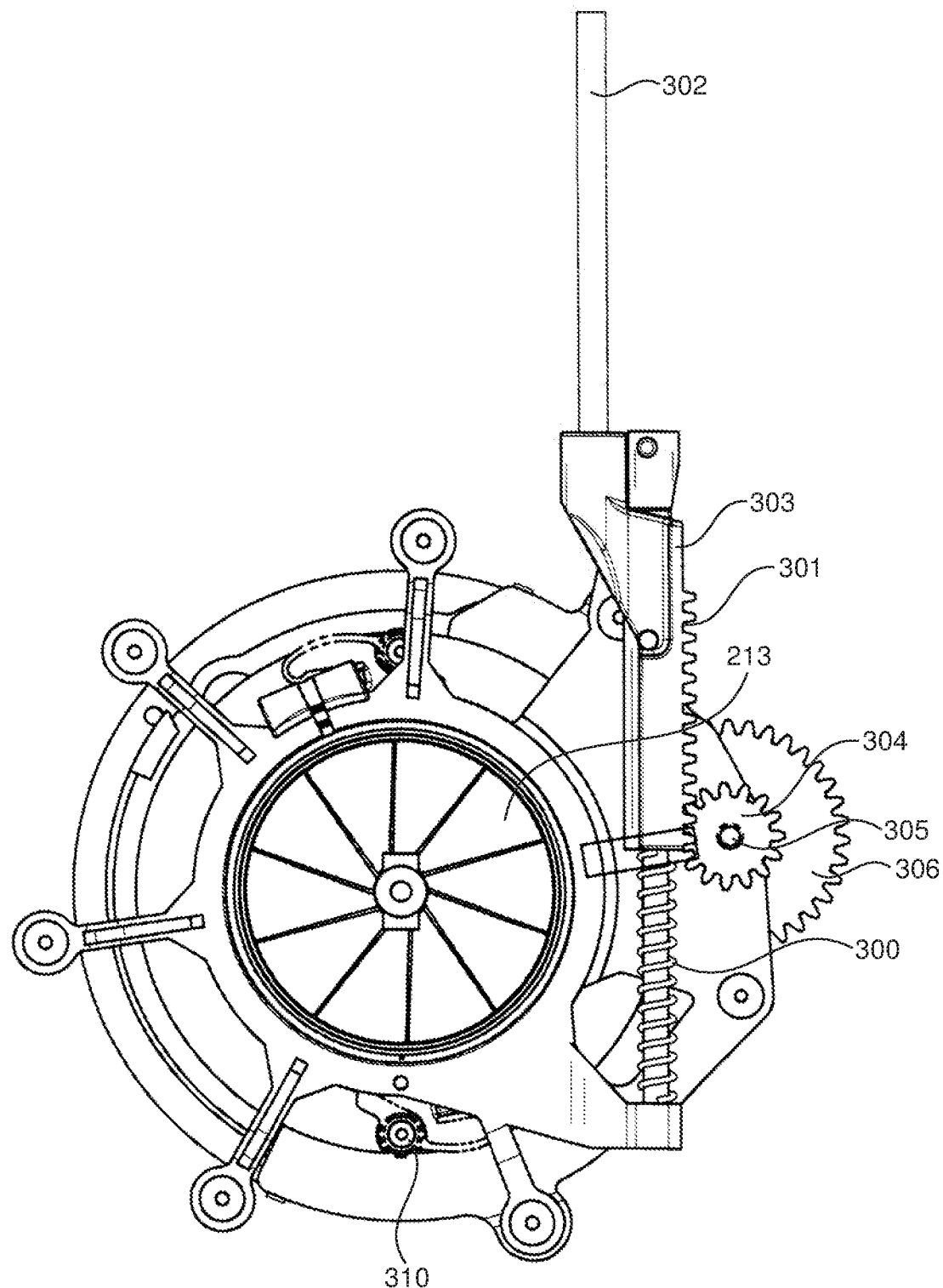
FIG. 25 shows a plan view of the filter cage of the second embodiment with the drive mechanism in the open position.

The separating apparatus 206 has a rack and pinion actuation means for controlling movement of the filter books 290. FIGS. 19 to 24 show the rack and pinion actuation means in its closed position when the separating apparatus 206 is attached to the remainder of the vacuum cleaner 1. FIGS. 25 and 26 show the rack and pinion actuation means in its open position when the separating apparatus 206 is removed from the remainder of the vacuum cleaner 1. The separating apparatus 206 can be removed from the remainder of the vacuum cleaner 1 by pressing a release button (not shown).

In FIGS. 25 and 26 where the rack and pinion actuation means is shown in its open position it can be seen that a spring 300 acts on a rack 301 causing the rack 301 to be forced into a projecting position. It can be seen that a pin 302 is attached to the forward end 303 of the rack 301. This pin 302 projects from a top side surface of the separating apparatus 206. The rack 301 is in contact with a pinion gear 304. The pinion gear 304 is directly linked by a rod 305 to a second intermediate gear 306. The second intermediate gear 306 is arranged directly below the pinion gear 304. The teeth 307 of the second intermediate gear 306 engage with teeth 307 located on a pawl drive collar 316 arranged circumferentially around the cylindrical outer upper surface 308 of the outer filter cage wall 278.

To move from the open position in FIGS. 25 and 26 to the closed position shown in FIGS. 19 to 24 the separating apparatus 206 can be attached to the remainder of the vacuum cleaner 1. During the attachment process the pin 302 will contact a portion of the remainder of the vacuum cleaner 1 and will be pushed inwardly against the action of the spring 300 causing the rack 301 to move inwardly. The teeth 307 of the rack 301 engage with the teeth 307 on the pinion gear 304 causing it to rotate. The rotation of the pinion gear 304 causes rotation of the second intermediate gear 306 to which it is attached via rod 305. This rotation in turn causes rotation of the pawl drive collar 316.

A pair of pawls 310 sit on top of the pawl drive collar 316. As the pawl drive collar 316 rotates the pawls 310 are also forced to rotate in a clockwise direction. The cylindrical outer upper surface 308 of the outer filter cage wall 278 is positioned circumferentially inwardly of the pawls 310 and has two lugs 313 which project outwardly from its outer surface towards the pawls 310. Where the rack and pinion actuation means is shown in its closed position it can be seen that an abutting surface 314 of each pawl 310 rests against a stop surface 315 of the respective lug 313. As the pawl drive collar 316 rotates and the pawls 310 rotate, the pawls 310 push against the lugs 313 causing the outer filter cage wall 278 to rotate. As the outer filter cage wall 278 rotates a used filter book 290 moves into the regeneration zone 298 whilst at the same time the filter book 290 which has been regenerated during the previous vacuum cleaning operation is moved into the filtration zone 295 for use as a filter. This movement happens automatically as the pin 302 is moved inwardly against the action of spring 300 when the separating apparatus is 206 is docked onto the remainder of the vacuum cleaner 1.

When the separating apparatus 206 is removed from the remainder of the vacuum cleaner, for example so that the first, second and third dust collecting bins 232, 236, 299 can be emptied, movement of the pin outwardly under the force of spring 300 causes the pawls 310 to rotate in an anti-clockwise direction. The pawls 310 are sprung and are therefore able to flex such that the pawls 310 can move over the lugs 313 when the pawl drive collar 316 moves in an anti-clockwise direction. This mechanism therefore ensures that the outer filter cage wall 278 and the attached filter books 290 can only move in one direction. This means that when the separating apparatus 206 is removed from the remainder of the vacuum cleaner 1 the filter books 290 remain in a fixed position. When the separating apparatus 206 is placed back on the remainder of the vacuum cleaner 1 the filter books 290 rotate such that they move on one position.

Again it will be appreciated from the description that the separating apparatus 206 includes two distinct stages of cyclonic separation and a distinct stage of filtration through leaves 291 of filter material. The first cyclonic separating unit 212 comprises a single cylindrical cyclone 230. The relatively large diameter of the outer wall 220 of which means that comparatively large particles of dirt and debris will be separated from the air because the centrifugal forces applied to the dirt and debris are relatively small. Some fine dust will be separated as well. A large proportion of the larger debris will reliably be deposited in the first dust collecting bin 232.

There are 14 secondary cyclones 234, each of which has a smaller diameter than the cylindrical cyclone 230 and so is capable of separating finer dirt and dust particles than the cylindrical cyclone 230. They also have the added advantage of being challenged with air which has already been cleaned by the cylindrical cyclone 230 and so the quantity and average size of entrained dust particles is smaller than would otherwise have been the case. The separation efficiency of the secondary cyclones 234 is considerably higher than that of the cylindrical cyclone 230 however some small particles will still pass through the secondary cyclones 234 to the regenerative filter 216.

In the two embodiments described above the leaves of filter material 91, 291 may be formed from any suitable material for example a plastics material such as nylon, polyester or polypropylene, alternatively the leaves could be formed from paper, cellulose, cotton or metal.

The material of the filter leaves 91, 291 preferably has a pore size in the range of from 3, or 10, or 50, or 100, or 500, or 1000 pores per inch (PPI) with a pore diameter of from 1 micron or 2 micron, or 3 micron, or 10 micron, or 50 micron, or 100 micron, or 200 micron or 400 micron.

In a preferred embodiment, each filter book 90, 290 has from 2, or 5, or 10, or 20, or 50, or 100 leaves of filter material 91, 291.

A third embodiment is shown in FIGS. 27 to 40. The third embodiment shows an autonomous surface treating appliance, in the form of a robotic vacuum cleaner 400 (hereinafter 'robot') comprising a main body having four principal assemblies, a chassis 401, seen best in FIG. 32, a body 402 which is carried on the chassis 401, a generally circular outer cover 403 which is mountable on the chassis 401 and provides the robot 400 with a generally circular profile, and a cyclonic separating apparatus 406 that is carried on a front part of the body 402 and which protrudes through a complementary shaped cut-out 404 of the outer cover 403.

For the purposes of this embodiment, the terms 'front' and 'rear' in the context of the robot 400 will be used in the sense of its forward and reverse directions during operation, with the cyclonic separating apparatus 406 being positioned at the front of the robot 400. As will be appreciated from FIGS. 27 and 28, the main body of the robot 400 has the general form of a relatively short circular cylinder, largely for maneuverability reasons.

The chassis 401 supports several components of the robot 400. The primary function of the chassis 401 is as a drive platform and to carry cleaning apparatus for cleaning the surface over which the robot 400 travels.

Figure 35:
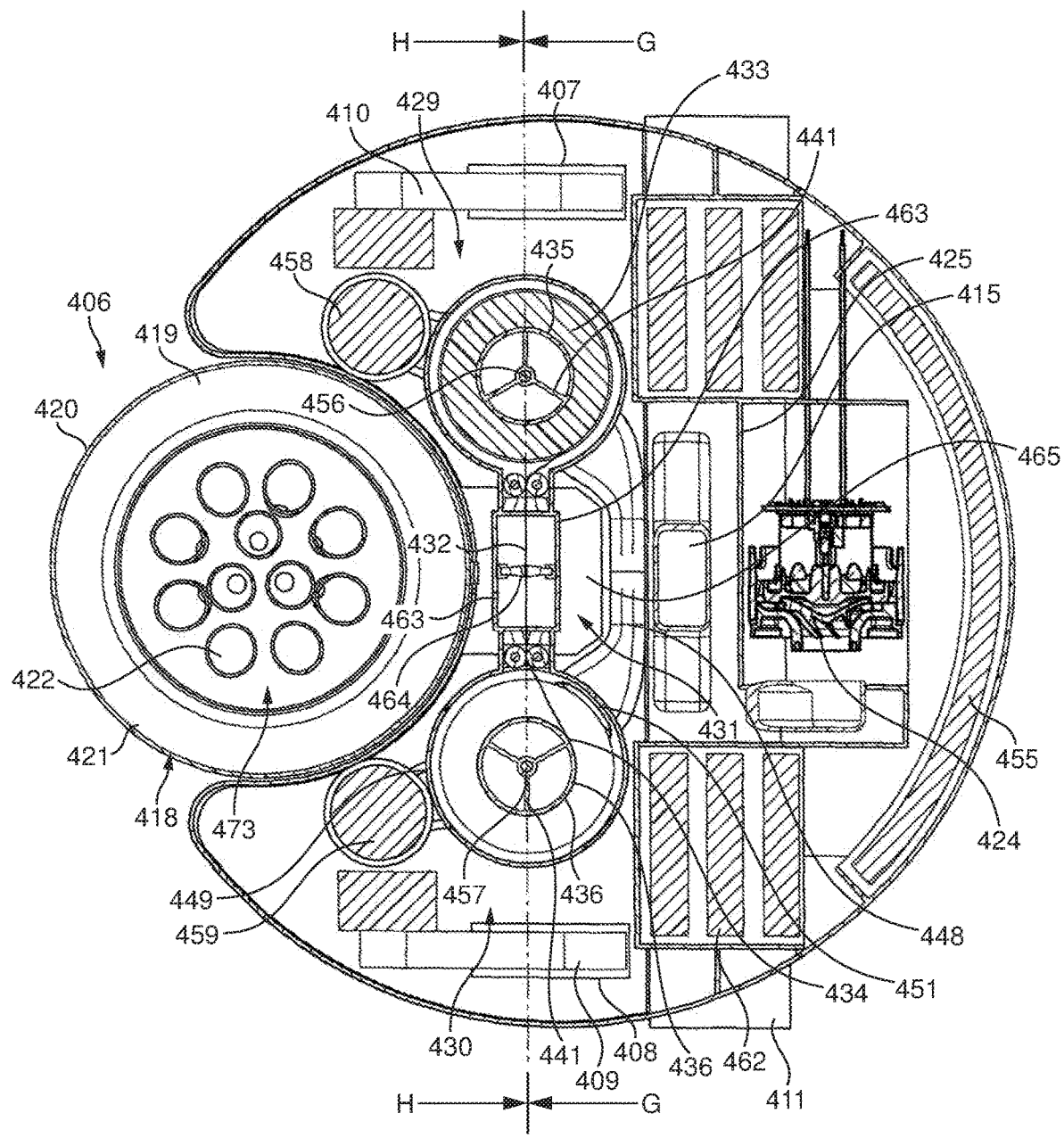
FIG. 35 shows a section through the vacuum cleaner shown in FIG. 32, taken along the line F-F.
Figure 36:
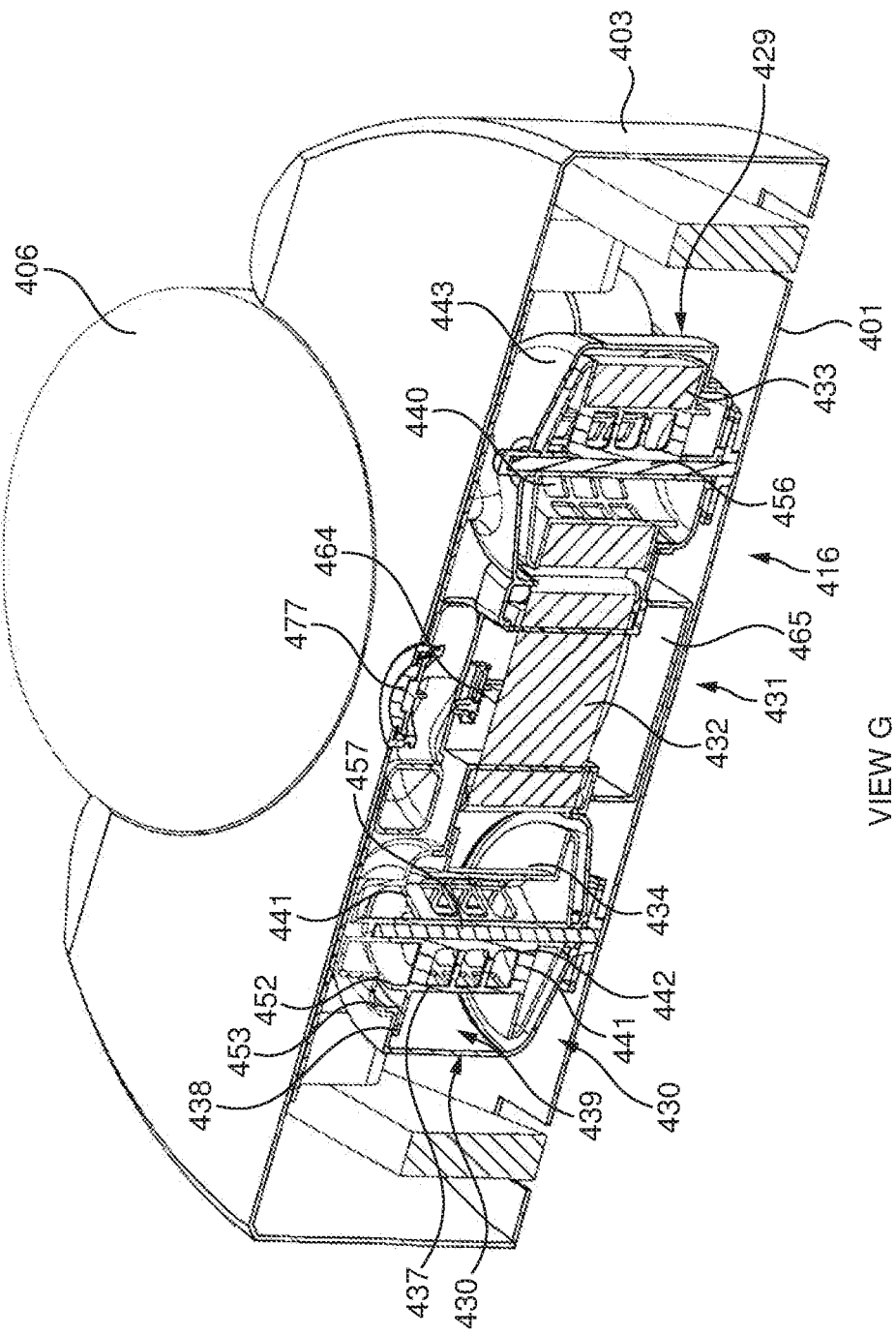
FIG. 36 shows view G of a section through the vacuum cleaner shown in FIG. 35, taken along the line H-G.
Figure 37:
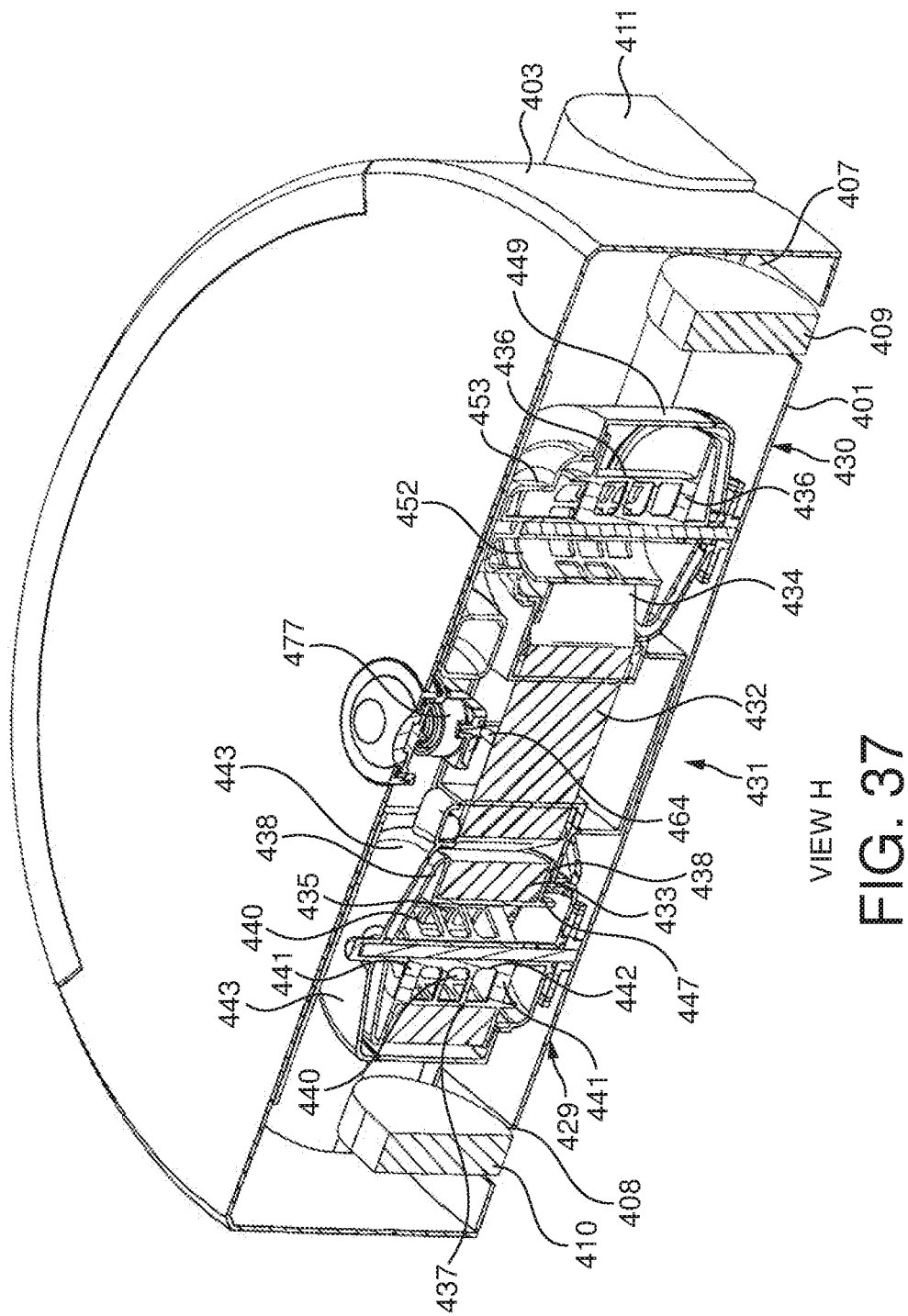
FIG. 37 shows view H of a section through the vacuum cleaner shown in FIG. 35, taken along the line H-G.

The chassis 401 has a pair of recesses 407, 408, seen best in FIG. 35, in which recesses a respective traction unit 409, 410 is mountable.

The pair of traction units 409, 410 are located on opposite sides of the chassis 401 and are operable independently to enable to robot 400 to be driven in forward and reverse directions, to follow a curved path towards the left or right, or to turn on the spot in either direction, depending on the speed and direction of rotation of the traction units 409, 410. Such an arrangement is sometimes known as a differential drive, however detail of the traction units 409, 410 will not be described in detail here as any suitable traction unit could be used. For simplification purposes, the traction units are not shown in all of the Figures.

The relatively narrow front portion of the chassis 401 widens into a rear portion which includes a surface treating assembly 411 or 'cleaner head' having a generally cylindrical form and which extends transversely across substantially the entire width of the chassis 401.

Figure 31:
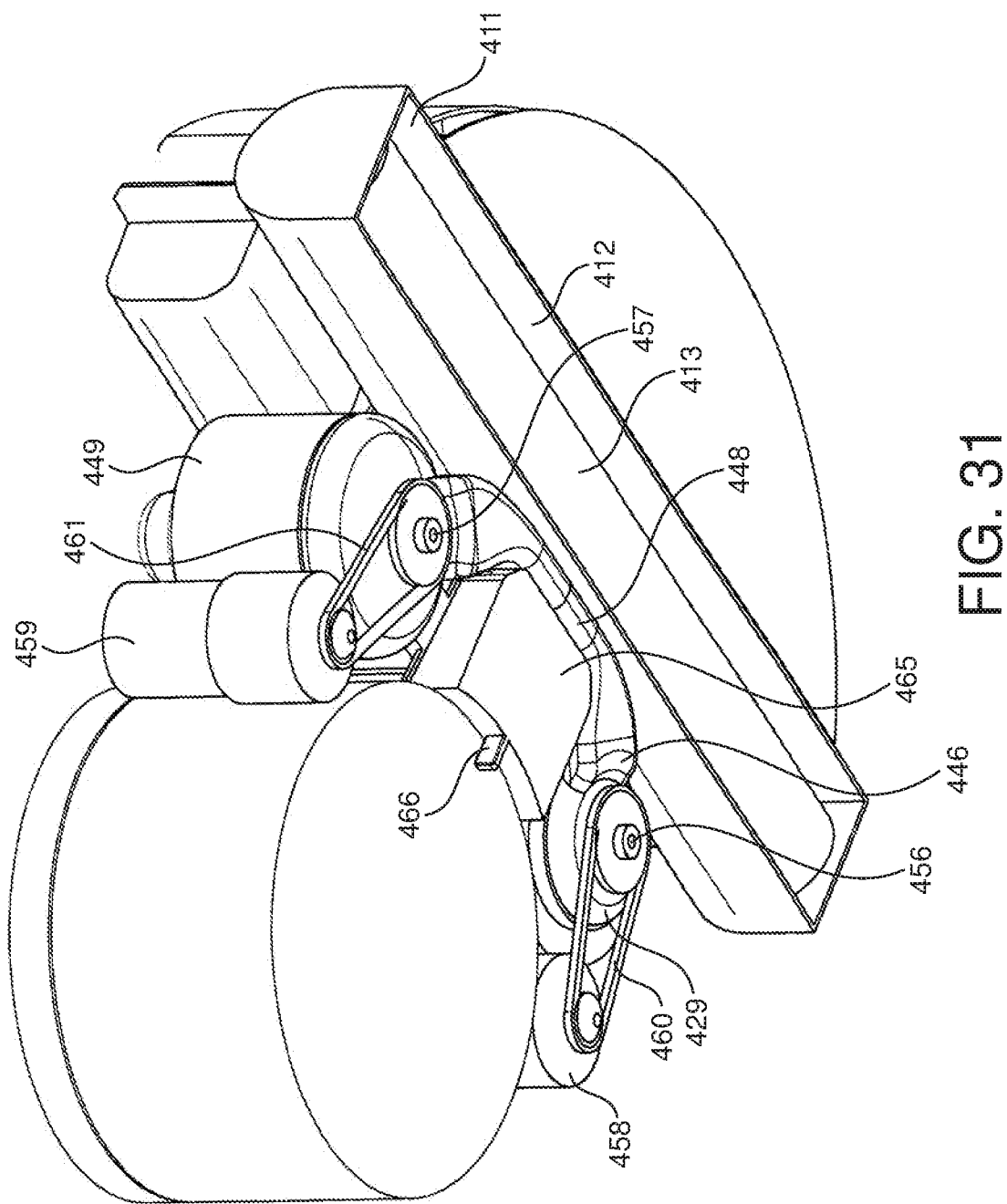
FIG. 31 shows an underside front perspective view of the vacuum cleaner shown in FIG. 27 with the outer casing removed.
Figure 32:
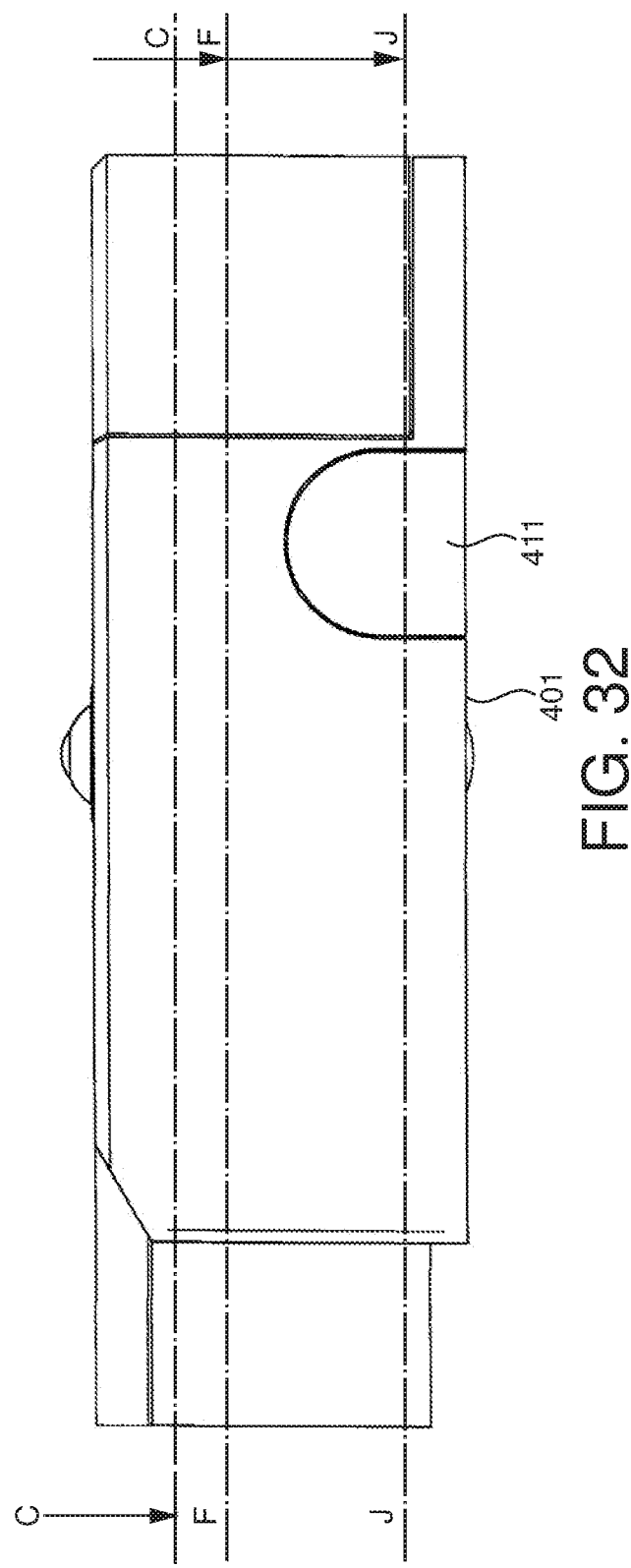
FIG. 32 shows a side view of the vacuum cleaner shown in FIG. 27.
Figure 33:
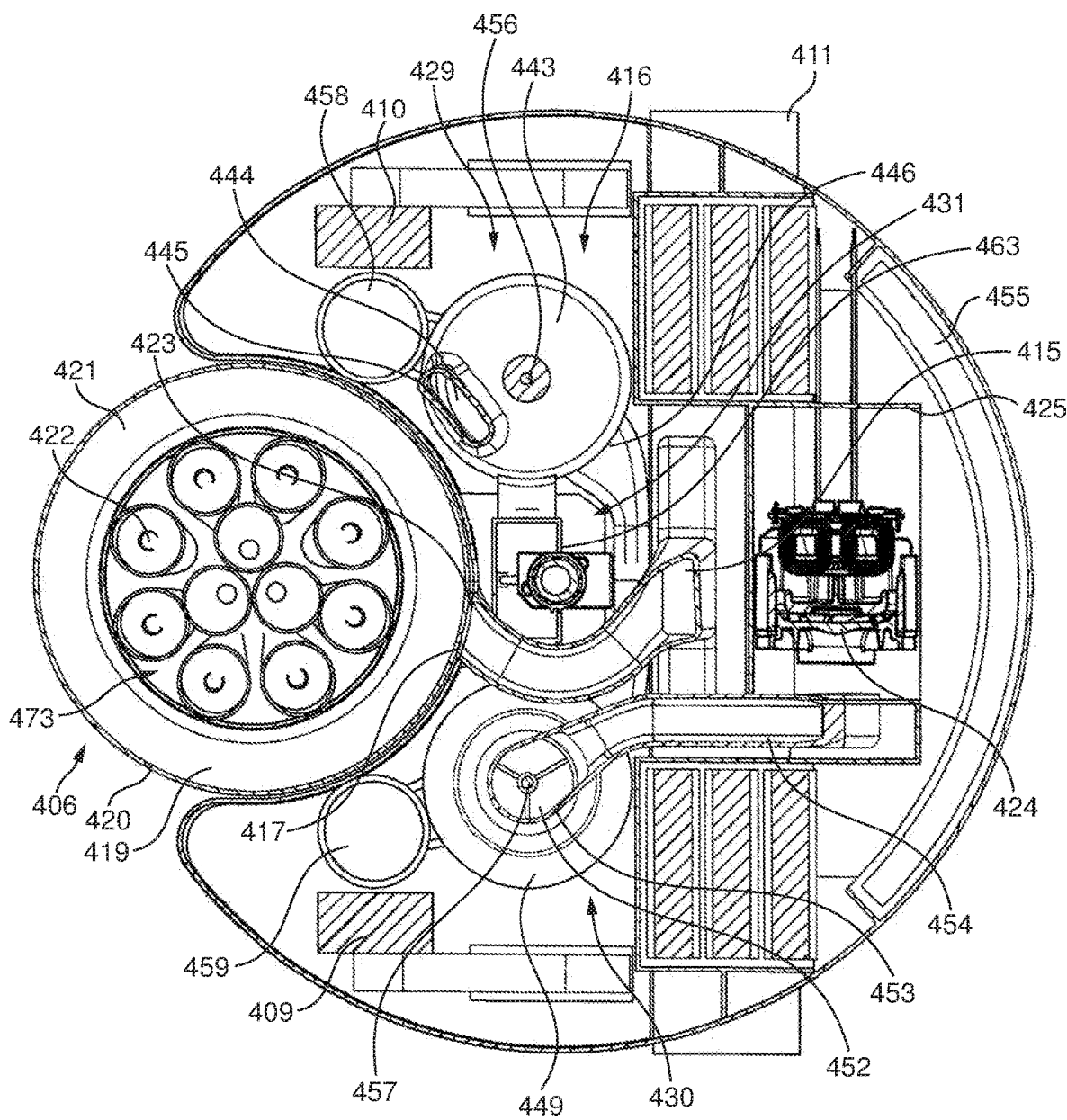
FIG. 33 shows a section through the vacuum cleaner shown in FIG. 32, taken along the line C-C.
Figure 34:
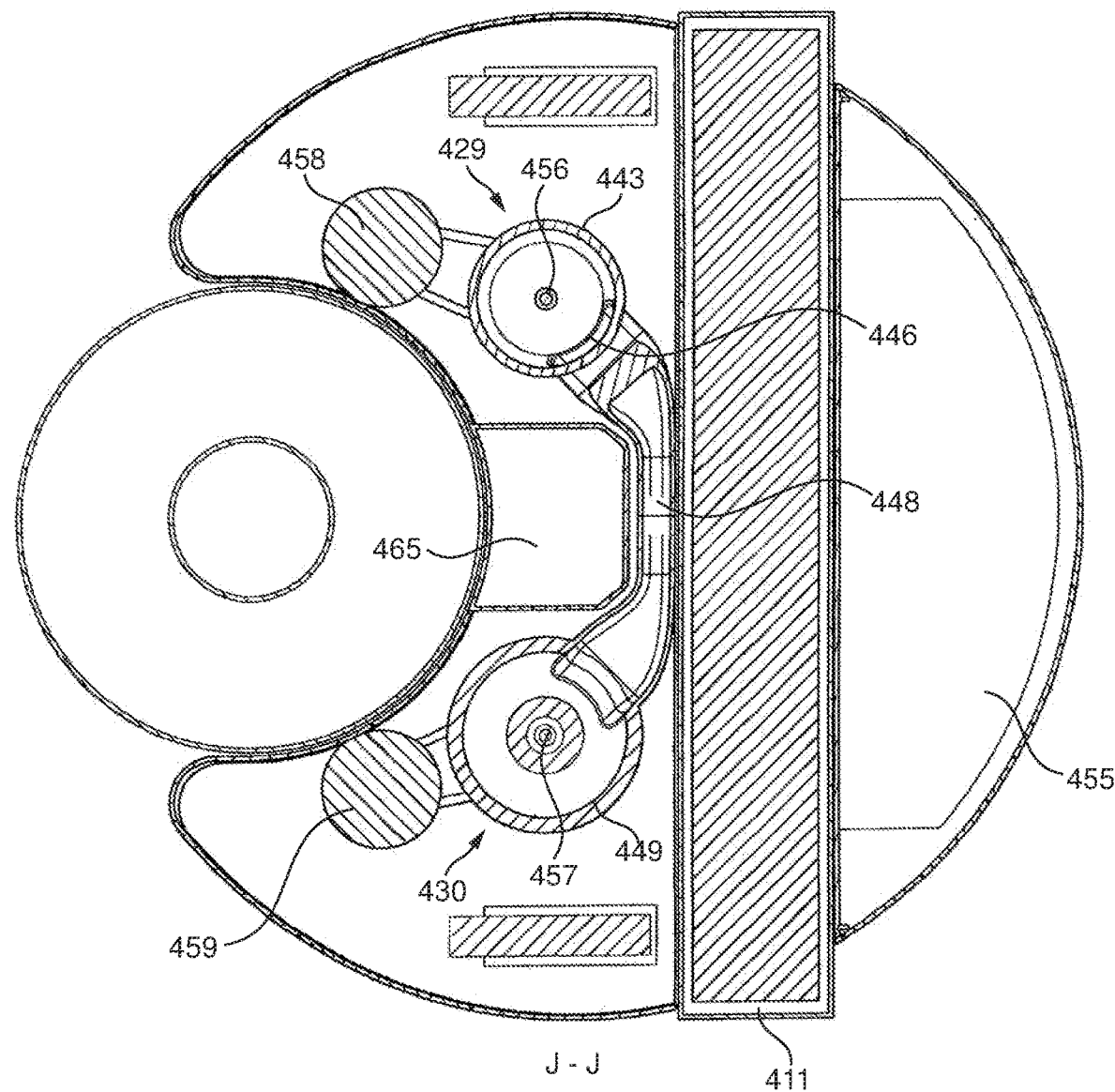
FIG. 34 shows a section through the vacuum cleaner shown in FIG. 32, taken along the line J-J.

With reference also to FIG. 31, which shows the underside of the robot 400, the cleaner head 411 defines a rectangular suction opening 412 that faces the supporting surface and into which dirt and debris is drawn into when the robot 400 is operating. An elongate brush bar 413 is contained within the cleaner head 411 and is driven by an electric motor (not shown) via a reduction gear and drive belt arrangement in a conventional manner, although other drive configurations such as a solely geared transmission are also envisaged.

The underside of the chassis 401 may also carry a plurality of passive wheels or rollers which provide further bearing points for the chassis 401 when it is at rest on or moving over a floor surface.

Dirt drawn into the suction opening 412 during a cleaning operation exits the cleaner head 411 via a brush bar outlet conduit 415 which extends upwardly from the cleaner head 411 and curves towards the front of the chassis 401 through approximately 90° of arc until it faces in the forwards direction. The brush bar outlet conduit 415 terminates at a brush bar conduit outlet 417. The brush bar conduit outlet 417 is located on a side wall of the cut out 404. The cut out 404 may have a generally circular base platform (not shown). The cut out 404 and the platform, if present, provide a docking portion into which the cyclonic separating apparatus 406 can be mounted, in use, and from which it can be disengaged for emptying purposes.

It should be noted that in this embodiment the cyclonic separating apparatus 406 consists of a cyclonic separator such as that disclosed in WO2008/009886, the contents of which are incorporated herein by reference. The configuration of the cyclonic separating apparatus 406 is well known and will not be described in any great detail here, save to say that the cyclonic separating apparatus 406 comprises two distinct stages of cyclonic separation. The first cyclonic separating unit 418 comprises a single cylindrical cyclone 419. The relatively large diameter of the outer wall 420 of which means that comparatively large particles of dirt and debris will be separated from the air because the centrifugal forces applied to the dirt and debris are relatively small. Some fine dust will be separated as well. A large proportion of the larger debris will reliably be deposited in a first dust collecting bin 421.

There are 11 secondary cyclones 422 in the second cyclonic separating unit 473, each secondary cyclone 422 has a smaller diameter than the cylindrical cyclone 419 and so is capable of separating finer dirt and dust particles than the cylindrical cyclone 419. They also have the added advantage of being challenged with air which has already been cleaned by the cylindrical cyclone 419 and so the quantity and average size of entrained dust particles is smaller than would otherwise have been the case. The separation efficiency of the secondary cyclones 422 is considerably higher than that of the cylindrical cyclone 419 however some small particles will still pass through the secondary cyclones 419. A downstream regenerative filter 416 would therefore be useful. In this embodiment the regenerative filter is housed within the main body 402 of the robot 400. It is not housed within the cyclonic separating apparatus 406. The cyclonic separating apparatus 406 is removable from the remainder of the robot 400. The regenerative filter 416 is fixed within the main body. The regenerative filter 416 is not removable with or without the cyclonic separating apparatus 406. In this embodiment the entire robot can be considered to be a "separating apparatus".

The cyclonic separating apparatus 406 may be removably attached to the body 402 by a suitable mechanism such as a quick-release fastening means to allow the cyclonic separating apparatus 406 to be emptied when it becomes full. The nature of the cyclonic separating apparatus 406 is not central to the invention and the cyclonic separating apparatus may instead separate dirt from the airflow by other means that are known in the art for example a filter-membrane, a porous box filter or some other form of separating apparatus. It is also conceivable that the robot 400 does not have such a separating apparatus at all and instead relies entirely on its regenerative filter 416 for removing dirt and dust from the dirty airflow.

When the cyclonic separating apparatus 406 is engaged in the cut out 404, a dirty air inlet 423 of the cyclonic separating apparatus 406 is in contact with the brush bar conduit outlet 417, such that the brush bar outlet conduit 415 transfers the dirty air from the cleaner head 411 to the cyclonic separating apparatus 406.

Dirty air is drawn through the cyclonic separating apparatus 406 by an airflow generator which, in this embodiment, is an electrically powered motor and fan unit (424), that is located in a motor housing 425. The cyclonic separating apparatus 406 also includes a cleaned air outlet 426 which registers with the mouth 428 of a regenerative filter inlet duct when the cyclonic separating apparatus 406 is engaged in the cut out 404. In use, the suction motor and fan unit 424 is operable to create low pressure in the region of the motor inlet mouth, thereby drawing dirty air along an airflow path from the suction opening 412 of the cleaner head 411, through the brush bar outlet conduit 415, the cyclonic separating apparatus 406 and the cleaned air outlet 426 into the regenerative filter 416.

In addition to the regenerative filter inlet duct 427, the regenerative filter also comprises a first filtration zone 429, a second filtration zone 430 and a regeneration zone 431. A length of filter material 432 is arranged such that it is rolled up at both ends to form a first filtration scroll 433 in the first filtration zone 429 and a second filtration scroll 434 in the second filtration zone 430. The first and second filtration scrolls 433, 434 are joined by a single layer of the filter material 432 which is arranged to pass through the regeneration zone 431. As can be seen in FIGS. 33 to 37 the first and second scrolls 433, 434 are spaced apart and arranged vertically such that their longitudinal axis are parallel to each other and their lower ends are on the same plane. The regeneration zone 431 is arranged between the first filtration zone 429 and the second filtration zone 430.

The construction of the first and second scrolls 433, 434 results in a plurality of layers of filter material 432 held together, through which the air flow from the cyclonic separating apparatus 406 must pass. The first filtration scroll 433 is mounted on a first support frame 435. The first support frame 435 can be seen best in FIG. 40. The support frame 435 is spool shaped in that it has a cylindrical central tube 437 and a pair of opposed flanges 438 which extend outwardly from the cylindrical central tube 437 to form a space 439 therebetween onto which the filter material 432 can be wound. The opposed flanges 438 are solid but the cylindrical central tube 437 has a plurality of airflow apertures 440 which in the example shown are square in shape. The airflow apertures 440 could of course be of any suitable shape as long as the cylindrical central tube 437 is rigid enough to support the first filtration scroll 433 but has enough airflow apertures 440 to ensure that it does not provide too great a barrier to airflow and preferably will not clog with dirt and dust.

To help to ensure the rigidity of the cylindrical central tube 437 three support walls 441 are provided within the cylindrical central tube 437. The support walls 441 run the length of the cylindrical central tube 437 and are spaced equidistantly around its inner wall. The support walls 441 extend inwardly from the inner wall of the cylindrical central tube 437 to meet at the longitudinal axis of the cylindrical central tube 437. These support walls 441 effectively section the inside of the cylindrical central tube 437 into three portions. To ensure that air can flow freely between these three portions, the support walls 441 also have a plurality of inner apertures 442 which in the example shown are square in shape. The inner apertures 442 could of course be of any suitable shape as long as the support walls 441 remain rigid enough to support the cylindrical central tube 437 but do not provide too great a barrier to airflow and preferably will not clog with dirt and dust.

The first extreme outer edge 468 of the filter material 432 is attached to the cylindrical central tube 437 and a length of filter material 432 is wound onto the cylindrical central tube 437 to provide a plurality of layers of filter material 432 which are held tightly together so that each subsequent layer of filter material is in contact with the previous layer of filter material. In this way gaps between the layers of filter material 432 on the first filtration scroll 433 are minimized or eliminated. The first filtration scroll 433 which is mounted on the first support frame 435 is housed within a first scroll housing 443. The first scroll housing 443 has a first scroll housing inlet 444 which is connected to the outlet of the regenerative filter inlet duct 427. The first scroll housing 443 also has a first scroll housing outlet 446. The first scroll housing outlet 446 is connected to a first scroll outlet 447. The first scroll outlet 447 is the lowermost end of the cylindrical central tube 437. An airtight seal (not shown) is provided between an inner lower surface of the first scroll housing 443 and the lower surface of the lower opposed flange 438. This seal ensures that any air that enters the first scroll housing 443 passes through the first filtration scroll 433 and out of the first scroll housing outlet 446.

The air that passes out of the first scroll housing 443 passes into an intermediate duct 448 which takes the air towards a second scroll housing 449. The second scroll housing 449 houses the second filtration scroll 434 and a second support frame 436 on which the second filtration scroll 434 is mounted. The second support frame 436 is constructed in the same manner as the first support frame 435. The second scroll housing 449 has a second scroll housing inlet 451 which is connected to the outlet of the intermediate duct 448. The intermediate duct 448 joins the bottom of the first scroll housing 443 to the bottom of the second scroll housing 449.

In the second scroll housing 449 incoming air is forced to pass through the second filtration scroll 434. The air then travels through the apertures 440 in the cylindrical central tube 437 and then passes out of the second scroll outlet 452. The air then passes through the second scroll housing outlet 453 into an exhaust duct 454 which takes the cleaned air towards the motor and fan unit 424. Once the air has passed through the motor and fan unit 424 it passes through a post motor filter 455 and is then exhausted from the robot 400.

Both the first filtration scroll 433 and the second filtration scroll 434 are mounted on drive shafts 456, 457. These drive shafts 456, 457 are arranged along the longitudinal axis of the equivalent first and second filtration scrolls 433, 434. It can be seen that the support walls 441 of the first support frame 435 are mounted on the first drive shaft 456. The support walls 441 of the second support frame 436 are mounted on the second drive shaft 457. The first drive shaft 456 projects through the lower surface of the first scroll housing 443 and the second drive shaft 457 projects through the lower surface of the second scroll housing 449. Seals (not shown) are provided to help prevent air leaks between the drive shafts 456, 457 and the relative housings 443, 449. The lower ends of the drive shafts 456, 457 are connected to respective first and second drive motors 458, 459 via first and second drive belts 460, 461. The first and second drive motors 458, 459 are arranged such that they each can turn their respective drive shafts 456, 457 in either direction according to the need. For example, if the robot 400 starts its operation with all of the filter material 432 wound into the first filtration scroll 433 with only enough filter material 432 left unwound to pass through the regeneration zone 431 and attach to the cylindrical central tube 437 on the second support frame 436, then from this starting position the second drive motor 459 can activate to turn the second drive shaft 457 in a clockwise direction (when looking at the robot 400 with the separating apparatus 406 closest to you). When the second drive motor 459 turns the second drive shaft 457 in a clockwise direction the filter material 432 starts to unwind from the first support frame 435 and onto the second support frame 436, passing through the regeneration zone 431 on its way.

This also works in reverse where the robot 400 starts its operation with all of the filter material 432 wound into the second filtration scroll 434 with only enough filter material 432 left unwound to pass through the regeneration zone 431 and attach to the cylindrical central tube 437 on the first support frame 435. From this starting position the first drive motor 458 can activate to turn the first drive shaft 456 in an anticlockwise direction (when looking at the robot with the separating apparatus 406 closest to you). When the first drive motor 458 turns the first drive shaft 456 in an anticlockwise direction the filter material 432 starts to unwind from the second support frame 436 and onto the first support frame 435, passing through the regeneration zone 431 on its way. This movement of the filter material 432 back and forward between first and second filtration zones 429, 430 can occur continuously during operation of the robot or it can be programmed to occur at a certain time, for example when the robot 400 docks to recharge its batteries 462.

Since during use of the robot 400, all of the airflow has to pass through both the first filtration scroll 433 and the second filtration scroll 434 it does not matter which filtration scroll 433, 434 has the most layers of filter material 432 as the total number of layers of filter material 432 through which the air will pass will never fall below a minimum no of layers.

The regeneration zone 431 comprises a regeneration housing 463. Inside the regeneration housing 463 are a pair of opposed brushes 464 which are the same height as the filter material 432 and are arranged at a distance apart such that as the filter material 432 passes between them, the brushes 464 contact both sides of the filter material 432. In this way, as the filter material 432 is moved from one filter scroll 433 to the other scroll 434 it is brushed and therefore cleaned and regenerated by the brushes 464. Dirt and dust which is removed from the filter material 432 by the brushes 464 drops into a dust collection drawer 465 located below the regeneration zone 431. The dust collection drawer 465 has a handle 466 which is located inside the cut out 404. This means that a user can empty the dust collection drawer 465 when the cyclonic separating apparatus 406 has been removed from the cut out 404. Because the filter material 432 is passing backwards and forwards between the first and second support frames 435, 436 it gets regenerated each time it passes through the regeneration zone 431. This means that the first and second filtration scroll 433, 434 are constantly being regenerated and therefore do not get so blocked with dirt and dust that they cannot filter further dust and/or block or overly restrict airflow through the filter material 432.

Figure 40:
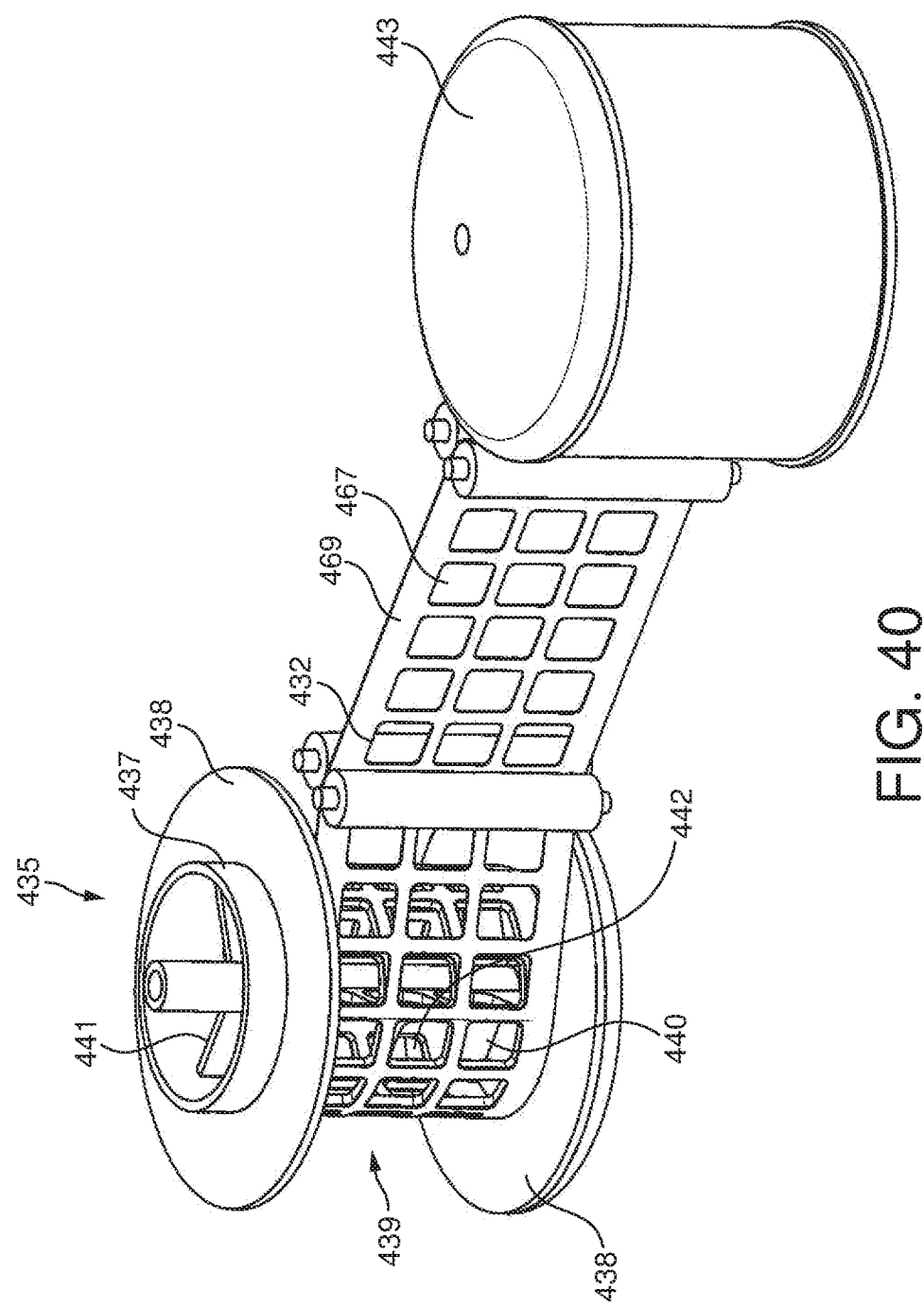
FIG. 40 shows a perspective view of the regenerative filter shown in FIG. 38.

From FIGS. 39 and 40 it can be seen that the first extreme outer edge 468 and the second extreme outer edge (not shown) of the filter material 432 has a tail area 469 which has an open structure as opposed to a filtering structure. This is because all or the majority of these tail areas 469 never pass through the regeneration zone 431 and therefore must allow airflow to pass freely through them without blocking with dirt and dust. In this example the tail area 469 has a plurality of filter apertures 467. These are square shaped in the example shown but they could be any other suitable shape as long as the tail area 469 at the first and second extreme outer edges 468 of the filter material 432 remain strong enough to attach the remainder of the filter material to the first and second support frames 435, 436 and are open enough to reduce blockage of airflow. In the example shown it can be seen that the filter apertures 467 line up with the airflow apertures 440 on the cylindrical central tube 437.

The filter material 432 may be any suitable material for example a plastics material such as polyester or polypropylene, alternatively the filter material 432 could be formed from paper, cellulose or cotton. The tail area 469 may be formed from the same material as the remainder of the filter material 432 or it may be made from a different material, for example a material which is stiffer than the remainder of the filter material.

The filter material 432 preferably has a pore size in the range of from 3, or 10, or 50, or 100, or 500, or 1000 pores per inch (PPI) with a pore diameter of from 1 micron or 2 micron, or 3 micron, or 10 micron, or 50 micron, or 100 micron, or 200 micron or 400 micron. The pore size or type of filter material 432 may vary along the length and or width of the filter material 432. For example the pore size may decrease or increase along the length of the filter material 432 or in a downstream direction.

In a preferred embodiment the pore size of the filter apertures 467 in the tail area 469 are larger than the pore sizes in the filter material 432. The pore size of the filter apertures 467 are preferably 400 microns or greater. The filter apertures 467 preferably have a pore size of from 2.5 mm to 15 mm. In a preferred embodiment the filter apertures 467 in each layer wound onto the support frames 435, 436 are arranged to overlap such that there is a clear passageway for air to flow through the filter apertures 467.

In use, as the filter material 432 is wound from the first filtration scroll 433 onto the second filtration scroll 434 the filter material 432 passes through a first set of guide rollers 470 before passing through the regeneration zone 431 and then a second set of guide rollers 471, before finally being wound onto the second filtration scroll 434. Each set of guide rollers 470, 471 has a roller 472 positioned each side of a line which runs through the centre of the opposed brushes 464. This ensures that the filter material 432 passes in a straight line between the brushes 464. The sets of guide rollers 470, 471 also help to ensure that each filtration scroll 433, 434 is wound evenly onto the respective support frames, 435, 436. The sets of guide rollers 470, 471 function in the same way when the filter material 432 is being wound from the second filtration scroll 434 onto the first filtration scroll 433.

The system described in relation to FIGS. 27 to 40 is a dynamic system in that during use the first and second scrolls 433, 434 are constantly changing with regard to how many filter layers there are in each filtration zone 429, 430. As the layers of filter material 432 on one filtration scroll are getting loaded with dust they are continuously being unwound and passed through the regeneration zone 431 where they are cleaned and then used again on the other filtration scroll. This is a continuous dynamic process.

Figure 41:
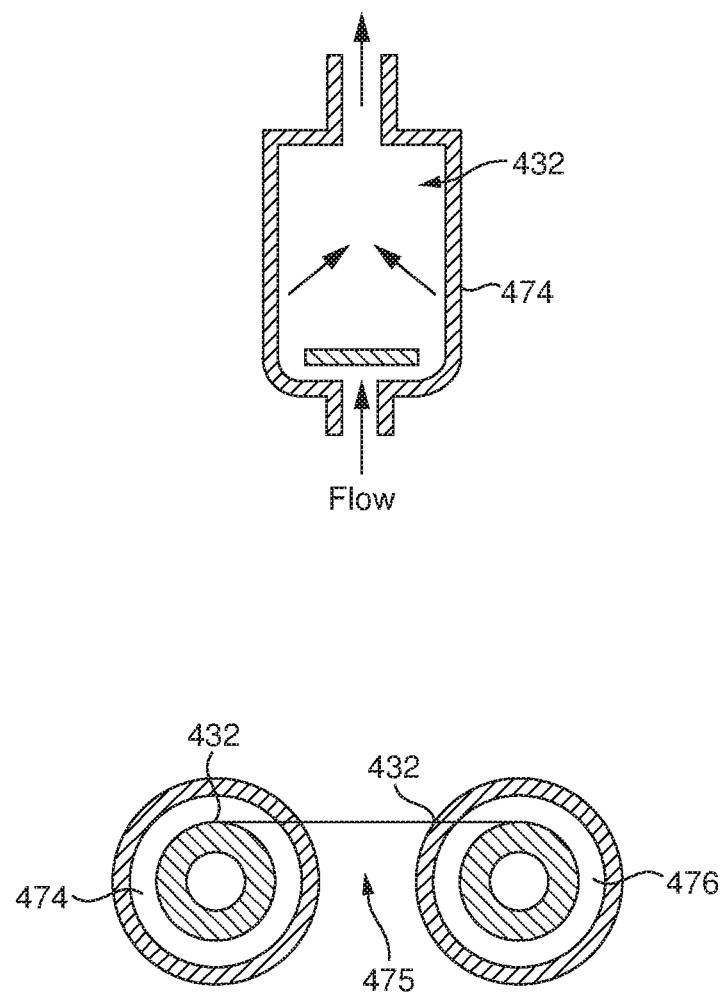
FIG. 41 shows a schematic illustration of a separating apparatus having a static system.

An alternative arrangement is also envisaged. This alternative arrangement is shown schematically in FIG. 41. It shows a static rather than a dynamic system. In the static system the filter material 432 is all wound onto a first filtration scroll 474. This filtration scroll is static and is used for cleaning during an operation of the robot. At a convenient point, for example when the robot is charging, the filter material 432 can be unwound from the first filter scroll 474, passed through and cleaned in a regeneration zone 475, passing onto a holding scroll 476 and then wound back onto the same first filtration scroll 474 for use the next time the robot is in use.

In operation, the robot 400 is capable of propelling itself about its environment autonomously, powered by rechargeable batteries 462. To achieve this, the robot 400 carries an appropriate control means which is interfaced to the batteries 462, the traction units 409, 410 and an appropriate sensor suite 477 comprising for example infrared and ultrasonic transmitters and receivers. The sensor suite can provide the control means with information representative of the distance of the robot from various features in an environment and the size and shape of the features. Additionally the control means is interfaced to the motor and fan unit 424 and the brush bar motor in order to drive and control these components appropriately. The control means is therefore operable to control the traction units 409, 410 in order to navigate the robot 400 around the room which is to be cleaned. It should be noted that the particular method of operating and navigating the robotic vacuum cleaner is not material to the invention and that several such control methods are known in the art. For example, one particular operating method is described in more detail in WO00/38025 in which navigation system a light detection apparatus is used. This permits the robot to locate itself in a room by identifying when the light levels detected by the light detector apparatus is the same or substantially the same as the light levels previously detected by the light detector apparatus.

The invention claimed is:

1. An appliance comprising:
   a regenerative filter for filtering a fluid flow, the regenerative filter comprising at least one filter;
   a filter regenerator for regenerating the regenerative filter; and
   a turbine for driving the filter regenerator, the turbine being driven by the fluid flow passing through the appliance during use so that the filter regenerator is operating continuously as the fluid flow is passing through the appliance,
   wherein the at least one filter is moveable from a filtration position in which the at least one filter as a whole is positionally fixed and filters the fluid flow to a regeneration position in which the at least one filter as a whole is positionally fixed, does not filter the fluid flow, and is regenerated by the filter regenerator.

2. The appliance of claim 1, wherein the turbine is arranged to be driven by fluid exhausted from the regenerative filter during use of the appliance.

3. The appliance of claim 1, wherein the turbine is arranged downstream of the regenerative filter.

4. The appliance of claim 1, wherein the turbine is connected to the filter regenerator via one or more gears.

5. The appliance of claim 1, wherein the turbine is connected to the filter regenerator via a drive shaft.

6. The appliance of claim 1, wherein the at least one filter of the regenerative filter comprises a plurality of layers of filter material, the at least one filter having a first filtering configuration where the plurality of layers are held together and the air to be cleaned passes through the plurality of layers of filter material and a second regeneration configuration where at least a portion of one layer of the plurality of layers of filter material is spaced from the remainder of the plurality of layers of filter material for regeneration.

7. The appliance of claim 1, wherein the regenerative filter comprises a plurality of filters.

8. The appliance of claim 1, wherein in use, the filter regenerator moves at least a portion of the regenerative filter, such that dirt deposited on the regenerative filter is knocked or shaken from the regenerative filter.

9. The appliance of claim 1, wherein, in use, the filter regenerator repeatedly makes contact with at least a portion of the regenerative filter, such that dirt deposited on the regenerative filter is knocked or shaken from the regenerative filter.

10. The appliance of claim 1, wherein the regenerative filter is connected to the filter regenerator, and in use, the filter regenerator moves the regenerative filter such that dirt deposited on the regenerative filter is shaken from the regenerative filter.

11. The appliance of claim 1, wherein the appliance is a vacuum cleaner.

12. An appliance comprising:
    a regenerative filter for filtering a fluid flow, the regenerative filter comprising at least one filter;
    a filter regenerator for regenerating the regenerative filter; and
    a turbine for driving the filter regenerator, the turbine being driven by the fluid flow passing through the appliance during its use,
    wherein the at least one filter of the regenerative filter comprises a plurality of layers of filter material, the at least one filter having a first filtering configuration where the plurality of layers are held together and the air to be cleaned passes through the plurality of layers of filter material and a second regeneration configuration where at least a portion of one layer of the plurality of layers of filter material is spaced from the remainder of the plurality of layers of filter material for regeneration.

* * * * *